US010303259B2

(12) United States Patent
Brunner et al.

(10) Patent No.: US 10,303,259 B2
(45) Date of Patent: May 28, 2019

(54) SYSTEMS AND METHODS FOR GESTURE-BASED INTERACTION

(71) Applicant: YouSpace, Inc., Mountain View, CA (US)

(72) Inventors: Ralph Brunner, Los Gatos, CA (US); Andrew Emmett Seligman, Mountain View, CA (US); Hsin-Yi Chien, Cupertino, CA (US); John Philip Stoddard, Boulder Creek, CA (US); Po-Jui Chen, San Jose, CA (US); Elon Sharton-Bierig, Santa Clara, CA (US); Sierra Justine Gaston, Cupertino, CA (US); Vivi Brunner, Los Gatos, CA (US)

(73) Assignee: YouSpace, Inc., Santa Clara, CA (US)

( * ) Notice: Subject to any disclaimer, the term of this patent is extended or adjusted under 35 U.S.C. 154(b) by 122 days.

(21) Appl. No.: 15/478,201

(22) Filed: Apr. 3, 2017

(65) Prior Publication Data

US 2018/0284901 A1    Oct. 4, 2018

(51) Int. Cl.
G06F 3/01    (2006.01)
G06F 3/03    (2006.01)

(52) U.S. Cl.
CPC .............. G06F 3/017 (2013.01); G06F 3/011 (2013.01); G06F 3/0304 (2013.01)

(58) Field of Classification Search
None
See application file for complete search history.

(56) References Cited

U.S. PATENT DOCUMENTS

| 3,992,629 A | 11/1976 | Chapman |
| 4,408,678 A | 10/1983 | White, Jr. |
| 5,124,693 A | 6/1992 | Himelstein et al. |

(Continued)

FOREIGN PATENT DOCUMENTS

| DE | 102013211335 | 12/2014 |
| KR | 20160116903 | 10/2016 |

(Continued)

OTHER PUBLICATIONS

Eyesight, VR & AR—eye-sight—website, Available at http://www.eyesight-tech.com/product/vr-ar/. (Retrieved Sep. 6, 2017).

(Continued)

*Primary Examiner* — Duane N Taylor, Jr.

(57) ABSTRACT

Various of the disclosed embodiments present depth-based user interaction systems facilitating natural and immersive user interactions. Particularly, various embodiments integrate immersive visual presentations with natural and fluid gesture motions. This integration facilitates more rapid user adoption and more precise user interactions. Some embodiments may take advantage of the particular form factors disclosed herein to accommodate user interactions. For example, dual depth sensor arrangements in a housing atop the interface's display may facilitate depth fields of view accommodating more natural gesture recognition than may be otherwise possible. In some embodiments, these gestures may be organized into a framework for universal control of the interface by the user and for application-specific control of the interface by the user.

21 Claims, 44 Drawing Sheets

(56) References Cited

U.S. PATENT DOCUMENTS

| | | | |
|---|---|---|---|
| 5,534,917 A | 7/1996 | MacDougall | |
| 5,926,230 A | 7/1999 | Niijima et al. | |
| 6,109,460 A | 8/2000 | Herlevi et al. | |
| 6,130,663 A | 10/2000 | Null | |
| 6,353,428 B1 | 3/2002 | Maggioni et al. | |
| 6,518,565 B1* | 2/2003 | Wu | G01D 11/245 250/239 |
| 7,058,204 B2 | 6/2006 | Hildreth et al. | |
| 7,227,526 B2 | 6/2007 | Hildreth et al. | |
| 7,340,077 B2 | 3/2008 | Gokturk et al. | |
| 7,379,563 B2 | 5/2008 | Shamaie | |
| 7,379,566 B2 | 5/2008 | Hildreth | |
| 7,948,481 B2 | 5/2011 | Vilcovsky | |
| 8,553,939 B2 | 10/2013 | Craig et al. | |
| 8,610,665 B2 | 12/2013 | Craig et al. | |
| 8,788,973 B2 | 7/2014 | Lavigne et al. | |
| 8,830,302 B2 | 9/2014 | Im et al. | |
| 8,842,906 B2 | 11/2014 | Watson et al. | |
| D727,995 S | 4/2015 | Vilcovsky | |
| 9,075,441 B2 | 7/2015 | St. Hilaire et al. | |
| 9,081,419 B2 | 7/2015 | Tocino Diaz et al. | |
| 9,164,589 B2 | 10/2015 | Tong et al. | |
| 9,292,767 B2 | 3/2016 | Oberg et al. | |
| 9,298,346 B2 | 3/2016 | Le Clerc et al. | |
| D753,754 S | 4/2016 | Vilcovsky | |
| 9,317,112 B2 | 4/2016 | Cao et al. | |
| 9,323,338 B2 | 4/2016 | He et al. | |
| 9,383,895 B1 | 7/2016 | Vinayak et al. | |
| 9,389,779 B2 | 7/2016 | Anderson et al. | |
| 9,424,490 B2 | 8/2016 | Muff et al. | |
| 9,429,833 B1 | 8/2016 | Satoh et al. | |
| 9,448,636 B2 | 9/2016 | Balzacki | |
| 9,459,758 B2 | 10/2016 | Berenson et al. | |
| 9,684,928 B2 | 6/2017 | Freeman et al. | |
| 2008/0151092 A1 | 6/2008 | Vilcovsky | |
| 2010/0146455 A1 | 6/2010 | Wilson et al. | |
| 2010/0199228 A1 | 8/2010 | Latta et al. | |
| 2011/0090147 A1 | 4/2011 | Gervais et al. | |
| 2011/0122048 A1* | 5/2011 | Choi | G06F 3/1446 345/1.1 |
| 2011/0199294 A1 | 8/2011 | Vilcovsky | |
| 2011/0288964 A1 | 11/2011 | Linder et al. | |
| 2012/0157207 A1 | 6/2012 | Craig et al. | |
| 2013/0083252 A1* | 4/2013 | Boyes | G06K 9/00355 348/734 |
| 2013/0179162 A1 | 7/2013 | Merschon et al. | |
| 2013/0241833 A1 | 9/2013 | Craig et al. | |
| 2013/0251192 A1* | 9/2013 | Tu | G06K 9/00375 382/103 |
| 2013/0278499 A1 | 10/2013 | Anderson | |
| 2013/0278501 A1 | 10/2013 | Bulzacki | |
| 2014/0043232 A1* | 2/2014 | Kurokawa | G06F 3/005 345/156 |
| 2014/0225977 A1 | 8/2014 | Vilcovsky et al. | |
| 2014/0226000 A1 | 8/2014 | Vilcovsky et al. | |
| 2014/0226900 A1 | 8/2014 | Saban et al. | |
| 2014/0241570 A1 | 8/2014 | Onen et al. | |
| 2014/0363073 A1* | 12/2014 | Shirakyan | G06T 7/0075 382/154 |
| 2015/0091790 A1* | 4/2015 | Forutanpour | G06F 3/011 345/156 |
| 2015/0109202 A1 | 4/2015 | Ataee et al. | |
| 2015/0145860 A1 | 5/2015 | Craig et al. | |
| 2015/0199816 A1 | 7/2015 | Freeman et al. | |
| 2015/0277700 A1 | 10/2015 | He | |
| 2016/0048726 A1 | 2/2016 | Tang et al. | |
| 2016/0127710 A1 | 5/2016 | Saban et al. | |
| 2016/0209655 A1 | 7/2016 | Riccomini et al. | |
| 2016/0260260 A1 | 9/2016 | Fei et al. | |
| 2016/0289042 A1 | 10/2016 | Fang et al. | |
| 2016/0292521 A1 | 10/2016 | Fang et al. | |
| 2016/0328604 A1 | 11/2016 | Bulzacki | |
| 2017/0160751 A1 | 6/2017 | Pierce et al. | |
| 2017/0161555 A1 | 6/2017 | Kumar et al. | |
| 2017/0161591 A1 | 6/2017 | English et al. | |
| 2017/0161592 A1 | 6/2017 | Su et al. | |
| 2017/0161607 A1 | 6/2017 | English et al. | |
| 2017/0161911 A1 | 6/2017 | Kumar et al. | |
| 2018/0150713 A1 | 5/2018 | Farooqi et al. | |
| 2018/0181362 A1 | 6/2018 | Kaneko | |

FOREIGN PATENT DOCUMENTS

| | | |
|---|---|---|
| WO | WO2017095948 | 6/2014 |
| WO | WO2015195652 | 12/2015 |
| WO | WO2014100250 | 6/2017 |

OTHER PUBLICATIONS

Flutter, Taps, drags, and other gestures in Flutter—Flutter—website, Available at https://flutter.io/gestures/. (Retrieved Sep. 8, 2017).

Gestigon GMBH, Carnival SDK for Android—YouTube, Published Jul. 12, 2016. Available at https://www.youtube.com/watch?v=6McyTb8QQII. (Retrieved Sep. 7, 2017).

Gestigon GMBH, Carnival—YouTube, Published Nov. 18, 2015. Available at https://www.youtube.com/watch ?v=BgjFYR4xl7g&feature=youtu.be. (Retrieved Sep. 6, 2017).

Gestigon GMBH, CES 2017 Driver Monitoring Demo—YouTube, Published Jan. 31, 2017. Available at https://www.youtube.com/watch?v=gx8y1LftdAU. (Retrieved Sep. 7, 2017).

Gestigon GMBH, Flamenco—gestigon's gesture control service for win7 and win8—YouTube, Published Jul. 21, 2014. Available at https://www.youtube.com/watch?v=stCWbKtT4Vo&feature=youtu.be. (Retrieved Sep. 6, 2017).

Gestigon GMBH, gestigonGoesCES2015—Invitation Video—YouTube, Published Dec. 8, 2014. Available at https://www.youtube.com/watch?v=VhHrWYyGros. (Retrieved Sep. 7, 2017).

Gestigon GMBH, gestigon Carnival AR/VR Interaction Suite with Melexis 175° - YouTube, Published Oct. 13, 2015. Available at https://www.youtube.com/watch?v=vBSJfhZTFF0. (Retrieved Sep. 7, 2017).

Gestigon GMBH, Oyster Advanced Body Skeleton Tracking—YouTube, Published Jun. 6, 2016. Available at https://www.youtube.com/watch ?v=UiEg64H07Gk&feature=yo utu.be. (Retrieved Sep. 6, 2017).

Gesturetek Health, Cancer Smash on Vimeo, Published Dec. 20, 2016. Available at https://vimeo.com/196479220. (Retrieved Sep. 8, 2017).

Gesturetek Health, Cube at Shriners Children's Hospital on Vimeoo, Published Jun. 7, 2016. https://vimeo.com/169762973. (Retrieved Sep. 8, 2017).

Gesturetek Health, GestureTek Health Creates Interactive Road Safety Learning Experience for VTS Medical on Vimeo, Published Jun. 3, 2016. https://vimeo.com/169300431. (Retrieved Sep. 8, 2017).

Gesturetek Health, GestureTek Health Demo on Vimeo, Published Feb. 1, 2017. https://vimeo.com/202066360. (Retrieved Sep. 8, 2017).

Gesturetek Health, GestureTek Health Sensory CUBE on Vimeo. Published Feb. 16, 2017. Available at https://vimeo.com/204390914. (Retrieved Sep. 8, 2017).

Gesturetek Health, Immersive Therapy Suite—Demo on Vimeo. Published Jun. 7, 2016. Available at https://vimeo.com/169760032. (Acquired Sep. 8, 2017).

Gesturetek Health, IREX—Clinician Edition on Vimeo. Published Jun. 7, 2016. Available at https://vimeo.com/169750941. (Acquired Sep. 8, 2017).

Gesturetek Health, IREX—Soccer with Tracking Overlay on Vimeo. Published Jun. 8, 2016. Available at https://vimeo.com/169857821. (Acquired Sep. 8, 2017).

Gesturetek Health, IREX Teaser on Vimeo. Published May 15, 2017. Available at https://vimeo.com/217517124. (Acquired Sep. 8, 2017).

Gesturetek Health, Multitouch Wall—Kaiser Permanente on Vimeo. Published Jun. 7, 2016. Available at https://vimeo.com/169763297. (Acquired Sep. 8, 2017).

(56) References Cited

OTHER PUBLICATIONS

Gesturetek Health, St. Joseph's Health Centre—Just for Kids Clinic on Vimeo. Published Jun. 10, 2016. Available at https://vimeo.com/170179285. (Acquired Sep. 8, 2017).
Gesturetek Health, Virtual Healing on The Doctors on Vimeo. Published Jun. 7, 2016. Available at https://vimeo.com/169727480. (Acquired Sep. 8, 2017).
Gesturetek Health, Virtual Therapy CBC News on Vimeo. Published Jun. 9, 2016. Available at https://vimeo.com/170041354. (Acquired Sep. 8, 2017).
Heptasense, Hand tracking + gesture recognition using a webcam [old demo]—YouTube. Published Nov. 15, 2016. Available at https://www.youtube.com/watch?time_continue=26 &v=fW-WTinfMVgw. (Acquired Sep. 8, 2017).
Heptasense, Universal motion and gesture controller for VR (smartphone)—YouTube. Published Nov. 12, 2016. Available at https://www.youtube.com/watch?time_continue=5&v=1C5OQV4G-us. (Acquired Sep. 8, 2017).
Liater, liateR at China Hi Tech Fair—YouTube. Published Dec. 20, 2016. Available at https://www.youtube.com/watch?v=et68tGIPj7k. (Acquired Sep. 6, 2017).
Liater, liateR | Interactive Retail shopping. Available at http://liater.co/. (Retrieved Sep. 6, 2017).
Liater, The future of shopping—liateR—YouTube. Published Nov. 7, 2014. Available at https://www.youtube.com/watch?v=6ZCdsTs0uNs. (Acquired Sep. 6, 2017).
LM3LABS, 3DFeel iPortrait on Vimeo. Published Jul. 22, 2014. Available at https://vimeo.com/101382464. (Acquired Sep. 6, 2017).
LM3LABS, AirStrike, the iron man experience on Vimeo. Published Oct. 18, 2010. Available at https://vimeo.com/15946888. (Acquired Sep. 6, 2017).
LM3LABS, Catchyoo Sunameri on Vimeo. Published Sep. 20, 2014. Available at https://vimeo.com/106663669. (Acquired Sep. 6, 2017).
LM3LABS, Interactive wood on Vimeo. Published Jan. 13, 2012. Available at https://vimeo.com/34996253. (Retrieved Sep. 6, 2017).
LM3LABS, iTable32 picture selection on Vimeo. Published Apr. 26, 2012. Available at https://vimeo.com/41122756. (Retrieved Sep. 6, 2017).
LM3LABS, Moovaction multitouch finger tracking software | LM3LABS—website. Available at https://www.lm3labs.com/technologies-2/moovaction/. (Retrieved Sep. 6, 2017).
LM3LABS, multitouch interactive table | LM3LABS—website. Available at https://www.lm3labs.com/technologies-2/itable-32/. (Retrieved Sep. 6, 2017).
LM3LABS, The Samurai Avatar on Vimeo. Published Jul. 22, 2011. Available at https://vimeo.com/26754982. (Acquired Sep. 6, 2017).
LM3LABS, touchless overlay for large surface display | LM3LABS—website. Available at https://www.lm3labs.com/technologies-2/ubiqwindow/. (Retrieved Sep. 6, 2017).
Xloudia—website. Available at https://www.xloudia.com/. (Retrieved Sep. 6, 2017).
Macon, Gesture Call Tutorial—YouTube. Published Oct. 7, 2014. Available at https://www.youtube.com/watch?v=BN3HH9F-gs8 &feature=youtu.be. (Aquired Sep. 8, 2017).
Macron, Macron's Gesture-Based Soltion—Solutions Smart Display—website. Available at https://www.macrongesture.com/solution_02.html. (Retrieved Sep. 8, 2017).
Macron, Macron's Gesture-Based Soltion—Solutions Digital Signage—website. Available at http://www.macrongesture.com/solution_03.html. (Retrieved Sep. 8, 2017).
Macron, Macron'S Gesture-Based Solution—Macron's Gesture Recognition—website. Available at http://www.macrongesture.com/news.php?board_name=news. (Retrieved Sep. 8, 2017).
Macron, Virtual Mouse for PC—YouTube. Published Dec. 18, 2013. Available at https://www.youtube.com/watch?v=ep9ulrD8DYE &feature=youtu.be. (Acquired Sep. 8, 2017).
Macron, Virtual Mouse for Smart TV. Published Dec. 18, 2013. Available at https://www.youtube.com/watch?v=7J7u6I8JbK8 &feature=youtu.be. (Acquired Sep. 8, 2017).

Geektime, Pebbles Interfaces—YouTube. Published May 11, 2015. Available at https://www.youtube.com/watch?v=96orf5sgBXc. (Acquired Sep. 7, 2017).
Poikos, Poikos Body Imaging and Measurement—YouTube. Published Jun. 22, 2012. Available at https://www.youtube.com/watch?v=AM8RYryOdTE. (Retrieved Sep. 8, 2017).
Swinguru, Chloe Leurquin—Swinguru Pro Presentation—YouTube. Published Nov. 25, 2014. Available at https://www.youtube.com/watch?v=M3tbobua-_E. (Retrieved Sep. 8, 2017).
Usens, Inc, Fingo demo: Grab and throw—YouTube. Published Aug. 1, 2016. Available at https://www.youtube.com/watch?v=ul97NtJYHRc. (Acquired Sep. 8, 2017).
Usens, Inc, Fingo Demo: Stick—YouTube. Published Aug. 1, 2016. Available at https://www.youtube.com/watch?v=vFZ_sm -Icno. (Acquired Sep. 8, 2017).
Stone, A et al, Teaching Compositionality to CNNs, (Submitted on Jun. 14, 2017), acquired Sep. 8, 2017 from https://arxiv.org/abs/1706.04313.
Kansky, K et al, Schema Networks: Zero-shot Transfer with a Generative Causal Model of Intuitive Physics, (Submitted on Jun. 14, 2017), acquired Sep. 8, 2017 from https://arxiv.org/abs/1706.04317.
Vicarious, Vicarious | Blog—website. Available at https://www.vicarious.com/general-game-playing-with-schema-networks.html. (Retrieved Sep. 6, 2017).
Vicarious, Vicarious | Home | AI for the robot age—website. Available at https://www.vicarious.com/. (Retrieved Sep. 6, 2017).
XYZ Interactive, Home—sensors by xyz interactive—website. Available at http://www.xyzinteractive.com/. (Retrieved Sep. 11, 2017).
Youspace, Inc., Tech Field Trip Presentation. Jun. 13, 2017; 18 Pages.
Oak Labs, Inc., The Oak Interactive Fitting Room—Vimeo, Published Oct. 8, 2015. Available at https://vimeo.com/141758597. (Retrieved Sep. 4, 2017).
Memomi Labs Inc, Live with Channel 9 Australia—Vimeo, Published May 28, 2015. Available at https://vimeo.com/129075274. (Retrieved Sep. 4, 2017).
Memomi Labs Inc, MemoMi @ CNBC Jun. 2015—Vimeo, Published Jun. 11, 2015. Available at https://vimeo.com/130502071. (Retrieved Sep. 4, 2017).
Memomi Labs Inc, MemoMi Eyewear on Channel 10 Australia—Vimeo, Published Jul. 24, 2016. Available at https://vimeo.com/176075233. (Retrieved Sep. 4, 2017).
Memomi Labs Inc, MemoMi @ Intel CEO Keynote—Vimeo, Published Aug. 19, 2015. Available at https://vimeo.com/136731687. (Retrieved Sep. 4, 2017).
Memomi Labs Inc, MemoMi NRF 2014 @ Intel Channel—Vimeo, Published Feb. 3, 2014. Available at https://vimeo.com/85788520. (Retrieved Sep. 4, 2017).
David Rose, MemoMi—Vimeo, Published Sep. 23, 2012. Available at https://vimeo.com/50027314. (Retrieved Sep. 4, 2017).
Memomi Labs Inc, MemoMi @ WSJ—Vimeo, Published May 11, 2015. Available at https://vimeo.com/127500728. (Retrieved Sep. 4, 2017).
Memomi Labs Inc, Memory Makeover™ Mirror—Vimeo, Published December Dec. 6, 2016. Available at https://vimeo.com/194615701. (Retrieved Sep. 4, 2017).
Memomi Labs Inc, Sunglass Memory Mirror®—Vimeo, Published Jul. 28, 2016. Available at https://vimeo.com/176675288. (Retrieved Sep. 4, 2017).
Memomi Labs Inc, Transparent Mirror—MemoMi x Corning—Vimeo, Published Apr. 7, 2016. Available at https://vimeo.com/161959806. (Retrieved Sep. 4, 2017).
Memomi Labs Inc, Turning colors . . . —Vimeo, Published Jan. 5, 2015. Available at https://vimeo.com/115948779. (Retrieved Sep. 4, 2017).
Memomi Labs Inc, Inventions—Vimeo, Published Nov. 8, 2016. Available at https://vimeo.com/190673032. (Retrieved Sep. 4, 2017).
Elizabeth Segran, Fast Company—Clothes Shopping Sucks. Reformation's High-Tech Store Reimagines It From The Ground Up, Available at https://www.fastcompany.com/3067979/. Published Feb. 13, 2017. (Retrieved Sep. 4, 2017).

(56) References Cited

OTHER PUBLICATIONS

INFO, A Simple Game, Available at https://www.youtube.com/watch?v=C8-oqlEmMAU. Published Mar. 13, 2013. (Retrieved Sep. 8, 2017).
ADMO, Website, Available at: http://admoexperience.github.io/index.html?wvideo=3kzosozp1p; http://admoexperience.github.io/source.html; http://admoexperience.github.io/tech.html. Retrieved Sep. 8, 2017.
INDO, Apple App—Youtube, Published Feb. 3, 2014. Available at: https://www.youtube.com/watch?v=nL5GEhCpl24. (Retrieved Sep. 8, 2017).
INFO, Flight Centre App, Published Feb. 4, 2014. Available at https://www.youtube.com/watch?v=S63JblHbB0s. (Retrieved Sep. 8, 2017).
INFO, Flying around Google Earth with Admo, Published Sep. 17, 2013. Available at https://www.youtube.com/watch?v=MBZIsfZ4HU4. (Retrieved Sep. 8, 2017).
INFO, Friday Showcase—Build Your Own Deal, Published Sep. 30, 2013. Available at https://www.youtube.com/watch?v=z-tuDmKtuPg. (Retrieved Sep. 8, 2017).
INFO, HP Store—Case study, Published Sep. 20, 2013. Available at https://www.youtube.com/watch?v=r4jkc7KcyY8. (Retrieved Sep. 8, 2017).
INFO, HP Store Walkthrough, Published Sep. 13, 2013. Available at https://www.youtube.com/watch?v=h_ANfHpEXiw. (Retrieved Sep. 8, 2017).
INFO, Admo Info Youtube Channel, Published Feb. 21, 2013. Available at https://www.youtube.com/channel/UCMosVez9g2xMJP3ZB3mpErw. (Retrieved Sep. 8, 2017).
INFO, Admo in Action (Google, Flight Centre and HP Store), Published Sep. 19, 2013. Available at https://www.youtube.com/watch?v=4mTruwUjcK4&feature=youtu.be. (Retrieved Sep. 8, 2017).
INFO, Mobile App, Published Feb. 3, 2014. Available at https://www.youtube.com/watch?v=5juFiQTbU-A. (Retrieved Sep. 8, 2017).
INFO, Music Moods Experience (screencapture), Published May 6, 2013. Available at https://www.youtube.com/watch?v=r4AFLU_XVHo. (Retrieved Sep. 8, 2017).
INFO, Real Estate App, Published Feb. 3, 2014. Available at https://www.youtube.com/watch?v=8SvTIIWHCx0. (Retrieved Sep. 8, 2017).
INFO, Trace the shapes game, Published Sep. 17, 2013. Available at https://www.youtube.com/watch?v=aeaaCQIODYk. (Retrieved Sep. 8, 2017).
AIMIRRORBCN, aiMirror at Bloomberg, Published Jul. 26, 2012. Available at https://www.youtube.com/watch?v=VoPdNMJ3FLQ. (Retrieved Sep. 6, 2017).
AIMIRRORBCN, aiMirror: The Smart Shopping experience, Published Jul. 26, 2012. Available at https://www.youtube.com/watch?v=_pwFZEG2hj8. (Retrieved Sep. 6, 2017).
Ádám Horváth, Fitnect—Interactive Virtual Fitting . . . , Published Aug. 8, 2011. Available at https://www.youtube.com/watch?v=1jbvnk1T4vQ . (Retrieved Oct. 4, 2017).
Ádám Horváth, Fitnect—CIB, Published Nov. 25, 2015. Available at https://www.youtube.com/watch?v=k06gvSzrsdw. (Retrieved Sep. 10, 2017).
FXGear, FXMirror 3D Virtual Fitting Solution, Published Feb. 3, 2015. Available at https://www.youtube.com/watch?v=nWcGhuX6N7w. (Retrieved Sep. 10, 2017).
ARDOORMoscow, Kinect Fitting Room for Topshop, Published May 10, 2011. Available at https://www.youtube.com/watch?v=L_cYKFdP1_0. (Retrieved Sep. 10, 2017).
IMGSRCinc, Puma Store Harajuku Interactive Mirror®, Published Mar. 3, 2011. Available at https://www.youtube.com/watch?v=_X2-_t5f_Ia. (Retrieved Sep. 10, 2017).
SenseMi—Sense Mirror, SenseMi Virtual Dressing Room, Published May 4, 2017. Available at https://www.youtube.com/watch?v=0Nh6eEjBal8. (Retrieved Sep. 10, 2017).
Unreal Engine 4—Augmented Reality Virtual Mirror Test, Published Mar. 17, 2016. Available https://www.youtube.com/watch?v=zT_emXRZ5iA&feature=youtu.be. Retrieved (Oct. 1, 2017).
UNREAL4MIRROR website, available at http://unreal4mirror.com/. Retrieved (Sep. 10, 2017).
End Point Liquid Galaxy, Youtube Video Webpage, Published Jul. 30, 2013. Available at https://www.youtube.com/channel/UCf6FHharf_oTy3jW8YmdbdA. (Retrieved Sep. 8, 2017).
Engadget, Skydiving across seven instances of Chrome | Google I/O 2013—YouTube, Published May 15, 2013. Available at https://www.youtube.com/watch?v=wL7J-gwemvOQ. (Retrieved Sep. 8, 2017).
Talkandroid, Hands on with Map Diving at Google I/O—YouTube, Published May 15, 2013. Available at https://www.youtube.com/watch?v=uHGXP7-4wqU. (Retrieved Sep. 8, 2017).
End Point Liquid Galaxy, Leap Motion and Liquid Galaxy, Published Oct. 9, 2013. Available at https://www.youtube.com/watch?v=WAvfPkWtPV0. (Retrieved Sep. 8, 2017).
End Point Liquid Galaxy, Liquid Galaxy for Science Centers, Published Nov. 1, 2016. Available at https://www.youtube.com/watch?v=Lcgu1XIMj-8. (Retrieved Sep. 8, 2017).
End Point Liquid Galaxy, Liquid Galaxy on SciTech Now, Published Jun. 23, 2016. Available at https://www.youtube.com/watch?v=aZxWTgR8w3U. (Retrieved Sep. 8, 2017).
Eyesight, About—eye-sight—website, Available at http://www.eyesight-tech.com/about/. (Retrieved Sep. 6, 2017).
Eyesight, Automotive—eye-sight—website, Available at http://www.eyesight-tech.com/product/automotive/. (Retrieved Sep. 6, 2017).
Eyesight, eye-sight—website, Available at http://www.eyesight-tech.com/. (Retrieved Sep. 6, 2017).
Eyesight, IOT & Smart Home—eye-sight—website, Available at http://www.eyesight-tech.com/product/iot-smart-home/. (Retrieved Sep. 6, 2017).
Jamie Shotton, et al., Real-Time Human Pose Recognition in Parts from Single Depth Images, Proceedings of CVPR, Jun. 2011, IEEE, United States.
Jamie Shotton, et al., Efficient Human Pose Estimation from Single Depth Images, Trans. PAMI, 2012, IEEE, United States.
LIBSVM Tools, Available at https://www.csie.ntu.edu.tw/~cjlin/libsvmtools/. (Retrieved Feb. 6, 2017).
LIBLINEAR—A Library for Large Linear Classification. Available at https://www.csie.ntu.edu.tw/~cjlin/liblinear/. (Retrieved Feb. 6, 2017).
Ren, Shaoqing, et al. "Global refinement of random forest." 2015. Available at http://www.cv-foundation.org/openaccess/content_cvpr2015/papers/Ren_Global_Refinement_of_2015_CVPR_paper.pdf. (Retrieved on Feb. 8, 2017).
Leo Breiman, Random Forests. 2001. Available at https://www.stat.berkeley.edu/~breiman/randomforest2001.pdf. (Retrieved Feb. 8, 2017).
Chih-Chung Chang, et al., LIBSVM: A Library for Support Vector Machines. 2011. Available at http://www.csie.ntu.edu.tw/~cjlin/papers/libsvm.pdf. (Retrieved Feb. 8, 2017).
Dong Chen, et al., Blessing of Dimensionality: High-dimensional Feature and Its Efficient Compression for Face Verification. 2013. Available at http://jiansun.org/papers/CVPR13_HighDim.pdf. (Retrieved Feb. 8, 2017).
Simon Bernard, et al., Dynamic Random Forests. 2012. Available at https://hat.archives-ouvertes.fr/hal-00710083/document. (Retrieved Feb. 8, 2017).
Simon Bernard, et al., Forest-RK: A New Random Forest Induction Method. 2009. Available at https://hal.archives-ouvertes.fr/hal-00436367/document. (Retrieved Feb. 8, 2017).
Juergen Gall, et al., Class-Specific Hough Forests for Object Detection. 2009. Available at http://projectsweb.cs.washington.edu/research/insects/CVPR2009/objdetrec/hughforest_objdetect.pdf. (Retrieved Feb. 8, 2017).
Manish Mehta, et al., MDL-based Decision Tree Pruning. 1995. Available at https://www.aaai.org/Papers/KDD/1995/KDD95-025.pdf. (Retrieved Feb. 8, 2017).
Rong-En Fan, et al., LIBLINEAR: A Library for Large Linear Classification. 2008. Available at http://www.csie.ntu.edu.tw/~cjlin/papers/liblinear.pdf. (Retrieved Feb. 8, 2017).
Y. Amit and D. Geman, Shape quantization and recognition with randomized trees. 1996. Available at http://www.wisdom.weizmann.ac.il/~vision/courses/2003_2/shape.pdf. (Retrieved Feb. 23, 2017).

(56) References Cited

OTHER PUBLICATIONS

R. Quinlan, Induction of decision trees. 1986. Available at http://hunch.net/~coms-4771/quinlan.pdf. (Retrieved Feb. 23, 2017).
B. A. Shepherd, An appraisal of a decision tree approach to image classification. 1983. Available at https://pdfs.semanticscholar.org/98e4/5102842acb101d66dc53dc898877d34a54b8.pdf. (Retrieved Feb. 23, 2017).
K. K. Biswas et al., "Gesture Recognition Using Microsoft Kinect®". 2011. Available at http://ai2-s2-pdfs.s3.amazonaws.com/92b4/c8655484b603e33aea87e90ba598989ce069.pdf (Retrieved Jul. 5, 2017).
International Search Report & Written Opinion, PCT/US2017/027449; dated Jun. 27, 2017; 24 Pages.
International Search Report & Written Opinion, PCT/US2017/027371; dated Jul. 7, 2017; 24 Pages.
Microsoft, Inc., Kinect for Windows—Human Interface Guidelines v2.0, Available at http://download.microsoft.com/download/6/7/6/676611B4-1982-47A4-A42E-4CF84E1095A8/KinectHIG.2.0.pdf (retrieved Jun. 29, 2018).
Apple, Inc., Handling_Swipe_Gestures_Apple, Available at https://developer.apple.com/documentation/uikit/touches_presses_and_gestures/handling_uikit_gestures/handling_swipe_gestures (retrieved Jun. 29, 2018).
Li et al., "Action recognition based on a bag of 3D points", Jun. 13-18, 2010, 2010 IEEE Computer Society Conference on Computer Vision and Pattern Recognition—Workshops, CVPRW 2010, pp. 9-14 (Year: 2010).
U.S. Appl. No. 15/018,048, filed Feb. 8, 2016.
U.S. Appl. No. 15/018,303, filed Feb. 8, 2016.
U.S. Appl. No. 15/369,799, filed Dec. 5, 2016.
U.S. Appl. No. 15/486,218, filed Apr. 12, 2017.
U.S. Appl. No. 15/478,209, filed Apr. 3, 2017.
PCT/US17/27371, Apr. 13, 2017.
PCT/US17/27449, Apr. 13, 2017.

* cited by examiner

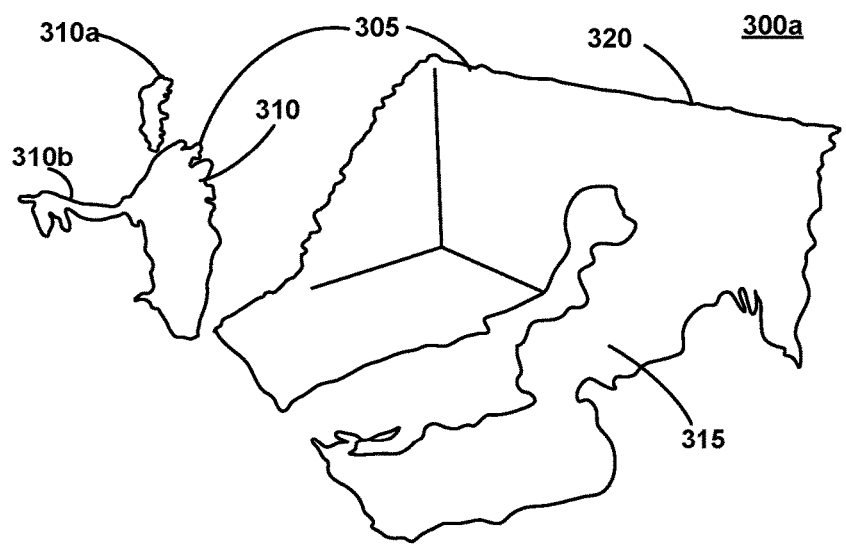
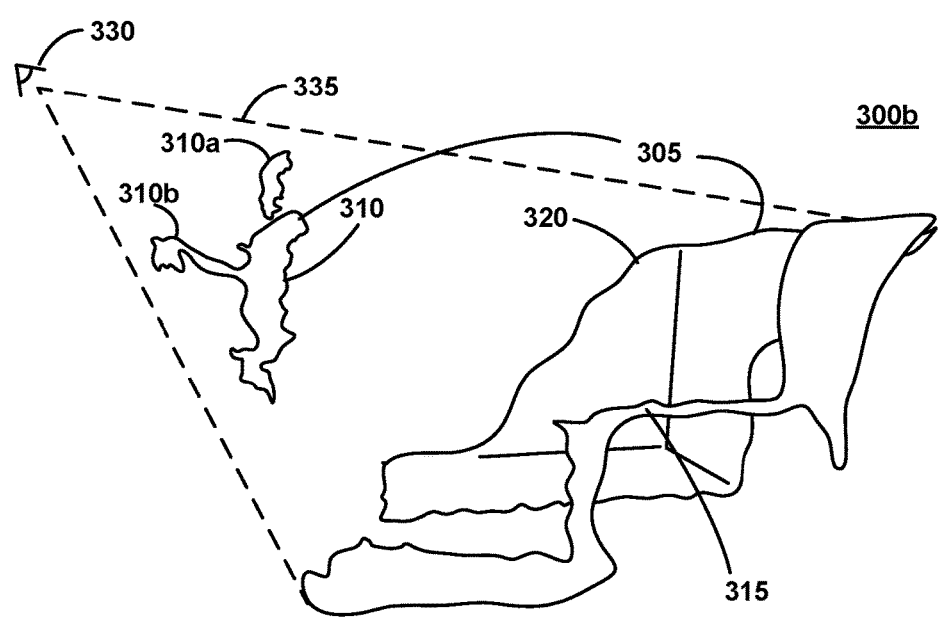
FIG. 3

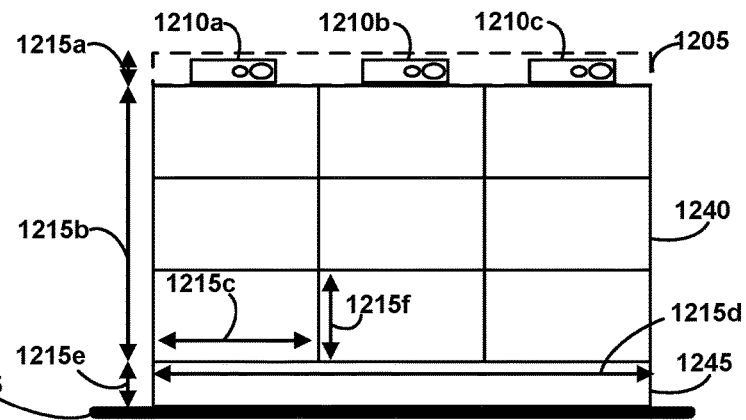
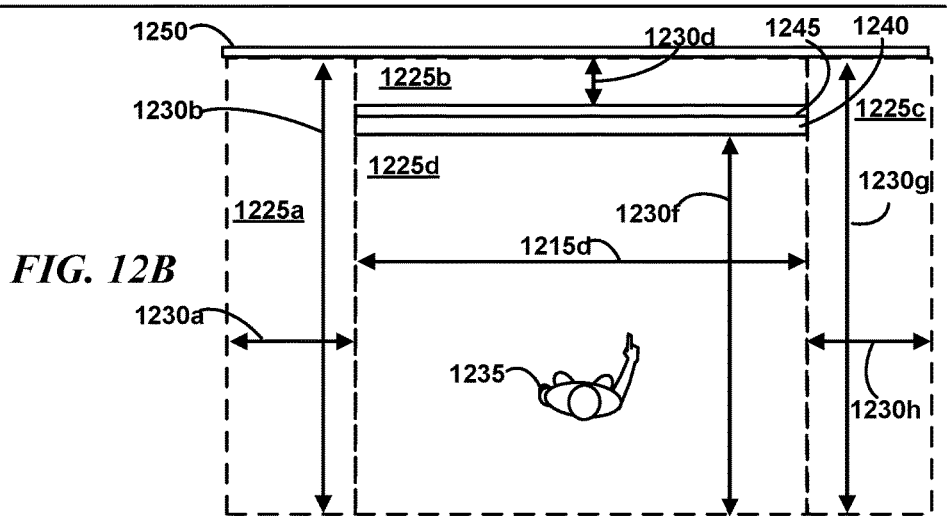
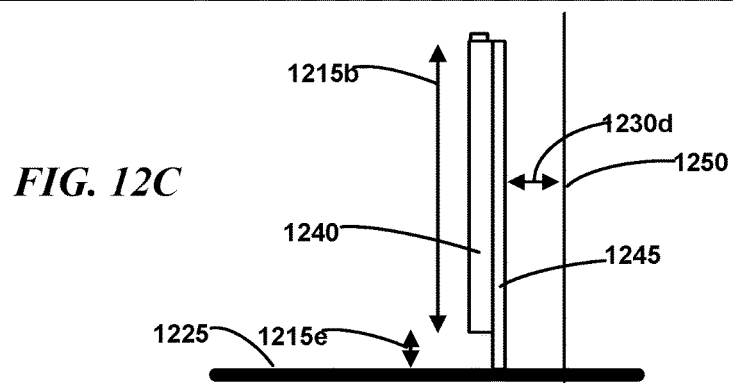
FIG. 12A
FIG. 12B
FIG. 12C

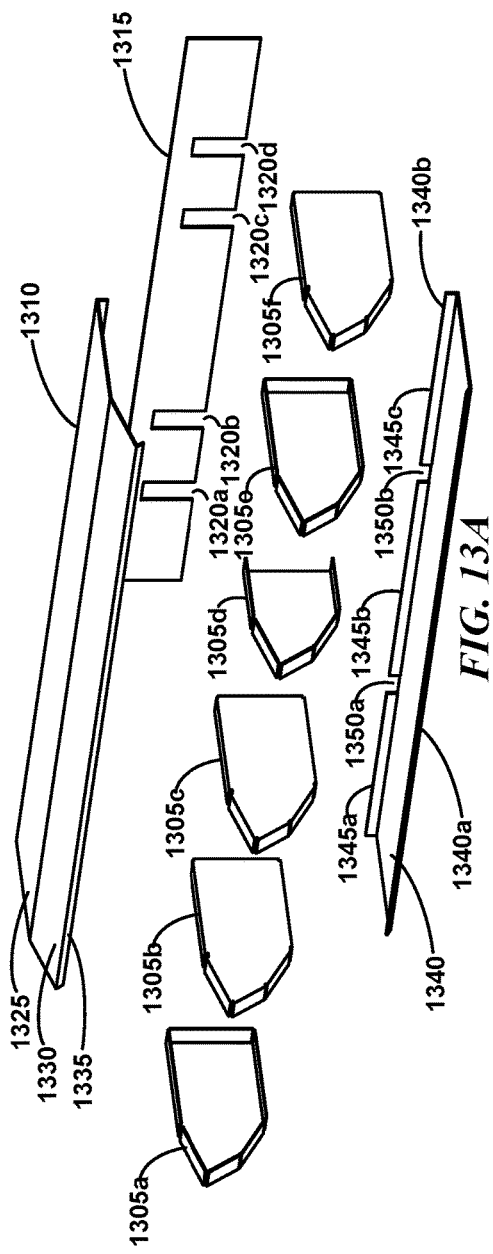
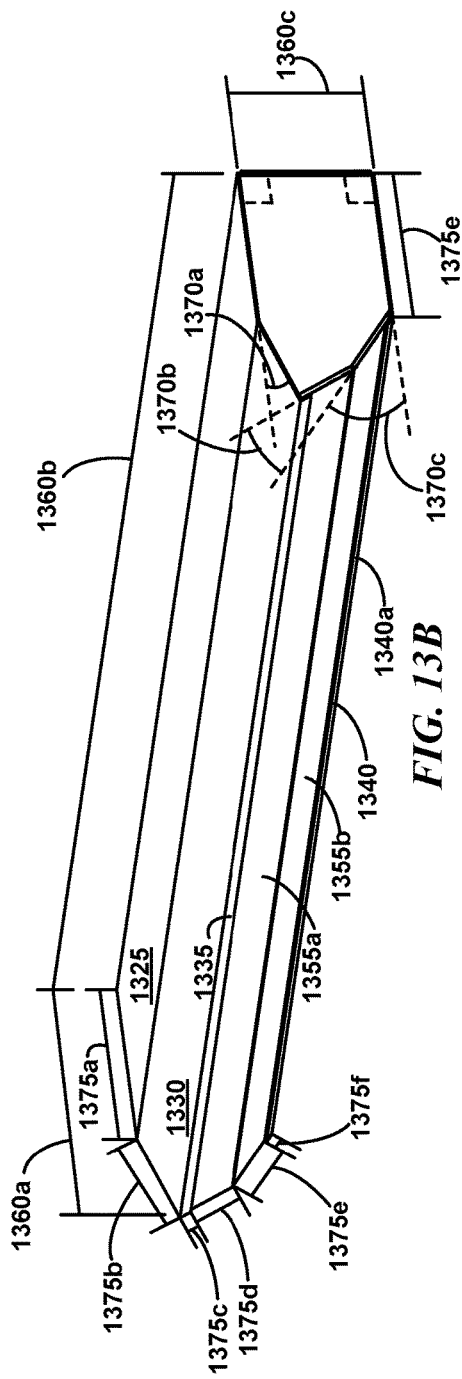
FIG. 13A
FIG. 13B

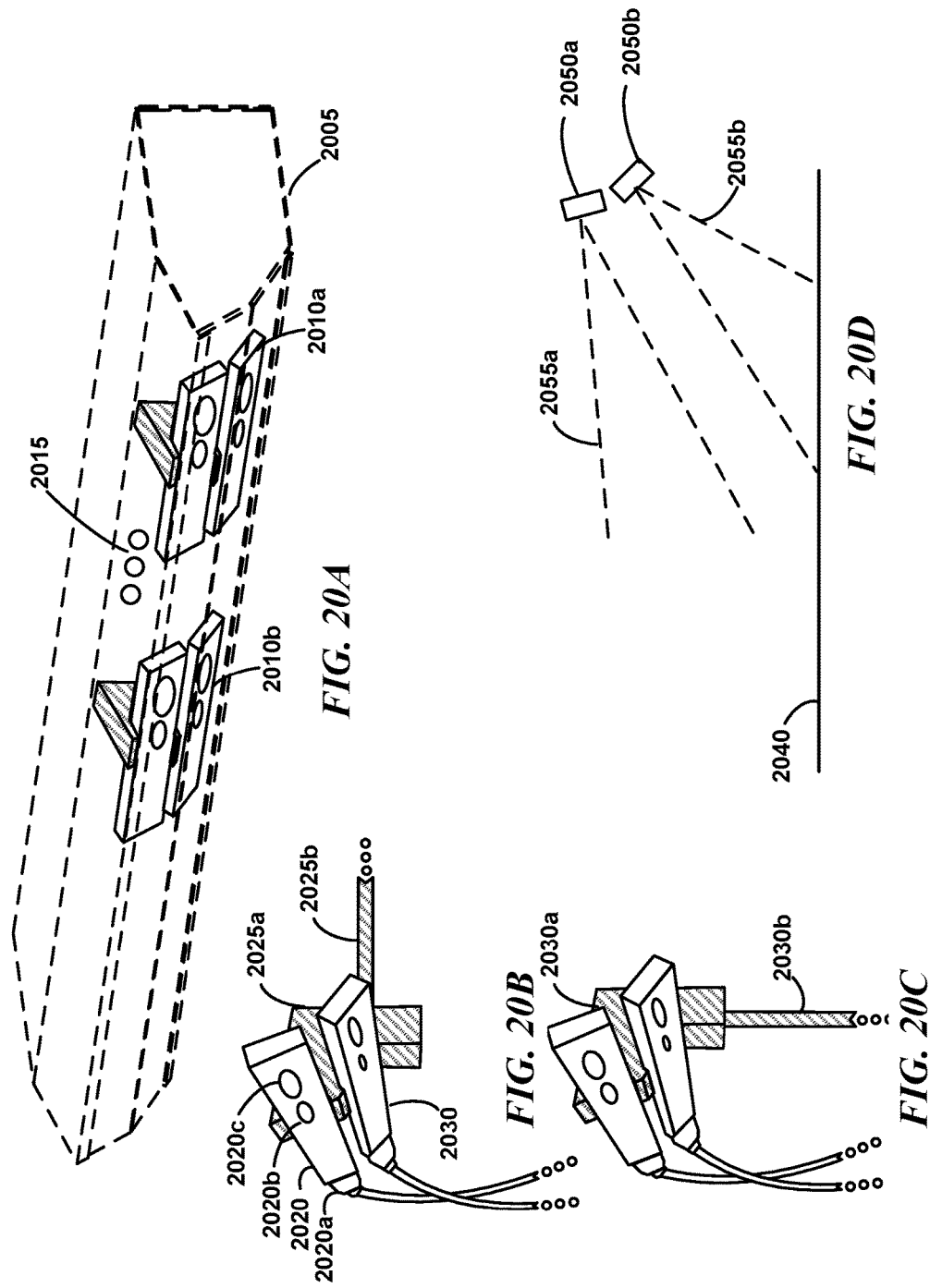

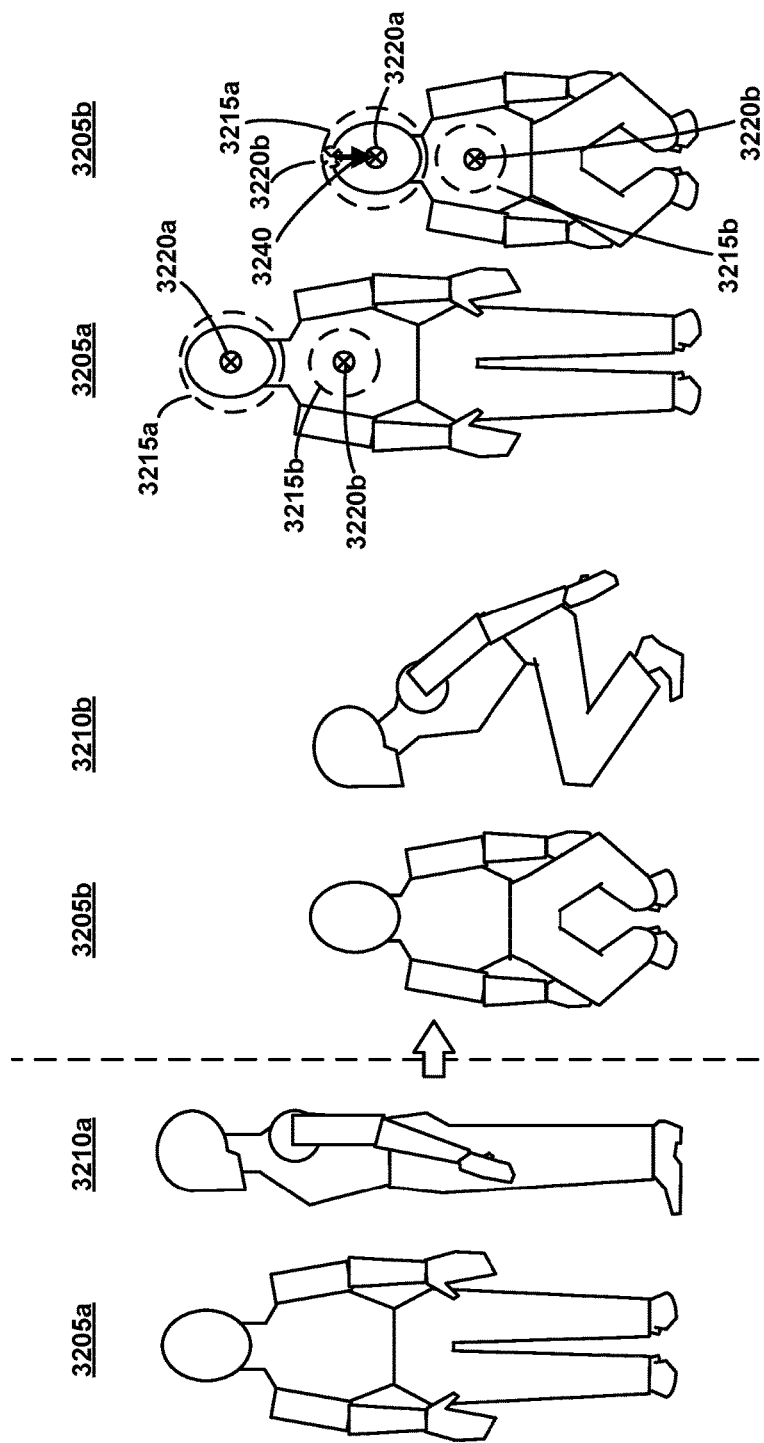

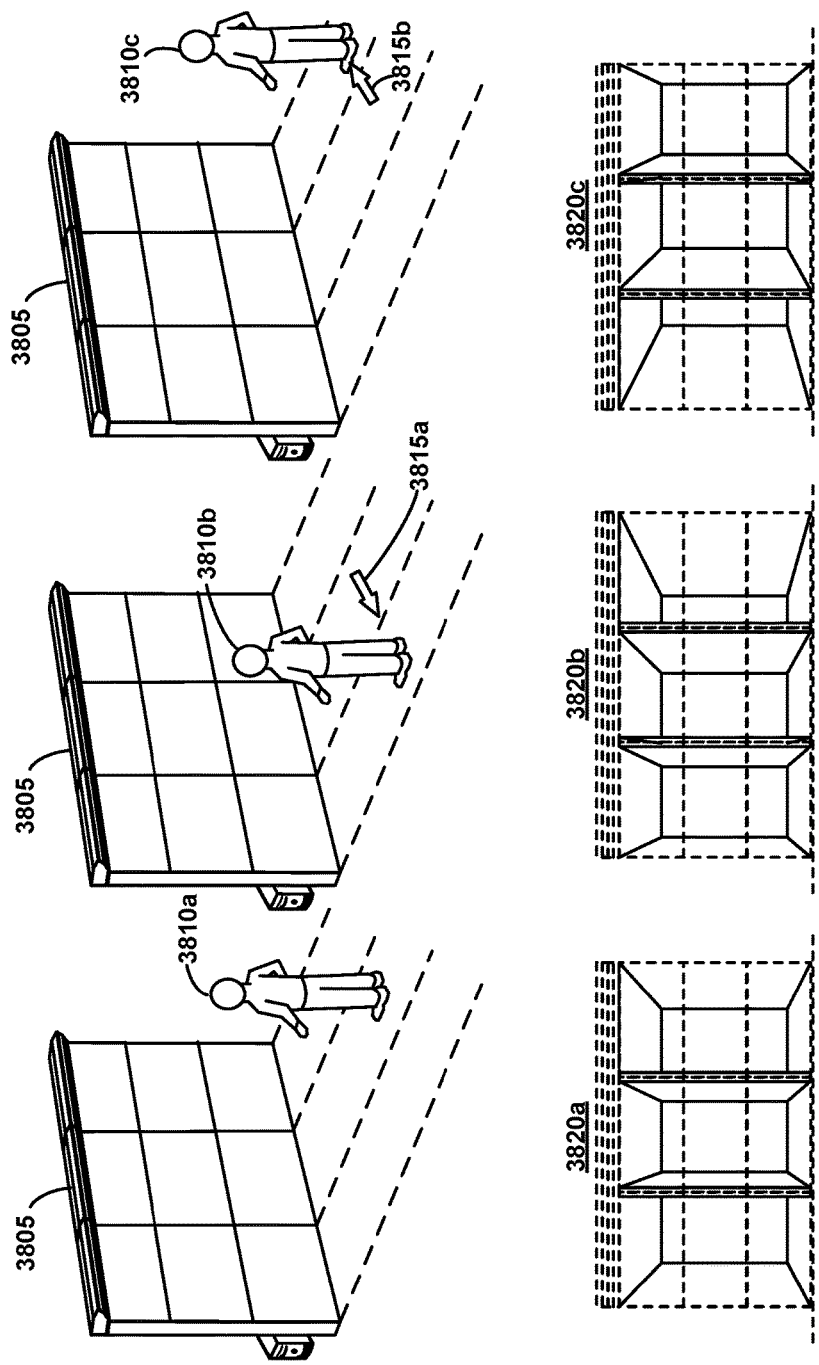

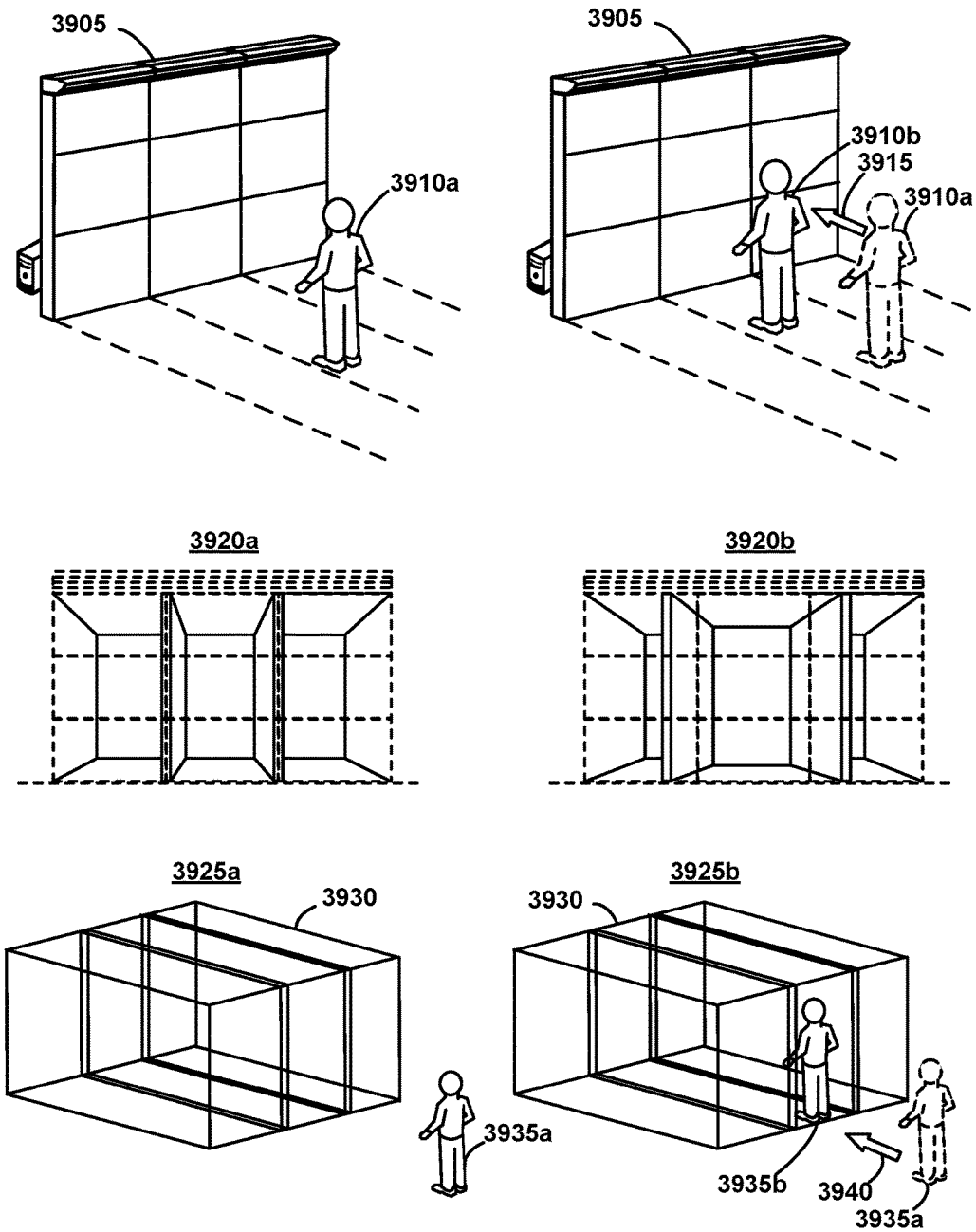
*FIG. 39A*        *FIG. 39B*

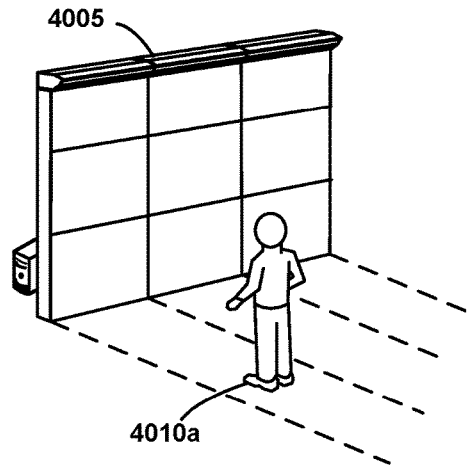
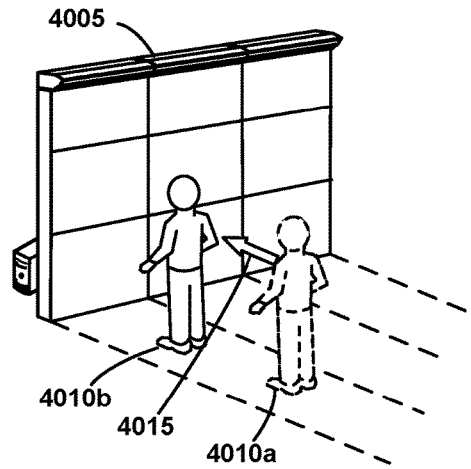
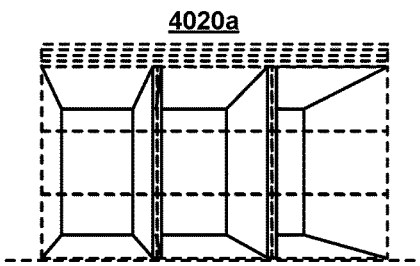
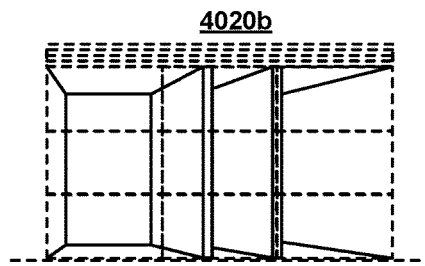
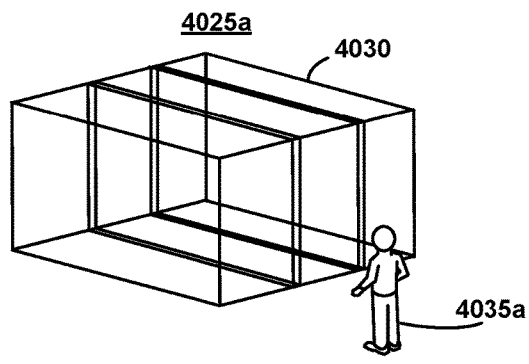
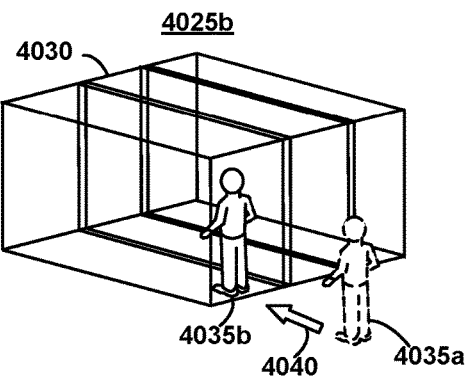
*FIG. 40A*            *FIG. 40B*

SYSTEMS AND METHODS FOR GESTURE-BASED INTERACTION

TECHNICAL FIELD

Various of the disclosed embodiments relate to optimizations and improvements for depth-based human-computer interactions.

BACKGROUND

Human-computer interaction (HCI) systems are becoming increasingly prevalent in our society. With this increasing prevalence has come an evolution in the nature of such interactions. Punch cards have been surpassed by keyboards, which were themselves complemented by mice, which are themselves now complemented by touch screen displays, etc. Various machine vision approaches may even now facilitate visual, rather than the mechanical, user feedback. Machine vision allows computers to interpret images from their environment to, e.g., recognize users' faces and gestures. Some machine vision systems rely upon grayscale or RGB images of their surroundings to infer user behavior. Some machine vision systems may also use depth-based sensors, or rely exclusively upon depth based sensors, to recognize user behavior (e.g., the Microsoft Kinect™, Intel RealSense™, Apple PrimeSense™, Structure Sensor™ Velodyne HDL-32E LiDAR™, Orbbec Astra™, etc.).

Interaction with depth-based user interface systems can seem unnatural for many users. This discomfort may be especially acute when the system fails to provide an immersive visual experience in association with natural and fluid gesture motions. Accordingly, there is a need for improved depth-based interfaces that both accommodate user expectations and typical user motions. Such systems may also need to serve as general purpose platforms from which developers may implement their own, custom applications.

BRIEF DESCRIPTION OF THE DRAWINGS

Various of the embodiments introduced herein may be better understood by referring to the following Detailed Description in conjunction with the accompanying drawings, in which like reference numerals indicate identical or functionally similar elements:

FIG. 3 is a series of perspective and side views of example depth data as may be used in some embodiments;

FIG. 12A is a head-on schematic view of the composite display with a multi-angled depth sensor housing of FIG. 10 as may be implemented in some embodiments; FIG. 12B is a top-down schematic view of the composite display with a multi-angled depth sensor housing of FIG. 10 as may be implemented in some embodiments; FIG. 12C is a side schematic view of the composite display with a multi-angled depth sensor housing of FIG. 10 as may be implemented in some embodiments;

FIG. 13A is an exploded, schematic view of components in the frame of a multi-angled depth sensor housing, as may be implemented in some embodiments; FIG. 13B is an assembled schematic view of components in the frame of a multi-angled depth sensor housing, as may be implemented in some embodiments;

FIG. 20A is a "see-through" view of a housing frame of a multi-angled depth sensor housing comprising depth sensors attached via "standalone mounts", rather than brackets, as may be implemented in some embodiments; FIG. 20B is a schematic view of a horizontal sensor mount as may be implemented in some embodiments; FIG. 20C is a schematic view of a vertical sensor mount as may be implemented in some embodiments; FIG. 20D is a schematic view of a the varied depth region fields of view achieved using a sensor mount of FIG. 20B or FIG. 20C as may occur in some embodiments;

FIG. 32A is a series of schematic front and side views of steps in a "crouch" gesture, as may occur in some embodiments; FIG. 32B is a frontal and overhead schematic view of various correspondences as may be used to detect the "crouch" gesture of FIG. 32A in some embodiments;

FIG. 38A is a schematic view of a user at a center position before an interface system running a dynamic vanishing point selection menu and the corresponding user view, as may be implemented in some embodiments; FIG. 38B is a schematic view of a user at a left position before an interface system running a dynamic vanishing point selection menu and the corresponding user view, as may be implemented in some embodiments; FIG. 38C is a schematic view of a user at a right position before an interface system running a dynamic vanishing point selection menu and the corresponding user view, as may be implemented in some embodiments;

FIG. 39A is a schematic view of a user at a first position before engaging a contextual focus feature at the center of the user interface and the resulting display, as may be implemented in some embodiments; FIG. 39B is a schematic view of a user at a second position after engaging a contextual focus feature at the center of the user interface and the resulting change in display, as may be implemented in some embodiments;

FIG. 40A and 40B are schematic views of the contextual focus feature of the user interface of FIG. 39 and resulting display changes, before and after engagement, but at the side of the user interface, rather than the center of the user interface, as may occur in some embodiments;

Figure 1:
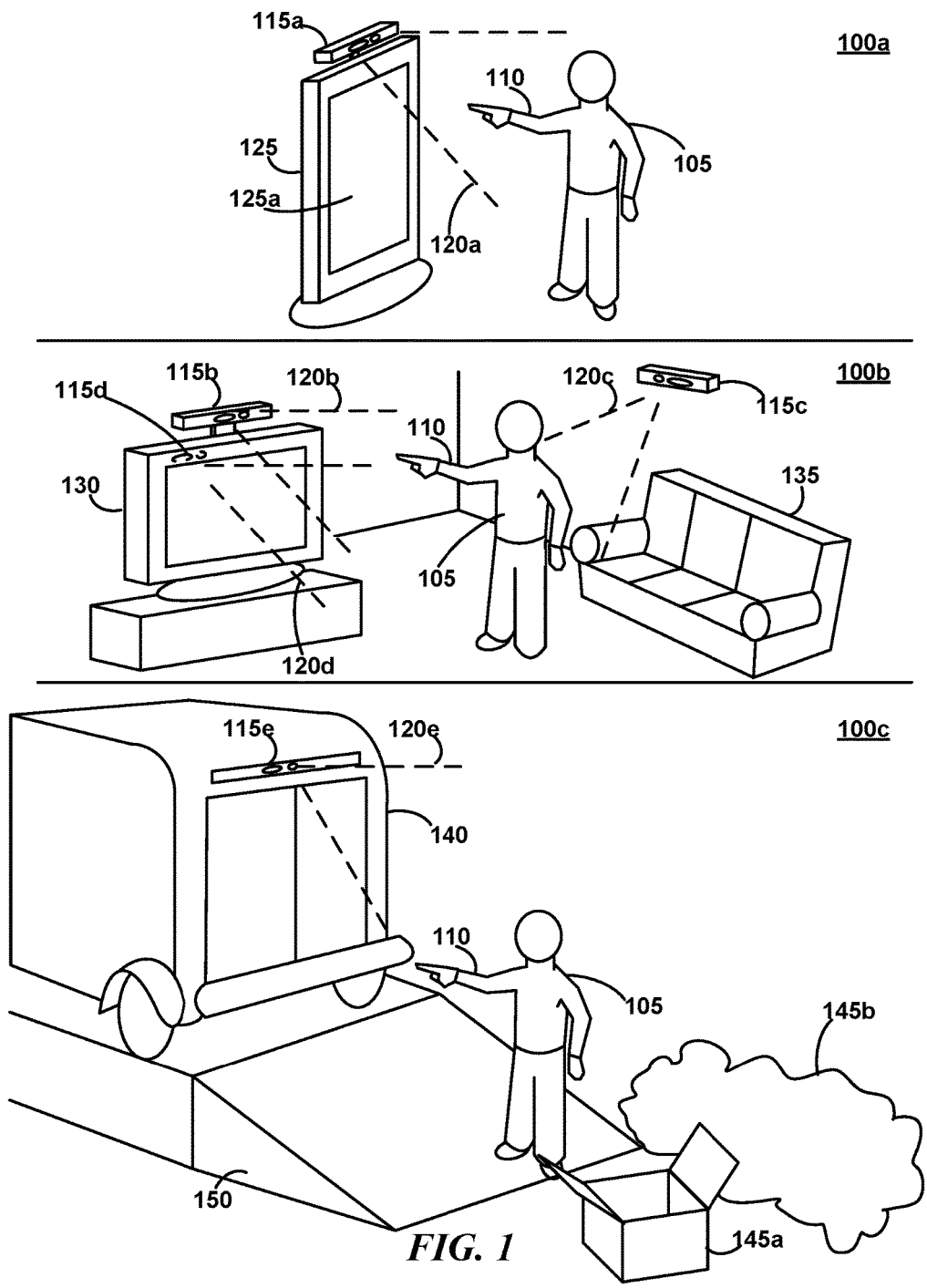
FIG. 1 is a series of use case diagrams illustrating various situations in which various of the disclosed embodiments may be implemented.

The specific examples depicted in the drawings have been selected to facilitate understanding. Consequently, the disclosed embodiments should not be restricted to the specific details in the drawings or the corresponding disclosure. For example, the drawings may not be drawn to scale, the dimensions of some elements in the figures may have been adjusted to facilitate understanding, and the operations of the embodiments associated with the flow diagrams may encompass additional, alternative, or fewer operations than those depicted here. Thus, some components and/or operations may be separated into different blocks or combined into a single block in a manner other than as depicted. The intention is not to limit the embodiments to the particular examples described or depicted. On the contrary, the embodiments are intended to cover all modifications, equivalents, and alternatives falling within the scope of the disclosed examples.

DETAILED DESCRIPTION

Example Use Case Overview

Various of the disclosed embodiments may be used in conjunction with a mounted or fixed depth camera system to detect, e.g. user gestures. FIG. 1 is a series of use case diagrams illustrating various situations 100a-c in which various of the disclosed embodiments may be implemented. In situation 100a, a user 105 is standing before a kiosk 125 which may include a graphical display 125a. Rather than requiring the user to physically touch items of interest on the display 125a the system may allow the user to "point" or "gesture" at the items and to thereby interact with the kiosk 125.

A depth sensor 115a may be mounted upon or connected to or near the kiosk 125 so that the depth sensor's 115a field of depth capture 120a (also referred to as a "field of view" herein) encompasses gestures 110 made by the user 105. Thus, when the user points at, e.g., an icon on the display 125a by making a gesture within the field of depth data capture 120a the depth sensor 115a may provide the depth values to a processing system, which may infer the selected icon or operation to be performed. The processing system may be configured to perform various of the operations disclosed herein and may be specifically configured, or designed, for interfacing with a depth sensor (indeed, it may be embedded in the depth sensor). Accordingly, the processing system may include hardware, firmware, software, or a combination of these components. The processing system may be located within the depth sensor 115a, within the kiosk 125, at a remote location, etc. or distributed across locations. The applications running on the kiosk 125 may simply receive an indication of the selected icon and may not be specifically designed to consider whether the selection was made via physical touch vs. depth based determinations of the selection. Thus, the depth sensor 115a and the processing system may be an independent product or device from the kiosk 125 in some embodiments.

In situation 100b, a user 105 is standing in a domestic environment which may include one or more depth sensors 115b, 115c, and 115d each with their own corresponding fields of depth capture 120b, 120c, and 120d respectively. Depth sensor 115b may be located on or near a television or other display 130. The depth sensor 115b may be used to capture gesture input from the user 105 and forward the depth data to an application running on or in conjunction with the display 130. For example, a gaming system, computer conferencing system, etc. may be run using display 130 and may be responsive to the user's 105 gesture inputs. In contrast, the depth sensor 115c may passively observe the user 105 as part of a separate gesture or behavior detection application. For example, a home automation system may respond to gestures made by the user 105 alone or in conjunction with various voice commands. In some embodiments, the depth sensors 115b and 115c may share their depth data with a single application to facilitate observation of the user 105 from multiple perspectives. Obstacles and non-user dynamic and static objects, e.g. couch 135, may be present in the environment and may or may not be included in the fields of depth capture 120b, 120c.

Note that while the depth sensor may be placed at a location visible to the user 105 (e.g., attached on top or mounted upon the side of televisions, kiosks, etc. as depicted, e.g., with sensors 115a-c) some depth sensors may be integrated within another object. Such an integrated sensor may be able to collect depth data without being readily visible to user 105. For example, depth sensor 115d may be integrated into television 130 behind a one-way mirror and used in lieu of sensor 115b to collect data. The one-way mirror may allow depth sensor 115d to collect data without the user 105 realizing that the data is being collected. This may allow the user to be less self-conscious in their movements and to behave more naturally during the interaction.

While the depth sensors 115a-d may be positioned parallel to a wall, or with depth fields at a direction orthogonal to a normal vector from the floor, this may not always be the case. Indeed, the depth sensors 115a-d may be positioned at a wide variety of angles, some of which place the fields of depth data capture 120a-d at angles oblique to the floor and/or wall. For example, depth sensor 115c may be positioned near the ceiling and be directed to look down at the user 105 on the floor.

This relation between the depth sensor and the floor may be extreme and dynamic in some situations. For example, in situation 100c a depth sensor 115e is located upon the back of a van 140. The van may be parked before an inclined platform 150 to facilitate loading and unloading. The depth sensor 115e may be used to infer user gestures to direct the operation of the van (e.g., move forward, backward) or to perform other operations (e.g., initiate a phone call). Because the van 140 regularly enters new environments, new obstacles and objects 145a,b may regularly enter the depth sensor's 115e field of depth capture 120e. Additionally, the inclined platform 150 and irregularly elevated terrain may often place the depth sensor 115e, and corresponding field of depth capture 120e, at oblique angles relative to the "floor" on which the user 105 stands. Such variation can complicate assumptions made regarding the depth data in a static and/or controlled environment (e.g., assumptions made regarding the location of the floor).

Figure 2:
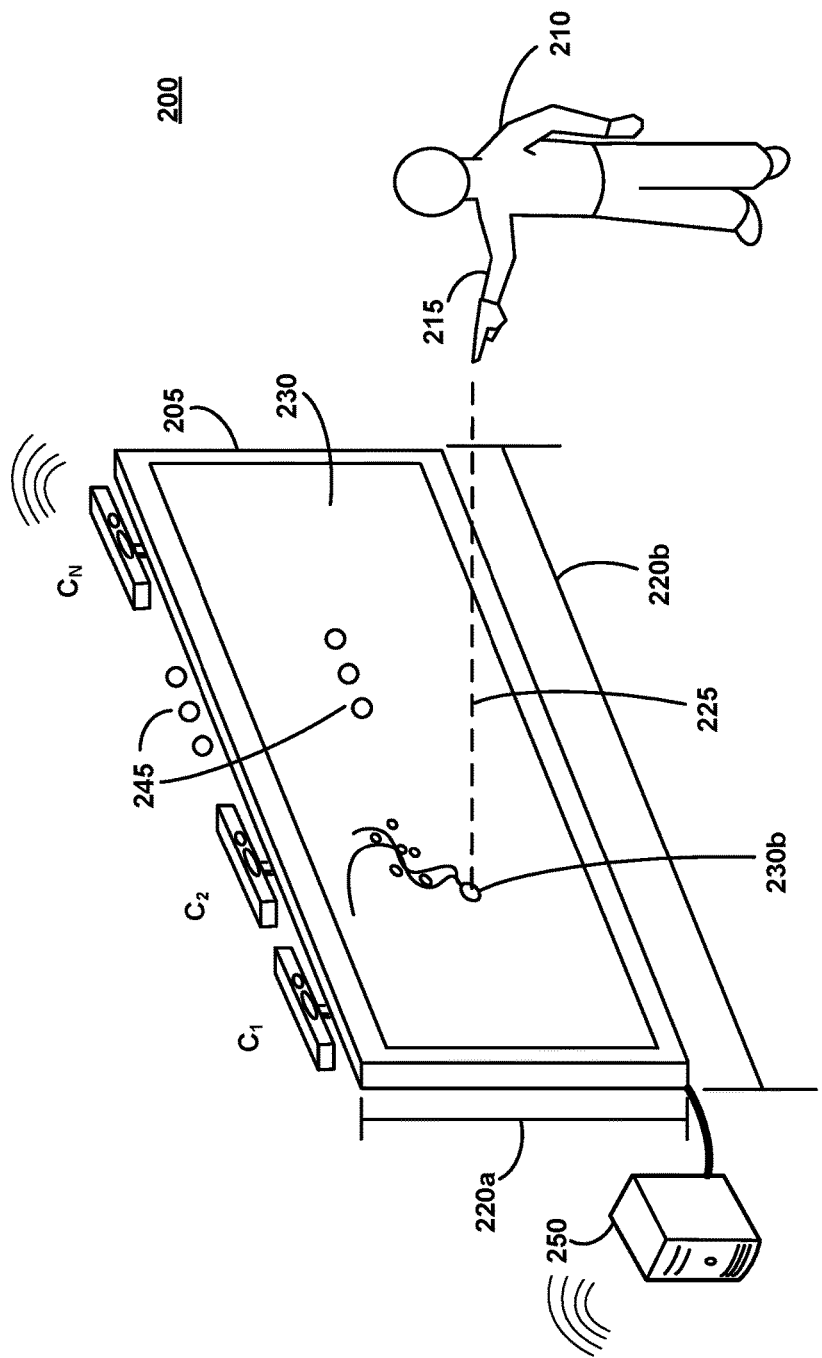
FIG. 2 is a perspective use case diagram illustrating an example user interaction with an example display structure as may occur in some embodiments.

Various of the disclosed embodiments contemplate user interactions with a feedback system comprising two or more depth sensors. The depth sensor devices may also include visual image sensors, e.g., RGB sensors, in some embodiments. For example, FIG. 2 is a perspective use case diagram illustrating an example user interaction 200 with an example display structure 205 as may occur in some embodiments. The display structure 205 may be placed in a mall, shopping center, grocery, check-in line, etc. In some embodiments, the height 220a is at least as large as a user 210 or slightly larger, e.g., 7-10 feet. The length 220b may be several times the user's 210 width, e.g., to facilitate an interaction as the user 210 walks the length of the display structure 205.

The example display structure 205 includes a screen 230. The screen 230 may comprise a single large screen, multiple smaller screens placed adjacent to one another, a projection, etc. In one example interaction, the user may gesture 215 at a portion of the screen and the system may present a visual feedback, such as a cursor 230b at a location corresponding to the gesture's projection 225 upon the screen. The display structure 205 may monitor the user's 210 movement and gestures using one or more of one or more depth sensors $C_1$, $C_2$, ..., $C_N$. In the example depicted in FIG. 2, at least three cameras are present. The ellipses 245 indicate that more than three cameras may be present in some embodiments, and the length 220b of the display structure 205 may be adjusted accordingly. In this example, the sensors are evenly spaced across the top of the display structure 205, though in some embodiments they may be unevenly spaced.

Though the terms "camera" and "sensor" may be used interchangeably in this application, one will recognize that the depth sensor need not be or facilitate the "camera capture" of optical images, e.g., RGB or grayscale images, though the depth sensor may additionally include that functionality. In some embodiments, the computer system 250 may take a variety of forms, e.g., a preprogrammed chip, circuit, Field Programmable Gate Array (FPGA), minicomputer, etc. One will recognize that "computer system", "processing system", and the like may be used interchangeably herein. Similarly, one will readily appreciate that the training system employed to create a system for recognizing gestures may, but need not be, the same system as the testing system that performs the on-site recognition. Accordingly, in some embodiments, the "system" may be a computer distinct from the interfaces of FIGS. 1 and 2, residing, e.g., off-site from where the in-situ classification occurs.

Example Depth Data

Analogous to common optical image cameras, depth sensors 115a-e, $C_1$, $C_2$, . . . , $C_N$ may capture individual "frames" of depth data over time. Each "frame" may comprise a collection of three-dimensional values for depths measured in the field of view (though one will readily recognize multiple ways to represent, e.g., a time of flight analysis for depth determination). These three-dimensional values may be represented, e.g., as points in three-dimensional space, as distances for rays emitted at various angles from the depth sensor, etc. FIG. 3 is a series of perspective 300a and side 300b views of example depth data 305 as may be used in some embodiments. In this example, a user is pointing at the depth sensor with his right hand while standing in front of a wall. A table to his left has also been captured in the field of view. Thus, depth values associated with the user 310 include a portion associated with the user's head 310a and a portion associated with the user's extended right arm 310b. Similarly, the background behind the user is reflected in the depth values 320, including those values 315 associated with the table.

To facilitate understanding, the side view 300b also includes a depiction of the depth sensor's field of view 335 at the time of the frame capture. The depth sensor's angle 330 is such that the user's upper torso, but not the user's legs have been captured in the frame. Again, this example is merely provided to accommodate the reader's understanding, and the reader will appreciate that some embodiments may capture the entire field of view without omitting any portion of the user. For example, the embodiments depicted in FIGS. 1A-C may capture less than all of the interacting user, while the embodiments of FIG. 2 may capture the entirety of the interacting user (in some embodiments, everything that is more than 8 cm off the floor appears in the depth field of view). Of course, the reverse may be true depending upon the orientation of the system, depth camera, terrain, etc. Thus, one will appreciate that variations upon the disclosed examples are explicitly contemplated (e.g., classes referencing torso components are discussed below, but some embodiments will also consider classifications of legs, feet, clothing, user pairings, user poses, etc.).

Similarly, though FIG. 3 depicts the depth data as a "point cloud", one will readily recognize that the data received from a depth sensor may appear in many different forms. For example, a depth sensor, such as depth sensor 115a or 115d, may include a grid-like array of detectors. These detectors may acquire an image of the scene from the perspective of fields of depth captures 120a and 120d respectively. For example, some depth detectors include an "emitter" producing electromagnetic radiation. The travel time from the emitter to an object in the scene, to one of the grid cell detectors may correspond to the depth value associated with that grid cell. The depth determinations at each of these detectors may be output as a two-dimensional grid of depth values. A "depth frame" as used herein may refer to such a two-dimensional grid, but can also refer to other representations of the three-dimensional depth data acquired from the depth sensor (e.g., a point cloud, a sonographic image, etc.).

Example Depth Data Clipping Methodology

Figure 4:
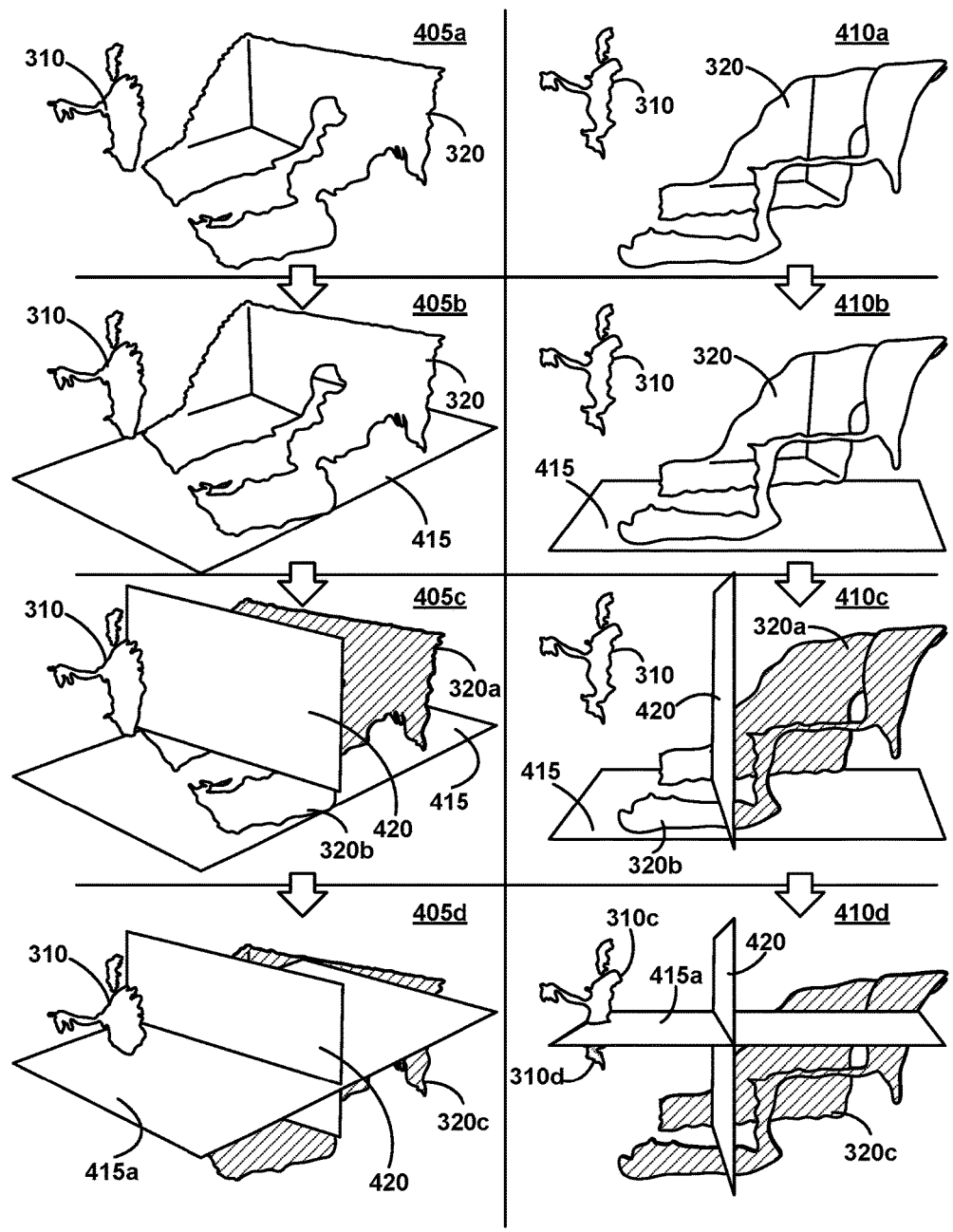
FIG. 4 is a series of views illustrating data isolation via plane clipping as may be applied to the depth data of FIG. 3 in some embodiments.

Many applications would like to infer the user's gestures from the depth data 305. Accomplishing this from the raw depth data could be quite challenging and so some embodiments apply preprocessing procedures to isolate the depth values of interest. For example, FIG. 4 is a series of views illustrating data isolation via plane clipping as may be applied to the depth data 305 of FIG. 3 in some embodiments. Particularly, perspective view 405a and side view 410a illustrate the depth data 305 (including portions associated with the user 310 and portions associated with the background 320). Perspective view 405b and side view 410b show the depth data 305 relative to a floor plane 415. The floor plane 415 is not part of the depth frame data 305. Rather, the floor plane 415 may be assumed based upon context or estimated by the processing system.

Perspective view 405c and side view 410c introduce a wall plane 420, which may also be assumed or estimated by the processing system. The floor and wall plane may be used as "clipping planes" to exclude depth data from subsequent processing. For example, based upon the assumed context in which the depth sensor is used, a processing system may place the wall plane 420 halfway to the maximum range of the depth sensor's field of view. Depth data values behind this plane may be excluded from subsequent processing. For example, the portion 320a of the background depth data may be excluded, but the portion 320b may be retained as shown in perspective view 405c and side view 410c.

Ideally, the portion 320b of the background would also be excluded from subsequent processing, since it does not encompass data related to the user. Some embodiments further exclude depth data by "raising" the floor plane 415 based upon context to a position 415a as shown in perspective view 405d and side view 410d. This may result in the exclusion of the portion 320b from future processing. These clipping operations may also remove portions of the user data 310d which will not contain gestures (e.g., the lower torso). As mentioned previously, the reader will appreciate that this example is provided merely to facilitate understanding and that in some embodiments (e.g., those of systems as appear in FIG. 2) clipping may be omitted entirely, or may occur only very close to the floor, so that leg and even foot data are both still captured. Thus, only the portion 310c remains for further processing. One will recognize that FIG. 4 simply depicts one possible clipping process for a given context. Different contexts, for example, situations where gestures include the user's lower torso, may be addressed in a similar fashion. Many such operations may still require an accurate assessment of the floor 415 and wall 420 planes to perform accurate clipping.

Example Depth Data Classification Methodology

Figure 5:
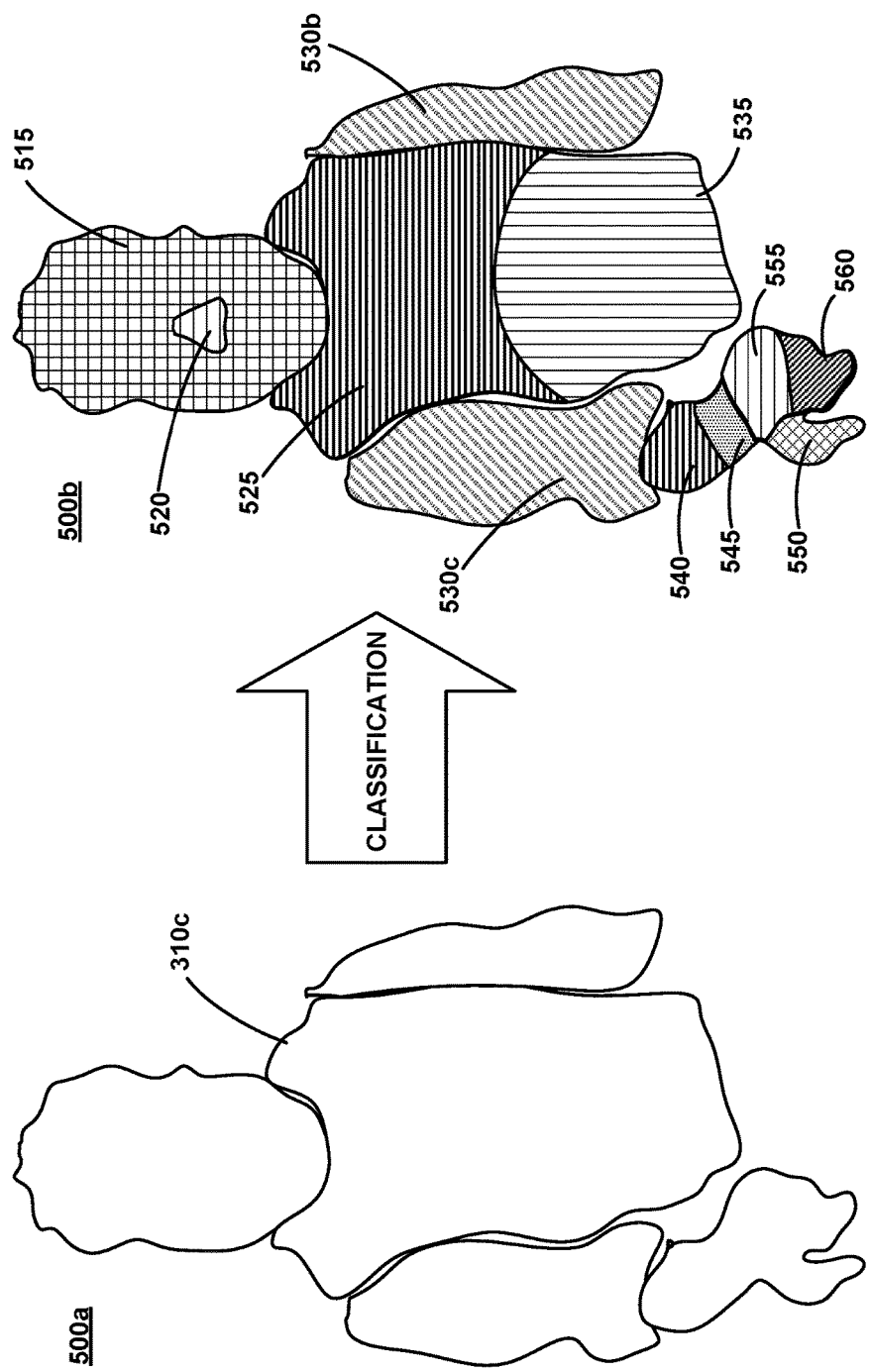
FIG. 5 is an example component classification as may be applied to the isolated data of FIG. 4 in some embodiments.

Following the isolation of the depth values (which may not occur in some embodiments), which may contain gesture data of interest, the processing system may classify the depth values into various user portions. These portions, or "classes", may reflect particular parts of the user's body and can be used to infer gestures. FIG. 5 is an example component classification as may be applied to the isolated data of FIG. 4 in some embodiments. Initially 500a, the extracted data 310c may be unclassified. Following classification 500b, each of the depth values may be associated with a given classification. The granularity of the classification may reflect the character of the gestures of interest. For example, some applications may be interested in the direction the user is looking, and so may break the head into a "head" class 515 and a "nose" class 520. Based upon the relative orientation of the "head" class 515 and the "nose" class 520 the system can infer the direction in which the user's head is turned. Since the chest and torso are not generally relevant to the gestures of interest in this example, only broad classifications "upper torso" 525 and "lower torso" 535 are used. Similarly, the details of the upper arm are not as relevant as other portions and so a single class "right arm" 530c and a single class "left arm" 530b may be used.

In contrast, the lower arm and hand may be very relevant to gesture determination and more granular classifications may be used. For example, a "right lower arm" class 540, a "right wrist" class 545, a "right hand" class 555, a "right thumb" class 550, and a "right fingers" class 560 may be used. Though not shown, complementary classes for the left lower arm may also be used. With these granular classifications, the system may able to infer, e.g., a direction the user is pointing, by comparing the relative orientation of the classified depth points.

Example Depth Data Processing Pipeline

Figure 6:
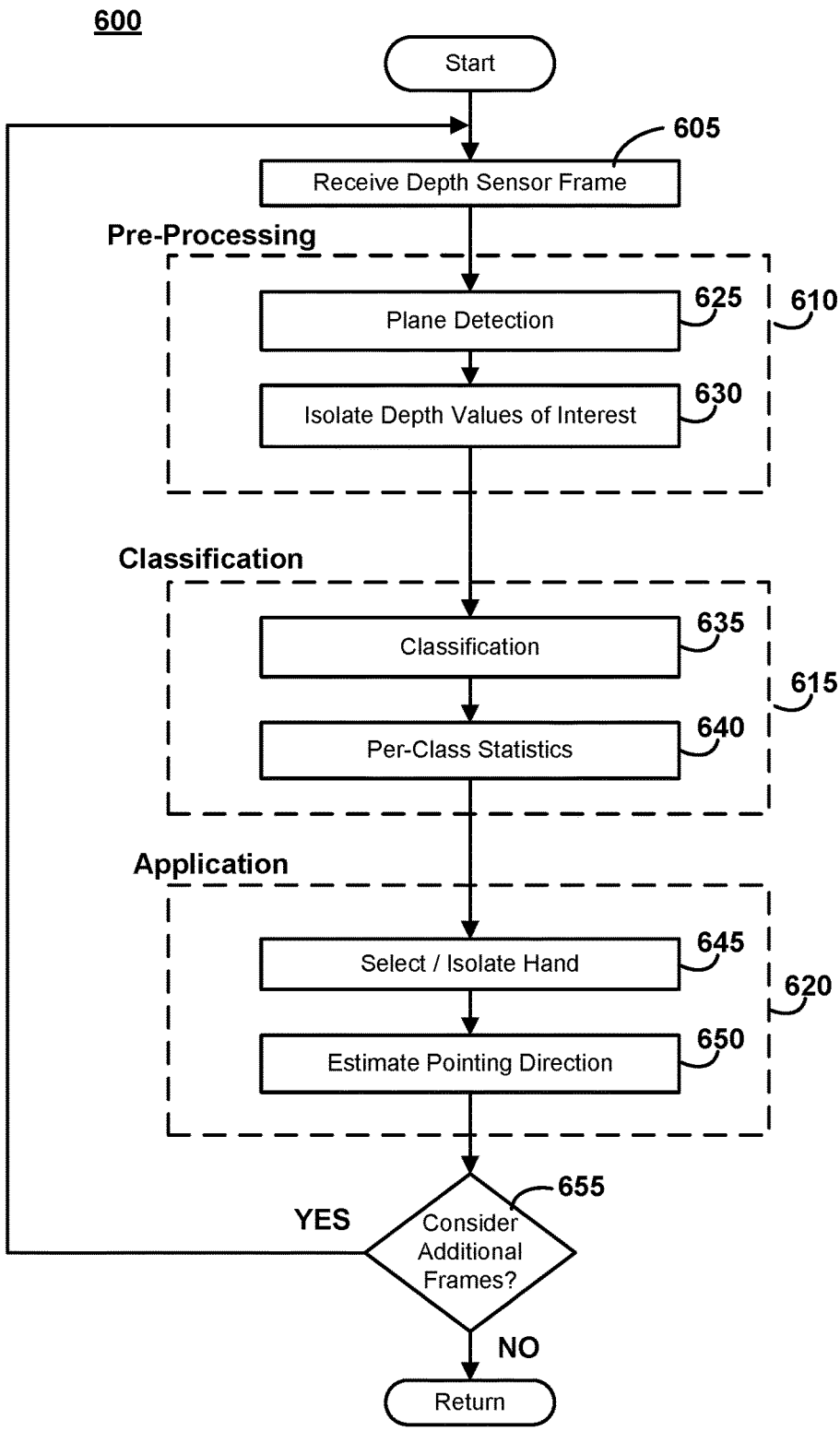
FIG. 6 is a flow diagram illustrating some example depth data processing operations as may be performed in some embodiments.

FIG. 6 is a flow diagram illustrating some example depth data processing operations 600 as may be performed in some embodiments. At block 605, the processing system may receive a frame of depth sensor data (e.g., a frame such as frame 305). Generally speaking, the data may then pass through "Pre-Processing" 610, "Classification" 615, and "Application" 620 stages. During "Pre-Processing" 610, the processing system may perform "plane detection" at block 625 using the frame data or based upon assumptions or depth camera configuration details (though again, in many embodiments preprocessing and plane detection may not be applied). This may include, e.g., the clipping planes discussed with respect to FIG. 4, such as the floor 415 plane and wall plane 420. These planes may be used, e.g., to isolate the depth values of interest at block 630, e.g., as described above with respect to FIG. 4.

During Classification 615, the system may associate groups of depth values with one class (or in some embodiments, multiple classes) at block 635. For example, the system may determine a classification using classes as discussed with respect to FIG. 5. At block 640, the system may determine per-class statistics (e.g., the number of depth values associated with each class, the effect upon ongoing system training and calibration, etc.). Example classes may include: Nose, Left Index Finger, Left Other Fingers, Left Palm, Left Wrist, Right Index Finger, Right Other Fingers, Right Palm, Right Wrist, and Other.

During the Application 620 operations, the system may use the class determinations to infer user-behavior relevant to a particular application objective. For example, an HCl interface may seek to determine where the user is presently pointing their hand. In this example, at block 645, the system will select/isolate the depth values classified as being associated with the "hand" and/or "fingers". From these depth values (and possibly depth values associated with the user's arm) the system may estimate the direction in which the user is pointing in this particular frame at block 650 (one will recognize that other gestures than this pointing example may also be performed). This data may then be published to an application program, e.g., a kiosk operating system, a game console operating system, etc. At block 655, the operations may be performed again for additional frames received. One will recognize that the process may be used to infer gestures across frames by comparing, e.g., the displacement of classes between frames (as, e.g., when the user moves their hand from left to right).

Figure 7:
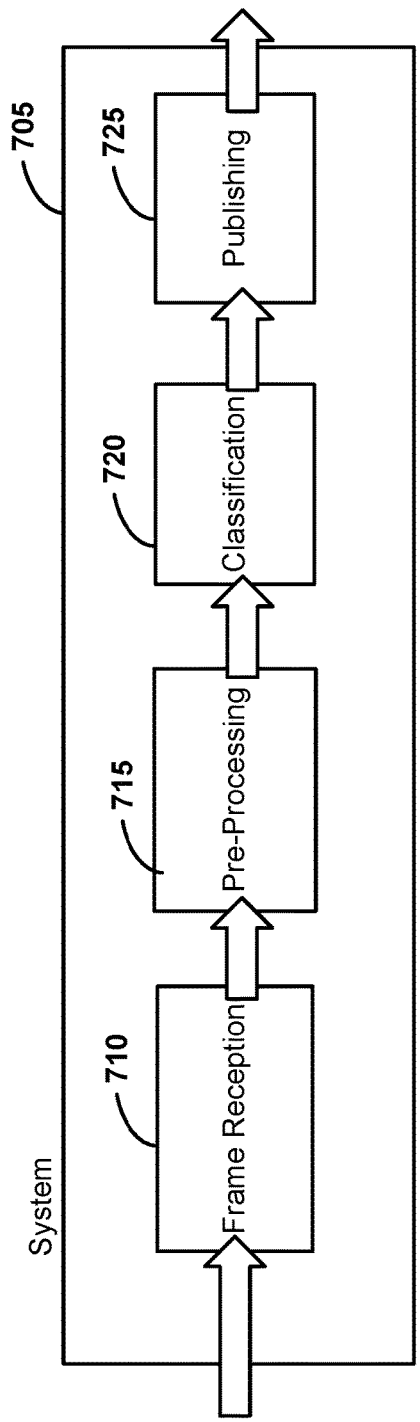
FIG. 7 is a hardware block diagram illustrating an example hardware implementation which may be used to perform depth data processing operations in some embodiments.

FIG. 7 is a hardware block diagram illustrating an example hardware implementation 705 which may be used to perform depth data processing operations in some embodiments. A frame reception system 710 may receive a depth frame from a depth sensor. The frame reception system 710 may be firmware, software, or hardware (e.g., an FPGA implementation, system-on-a-chip, etc.). The frame may be directly passed, or cached and subsequently passed, to a pre-processing module 715. Pre-processing module 715 may also be firmware, software, or hardware (e.g., an FPGA implementation, system-on-a-chip, etc.). The pre-processing module may perform the Preprocessing operations 610 discussed in FIG. 6. The pre-processing results (e.g., the isolated depth values 310c) may then be provided to the Classification module 720. The Classification module 720 may be firmware, software, or hardware (e.g., an FPGA implementation, system-on-a-chip, etc.). The Classification module 720 may perform the Classification operations 615 discussed in FIG. 6. The classified depth values may then be provided to a Publishing module 725. The Publishing module 725 may be configured to package the classification results into a form suitable for a variety of different applications (e.g., as specified at 620). For example, an interface specification may be provided for kiosk operating systems, gaming operating systems, etc. to receive the classified depth values and to infer various gestures therefrom.

Example Interactive System Form Factors

Figure 8:
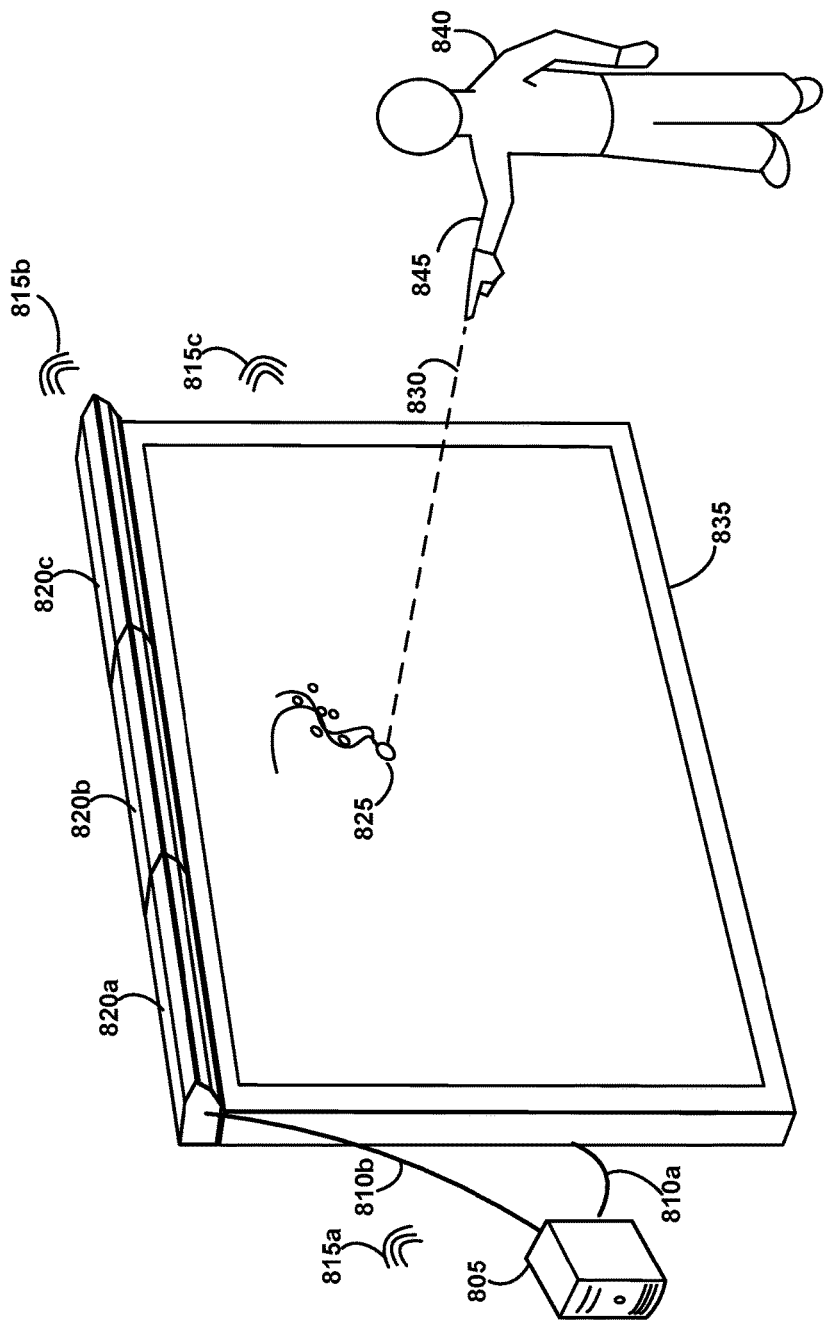
FIG. 8 is a schematic diagram of an example wide-screen display with a multi-angled depth sensor housing as may be implemented in some embodiments.

Various embodiments may include a housing frame for one or more of the depth sensors. The housing frame may be specifically designed to anticipate the inputs and behaviors of the users. In some embodiments, the display system may be integrated with the housing frame to form modular units. FIG. 8 is a schematic diagram of an example widescreen display with a multi-angled depth sensor housing as may be implemented in some embodiments. For example, the system may include a large, single display 835 with which a user 840 may interact via various spatial, temporal, and spatial-temporal gestures 830 using, e.g., their hands 845, arms or entire body. For example, by pointing with the finger of their hand 845, the user may direct the motion of a cursor 825. The display 835 may be in communication with a computer system 805 via, e.g., a direct line connection 810a, wireless connections 815c and 815a, or any other suitable means for communicating the desired display output. Similarly, the computer system 805 may be in communication with one or more depth sensors contained in housing frames 820a-c via a direct line connection 810b, wireless connections 815b and 815a, or any other suitable means for communicating the desired display output. Though shown separately in this example, in some embodiments, the computer system 805 may be integrated with either the housing frames 820a-c or display 835, or be contained off-site.

Each of housing frames 820a-c may contain one or more depth sensors as described elsewhere herein. The computer system 805 may have transforms available to relate depth data acquired at each sensor to a global system of coordinates relative to display 835. These transforms may be achieved using a calibration process, or may, e.g., be preset with a factory default. Though shown here as separate frames, in some embodiments the frames 820*a-c* may be a single frame. The frames 820*a-c* may be affixed to the display 835, to a nearby wall, to a separate mounting platform, etc.

Figure 9:
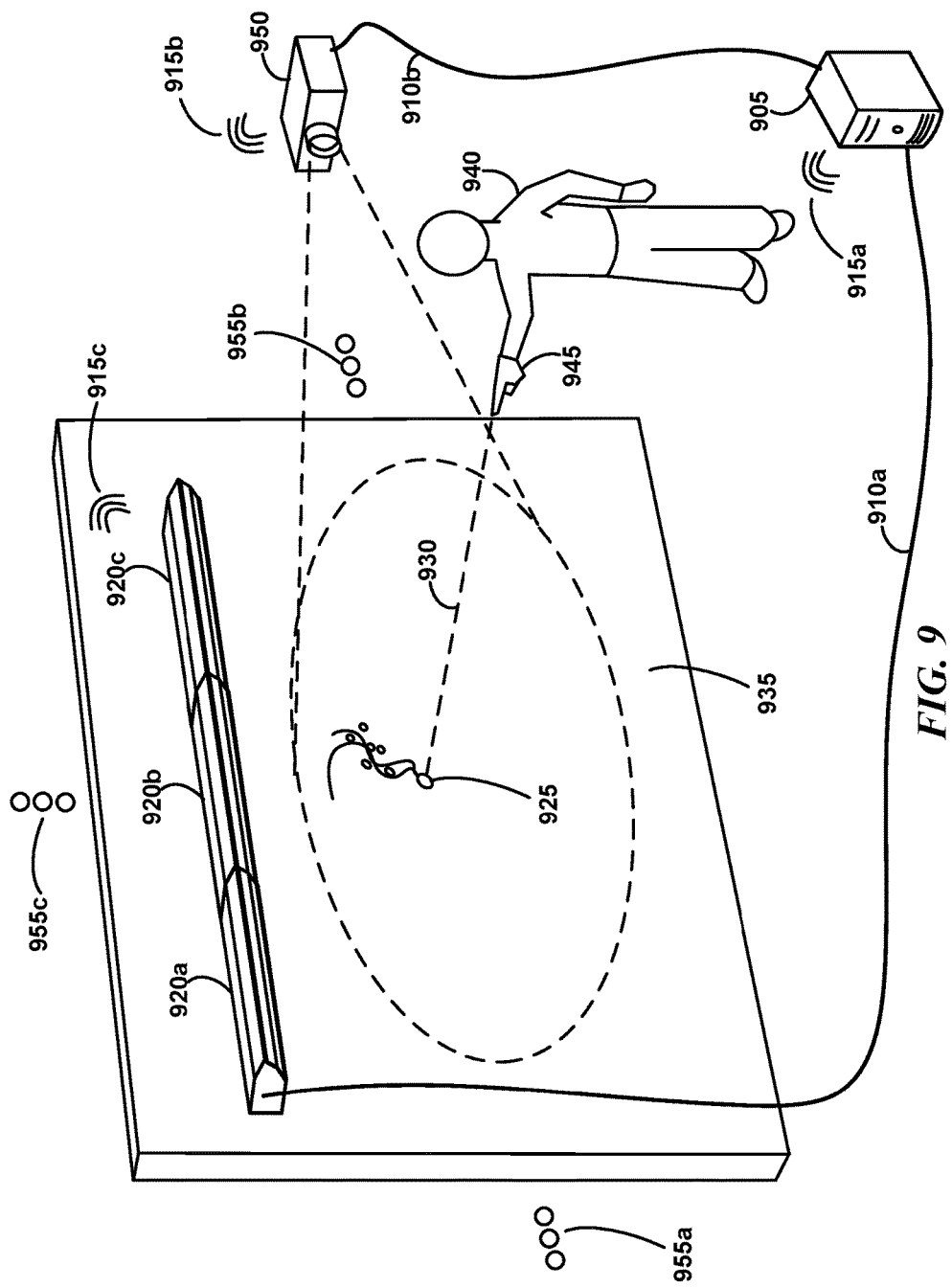
FIG. 9 is a schematic diagram of an example projected display with a multi-angled depth sensor housing as may be implemented in some embodiments.

While some embodiments specifically contemplate providing a display system connected with the housing frames, one will readily appreciate that systems may be constructed in alternative fashions to achieve substantially the same function. For example, FIG. 9 is a schematic diagram of an example projected display with a multi-angled depth sensor housing frames 920*a-c* as may be implemented in some embodiments. Here, the frames 920*a-c* have been affixed to a wall 935, e.g., a wall in the user's 940 office, home, or shopping environment. A projector 950 (one will appreciate that rear projection from behind the wall 935 may also be used in some embodiments if the wall's 935 material is suitable). As indicated by ellipses 955*a-c*, the wall 935 may extend well beyond the interaction area in many directions. The projector 950 may be positioned so as to project the desired images upon the wall 935. In this manner, the user may again use their hand 945 to gesture 930 and thereby direct the motion of a cursor 925. Similarly, the projector 950 may be in communication with a computer system 905 and the depth sensors in frames 920*a-c* via direct line connections 910*a*, 910*b*, wireless connections 915*a-c*, or any other suitable communication mechanism.

Figure 10:
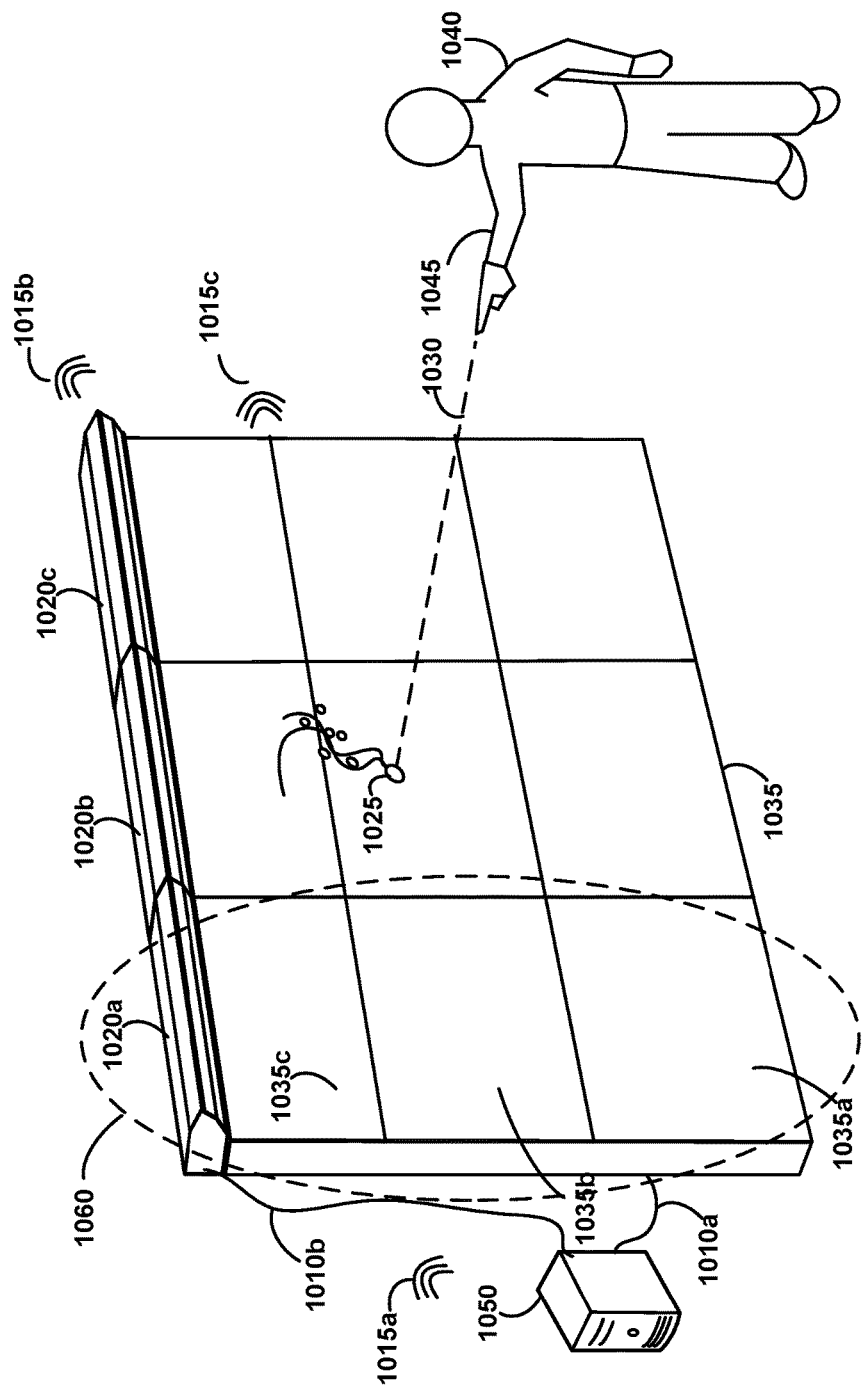
FIG. 10 is a schematic diagram of an example composite display with a multi-angled depth sensor housing as may be implemented in some embodiments.

While FIGS. 8 and 9 describe example embodiments with "monolithic" displays, in some embodiments, the displays and frame housing may be designed so to form "modular" units that may be integrated into a whole. For example, FIG. 10 is a schematic diagram of an example composite display 1035 with a collection of multi-angled depth sensor housing frames as may be implemented in some embodiments. Again, the user 1040 may use hand 1045 gestures 1030 to interact with displayed items, e.g., cursor 1025. A computer system 1050 (here shown on-site and separate from the other components) may be in communication with the depth sensors and display via direct line connections 1010*a*, 1010*b*, wireless communications 1015*a*, 1015*b*, 1015*c*, or any other suitable communications method.

However, in this example embodiment, each vertical segment of the composite system 1035 may include a separate module. For example, one module 1060 may comprise the depth sensor housing frame 1020*a* and three displays 1035*a-c*. The computer system 1050 may employ the individual displays of each vertical module to generate a collective, composite image spanning one or more of them. The remaining depth sensor housing frames 1020*b,c* may similarly be associated with their own displays. One will appreciate that in some embodiments each module will have its own computer system, while, as shown here, in some embodiments there may be a single computer system associated with several or all of the modules. The computer system(s) may process depth data and provide images to the displays on their respective module(s).

Example Modular Interactive System Dimensions

Figure 11:
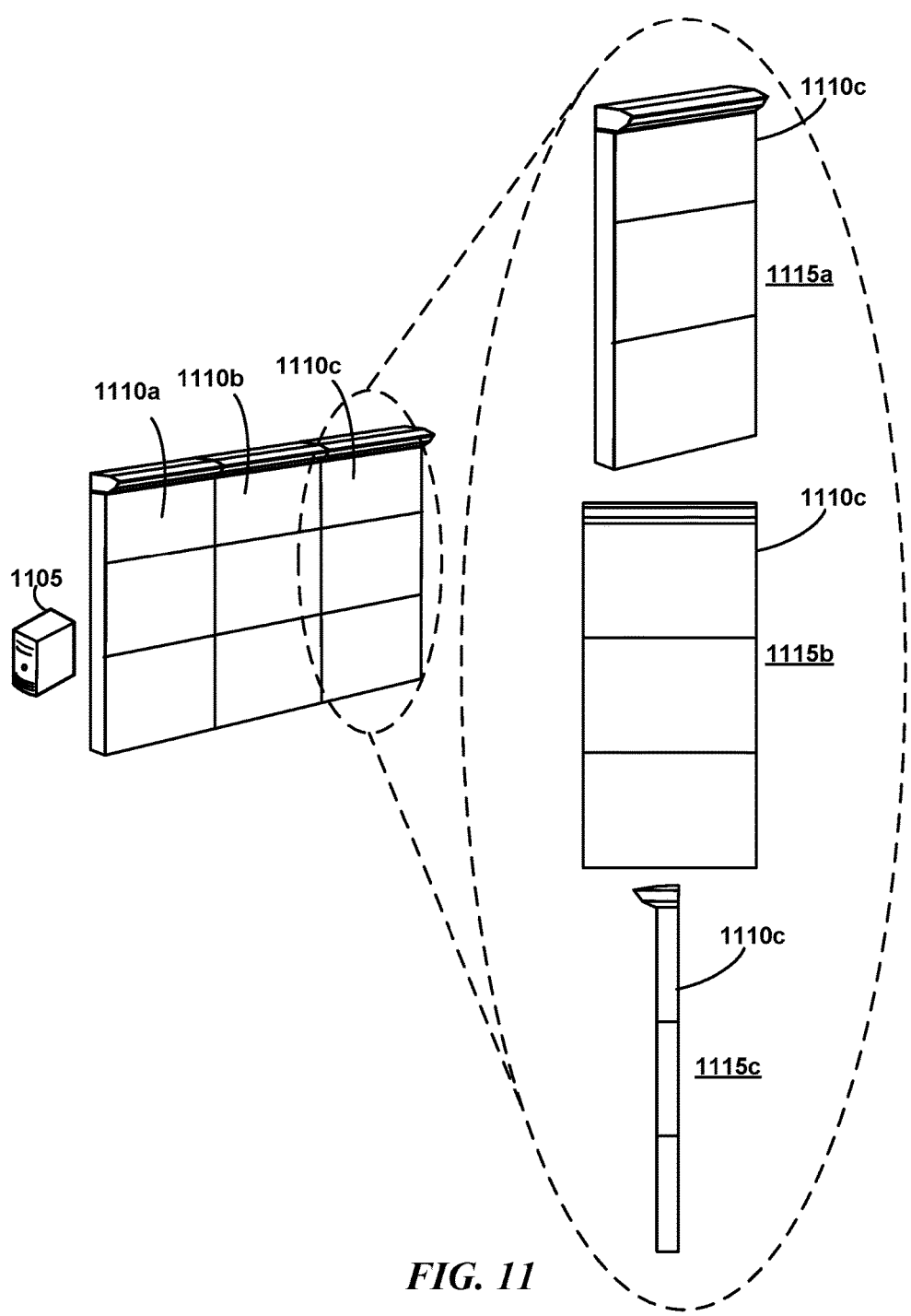
FIG. 11 is a schematic diagram of the composite display with a multi-angled depth sensor housing of FIG. 10, including a turnaround of a modular component in the system as may be implemented in some embodiments.

FIG. 11 is a schematic diagram of the composite display with a multi-angled depth sensor housing of FIG. 10, including a turnaround of a modular component 1110*c* in the system as may be implemented in some embodiments. Particularly, the modular component 1110*c* is shown from perspective 1115*a*, front-on 1115*b*, and side 1115*c* views. The computer system 1105 or independent computer systems, may be used to control the one or more displays and to receive and process depth sensor data. A computer system 1105 may be used to control the displays and process data for all the components 1110*a-c* or only a single component, e.g., component 1110*c*.

FIGS. 12A-C provide greater detail regarding the specific dimensions of a particular example composite display. Particularly, FIG. 12A is a head-on schematic view of the composite display with a multi-angled depth sensor housing of FIG. 10 as may be implemented in some embodiments. In this example the modules are arranged to create a grid of displays 1240 together having a composite width 1215*d* of approximately 365 centimeters in some embodiments and height 1215*b* of approximately 205 centimeters in some embodiments. In some embodiments, the depth sensor housing height 1215*a* may be approximately 127 mm. The individual displays may have a width 1215*c* of approximately 122 centimeters in some embodiments and a height 1215*f* of approximately 69 centimeters in some embodiments. In some embodiments, the displays may be HDMI displays with resolutions of 1920×1080 pixels. The displays 1240 may be elevated off the ground 1225 a distance 1215*e* of approximately 10 centimeters in some embodiments via a support structure 1245. Atop the displays 1240 may be a depth sensor housing frame or frames 1205, here shown transparently to reveal one or more of depth sensors 1210*a-c*.

FIG. 12B is a top-down schematic view of the composite display with a multi-angled depth sensor housing of FIG. 10 as may be implemented in some embodiments. Note that the depth sensors and housing are no longer shown to facilitate understanding. Within the region 1225*d* the depth sensors may be able to collect depth data. Accordingly, a user 1235 would stand within this region when interacting with the system. The region may have a distance 1230*f* of approximately 300 centimeters in some embodiments in front of the display 1240 and be approximately the width 1215*d* of the display. In this embodiment, side regions 1225*a* and 1225*c* may be excluded from the interaction. For example, the user may be informed to avoid attempting to interact within these regions, as they comprise less optimal relative angles to depth sensors distributed across the system (in some embodiments, these regions may simply originate too much noise to be reliable). The installing technician may mark or cordon off the areas accordingly. These regions 1225*a* and 1225*c* may include a length 1230*b*, 1230*g* from a wall 1250 of approximately 350 centimeters in some embodiments and a distance 1230*a*, 1230*h* from the active region 1225*d* of approximately 100 centimeters in some embodiments. A region 1225*b* may be provided between the support structure 1245 and a wall support structure 1250 or other barrier, to facilitate room for one or more computing systems. Here, a distance 1230*d* of approximately 40 centimeters in some embodiments may be used and a length 1215*d* reserved for this computing system space. In some embodiments, the support structure 1245 may extend throughout the region 1225*b* and the computer system may rest on or within it.

FIG. 12C is a side schematic view of the composite display with a multi-angled depth sensor housing of FIG. 10 as may be implemented in some embodiments.

One will appreciate that the example dimensions provided above are merely used in connection with this specific example to help the user appreciate a specific embodiment. Accordingly, the dimensions may readily be varied to achieve substantially the same purpose.

Example Depth Sensor Frame for Modular Systems—Bracket-Mounted

The housing frame used to protect the depth sensors may take a variety of forms in different embodiments. FIG. 13A is an exploded, schematic view of components in the frame of a multi-angled depth sensor housing frame, as may be implemented in some embodiments. FIG. 13B is an assembled schematic view of components in the frame of a multi-angled depth sensor housing, as may be implemented in some embodiments.

The frame may comprise an upper cover 1310, a back cover 1315, a bottom panel 1340, and two sensor view panels 1355a and 1355b (illustrated in FIG. 13B, but not FIG. 13A, for visual economy). View panels 1355a and 1355b may be screwed into place (e.g., screwed into one or more of bracket spacers 1305a-f with, e.g., a washer securing the screw on the opposing side), clamped, or otherwise mechanically coupled to the housing, and may also be held in place by angled portions 1335 and 1340a. The upper cover 1310 may have a length 1360b of approximately 1214 mm in some embodiments, and a width 1360a of approximately 178 mm in some embodiments. In some embodiments, the height 1360c may be approximately 127 mm.

End panels 1305a and 1305f may be constructed in anticipation of the desired angles for upper cover 1310, a back cover 1315, and two sensor view panels 1355a and 1355b. Particularly, the angle 1370a may be approximately 25° in some embodiments, the angle 1370b may be approximately 35° in some embodiments, and the angle 1370c may be approximately 30° in some embodiments. To clarify, the upper cover 1310 and bottom panel 1340 are substantially parallel in the depicted embodiment. Accordingly, in this example, the angles between the top panel 1310 and back panel 1315 may be approximately 90°. Similarly, the angles between bottom panel 1340 and back panel 1315 may be approximately 90°. Not only may these angles present a more aesthetically pleasing design, but by conforming to the spacer dimensions, they may facilitate improved structural integrity of the housing as a whole.

The length 1375a may be approximately 97 mm in some embodiments, the length 1375b may be approximately 89 mm in some embodiments, the length 1375c of the cover ridge 1335 may be approximately 6 mm in some embodiments, the length 1375d of sensor view panel 1355a may be approximately 56 mm in some embodiments, and the length 1375e of sensor view panel 1355b may be approximately 54 mm in some embodiments, and the length 1375f may be approximately 10 mm in some embodiments.

Upper cover 1310, may include a portion 1325 substantially parallel with the bottom panel portion 1340, an angled portion 1330, and an angled retaining portion angled portion 1335 for retaining upper sensor view panel 1355a.

Back panel 1315 may include four cut-out grooves or insets 1320a, 1320b, 1320c, and 1320d. As discussed herein, these grooves may be present in some embodiments to receive the spacers 1305b-e, thereby ensuring their being fixed in a desired location within the housing. One will appreciate that the number of grooves may or may not be the same as the number of spacers, as it may be desirable to fix only some of the spacers.

Bottom panel 1345 may include an angled front 1340a (tab or fold) and angled rear portion 1340b for retaining, at least in part, the adjacent panels. Bottom panel 1345 may include two cut-out insets 1350a and 1350b on its angled rear portion 1340b. This may result in "raised" portions 1345a, 1345b, and 1345c of the angled rear portion 1340b.

Within the frame may be one or more of spacer brackets 1305a-f (also referred to simply as "spacers" or "brackets"). While spacers 1305a and 1305f may serve as end panels, spacers 1305b-e may be entirely or substantially within the housing frame. Spacer brackets 1305a-f need not be of the same dimensions. For example, brace bracket 1305d may have a shorter length than spacer brackets 1305b, c, e. As discussed below, spacer brackets 1305a-c, e, and f may be used to ensure the structural integrity of the housing even when, e.g., a load is placed on top of portion 1325. Brace bracket 1305d, being shorter, provides space for mounting a sensor pair, but may also contribute to the housing's structural integrity. In some embodiments, the brace bracket 1305d may be secured by screws to the bottom panel 1340 and upper cover 1310.

Figures 14A, 14B:
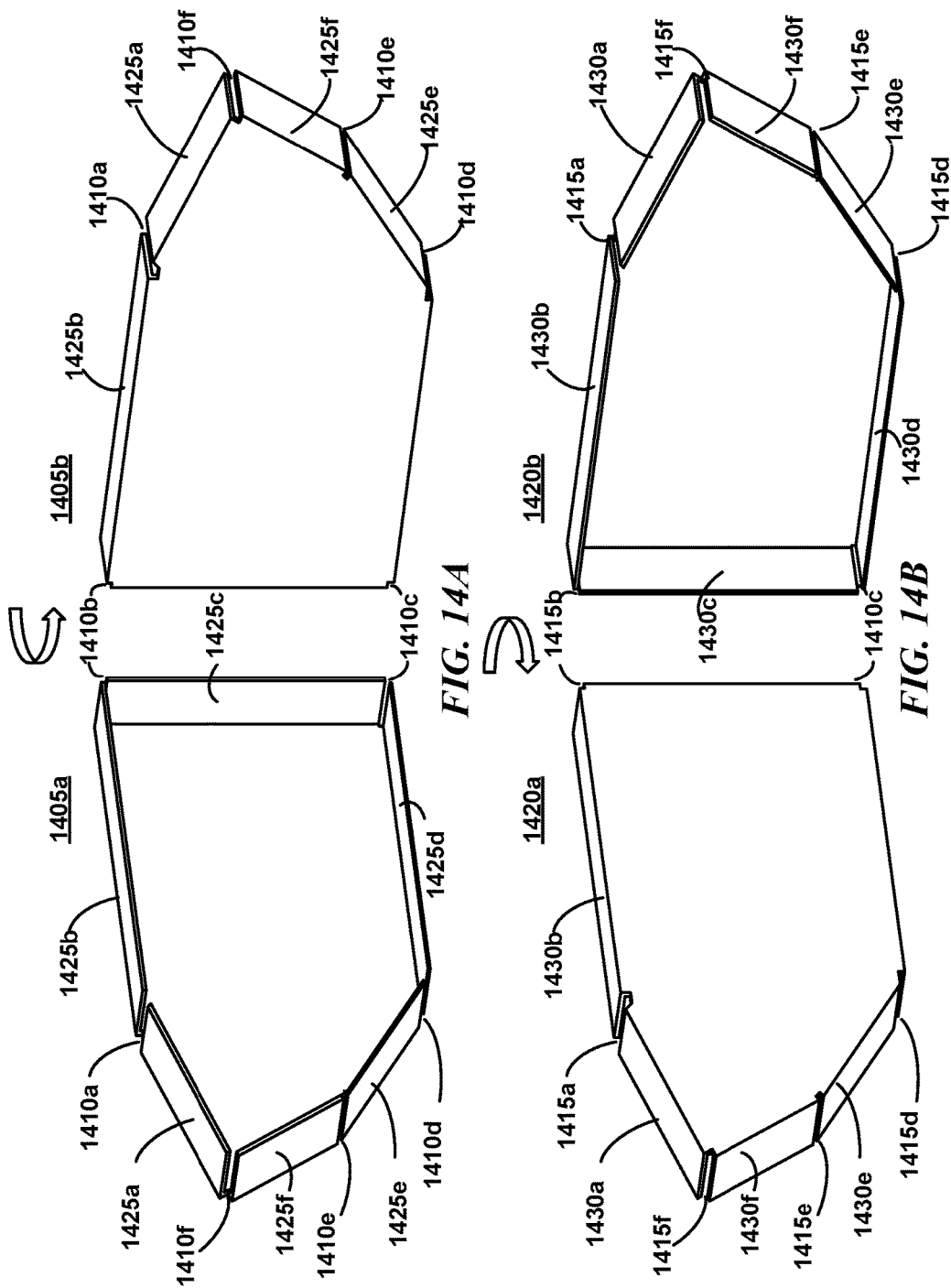
FIG. 14A is a view of the spacer component of FIG. 13A as may be implemented in some embodiments, from two perspectives.
FIG. 14B is a view of the mirrored spacer component of FIG. 13A as may be implemented in some embodiments, from two perspectives.

FIG. 14A is a view of a spacer component of FIG. 13A, e.g., component 1305a or 1305e, as may be implemented in some embodiments, from two perspectives 1405a and 1405b. The perspective 1405a is rotated substantially 90° relative to the perspective 1405b, thereby presenting a concave portion formed by the extensions 1425a-f. The extensions 1425a-f may themselves be separated by spaces 1410a-f. FIG. 14B is a view of the mirrored spacer component of FIG. 13A, e.g., component 1305b or 1305f, as may be implemented in some embodiments, from two perspectives 1420a and 1420b. The perspective 1420b is rotated substantially 90° relative to the perspective 1420a, thereby presenting a concave portion formed by the extensions 1430a-f. The extensions 1430a-f may themselves be separated by spaces 1415a-f.

Figure 15:
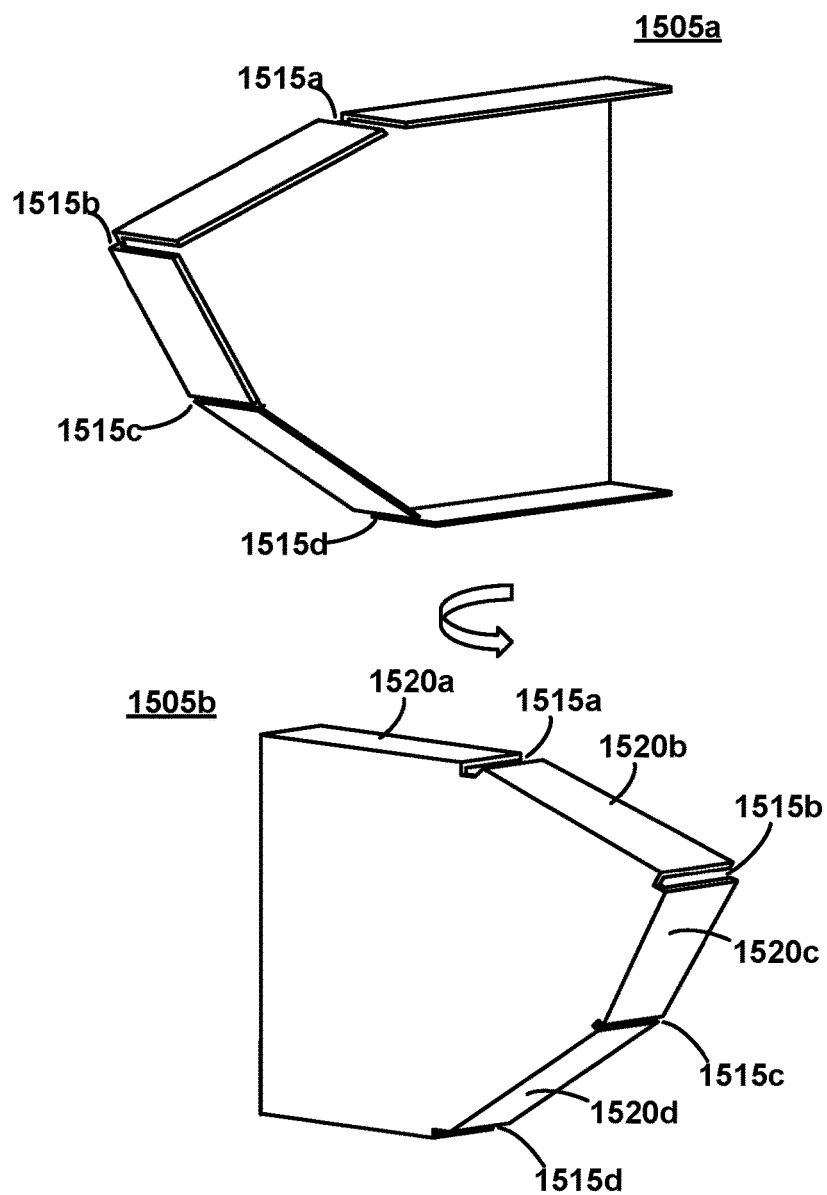
FIG. 15 is a view of the brace bracket component of FIG. 13A as may be implemented in some embodiments, from two perspectives.

FIG. 15 is a view of the brace bracket component of FIG. 13A, e.g., component 1305d, as may be implemented in some embodiments, from two perspectives 1505a and 1505b. The perspective 1505a is rotated substantially 90° relative to the perspective 1505b, thereby presenting a concave portion formed by the extensions 1520a-e. The extensions 1520a-e may themselves be separated by spaces 1515a-d.

Figure 16:
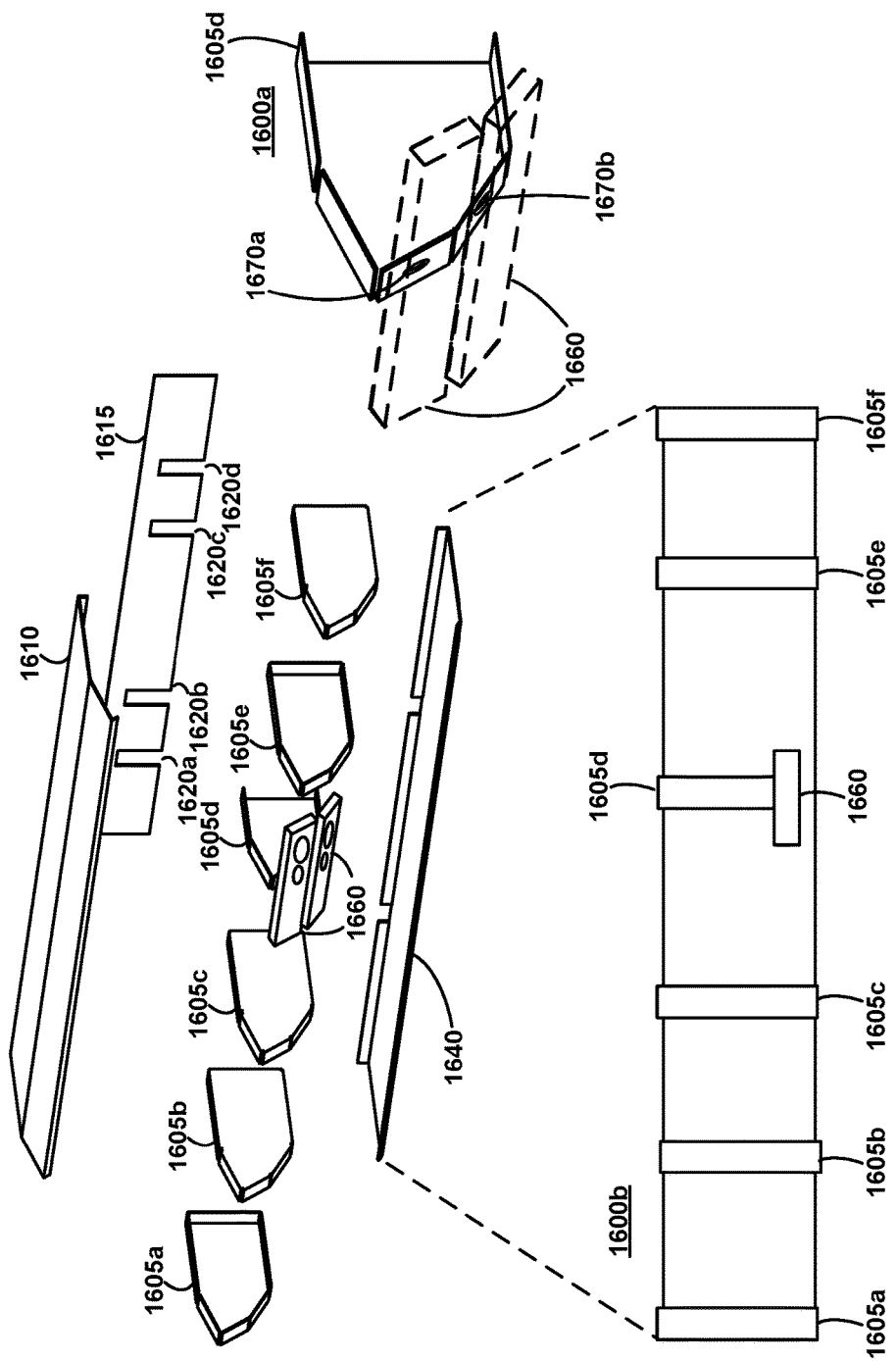
FIG. 16 is an exploded, schematic view of components in the frame of a multi-angled depth sensor housing, including a sensor-pair-receiving brace bracket spacer, as may be implemented in some embodiments.

FIG. 16 is an exploded, schematic view of components in the frame of a multi-angled depth sensor housing, including a sensor-pair-receiving brace bracket spacer, as may be implemented in some embodiments. Again, though a specific number of spacers are shown in the image to facilitate understanding, one will appreciate that in different embodiments there may be more or fewer spacers present than those depicted here. As discussed above, the housing may comprise an upper panel 1610, back panel 1615, and bottom panel 1640 (the sensor view panels are not shown for visual economy). While spacers 1605a,b,c,e and f provide structural support to the housing, the brace spacer bracket 1605d may be shorter and recessed relative to the other spacers 1605a,b,c,e and f so as to accommodate a coupling to a pair of depth sensors 1660. In this example, the brace spacer bracket 1605d, shown in isolated view 1600a has two holes 1670a,b for receiving a screw, nail, bolt, or other device for affixing the depth sensors 1660 to the brace spacer bracket 1605d. For example, the depth sensors 1660 may themselves include mounting holes through which a screw may be passed to fix the sensor in place (e.g., as is the case for some versions of the RealSense™ depth sensor system).

In some embodiments, while spacers 1605a and 1605f are affixed to each end of the housing, the spacers 1605b-e may move freely within the housing. In this manner, it may be possible for an installation technician to configure the system to the particular circumstances of the system's environment and planned usage. In some embodiments, however, the grooves 1620a-d may receive each of spacer brackets 1605b-e, thereby ensuring their placement in a specific location within the housing. This predetermined positioning may be useful, e.g., when the housing is shipped as one housing in a collection of housings to be installed as part of a composite installation. In some embodiments, the grooves may accommodate only a specific spacer, thereby forcing the technician to install a specific configuration. In some embodiments, however, e.g., as shown here, each groove may be able to receive any one of the four spacers. In these embodiments, the technician may thereby have the freedom to select at which of the four positions the depth sensors are best situated so as to achieve their task. Thus, in the schematic top down view 1600*b* shown here, the spacer 1605*d* and affixed sensor pair 1660 may be located at a position offset from the center of the housing.

Figure 17:
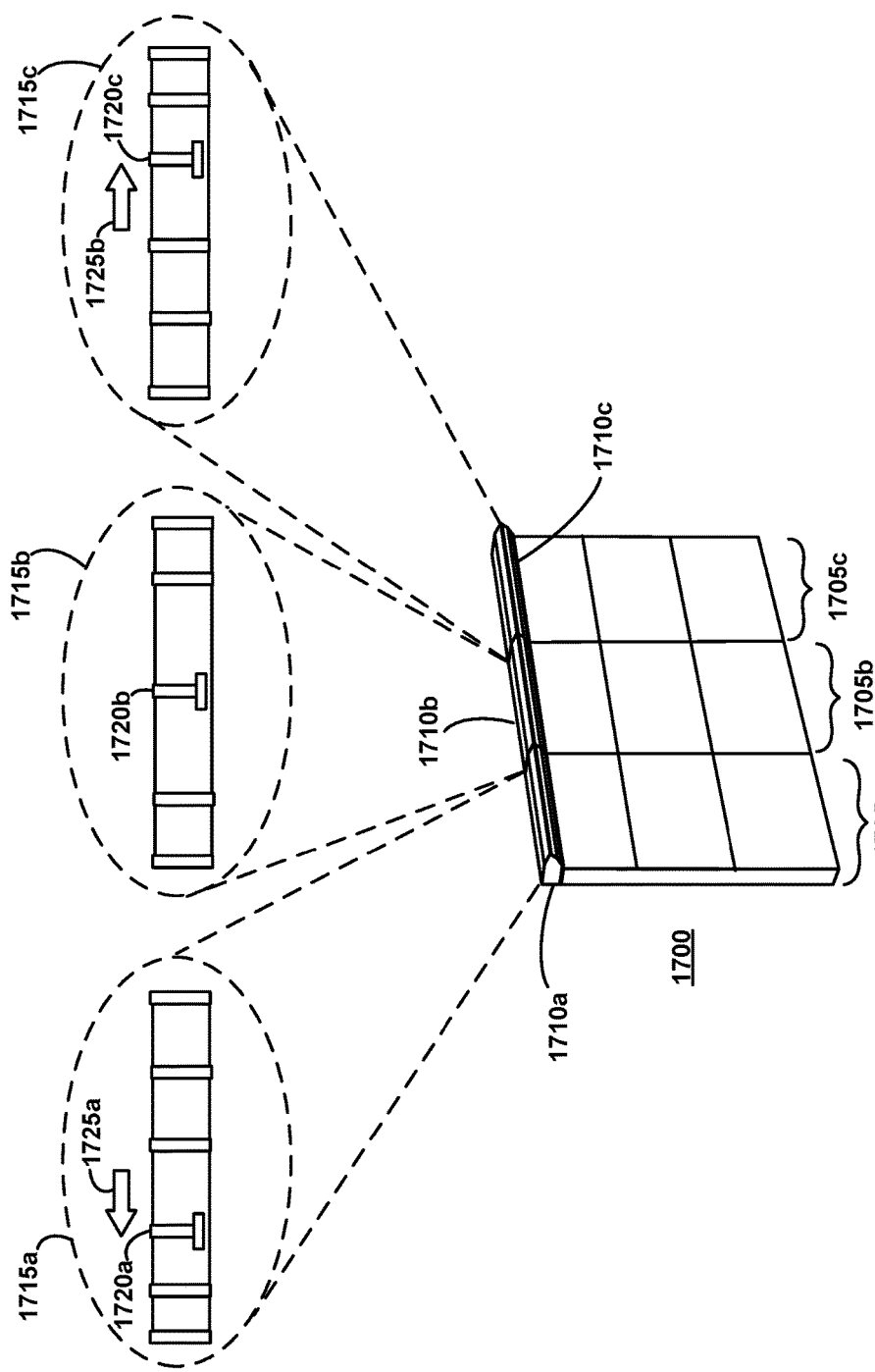
FIG. 17 is a schematic view of a possible sensor-placement configuration in the multi-angled depth sensor housings of an example user interface, as may be implemented in some embodiments.

To further clarify the possible motivations for the spacer placement discussed with reference to FIG. 16, FIG. 17 is a schematic view of a possible sensor-placement configuration in the multi-angled depth sensor housings of an example user interface, as may be implemented in some embodiments. Particularly, the user interface 1700 includes three units 1705*a-c* in series. Each unit may include three vertically adjacent displays and a corresponding sensor housing 1710*a-c*. Within each sensor housing 1710*a-c*, the spacer positions may be configured in anticipation of the housing's depth sensors' roles in the user interface as a whole. For example, the position of the sensor pairs may vary slightly between each module as the optical spacing of the depth sensors is different from the spacing each of the display screens.

Thus, as shown in the schematic, top-down, cut-away view 1715*b* for the center sensor housing 1710*b*, the shortened brace bracket 1720*b* and corresponding depth sensor pair may be positioned in the center of the housing 1710*b*. In contrast, as shown in the schematic, top-down, cut-away view 1715*c* for the right sensor housing 1710*c*, the shortened brace bracket 1720*c* and corresponding depth sensor pair may be positioned at an offset 1725*b* relative to the center of the housing 1710*c*. Similarly, as shown in the schematic, top-down, cut-away view 1715*a* for the left sensor housing 1710*a*, the shortened brace bracket 1720*a* and corresponding depth sensor pair may be positioned at an offset 1725*a* relative to the center of the housing 1710*a*.

Example Depth Sensor Frame for Modular Systems—Alternative Bracket Mount

Figure 18:
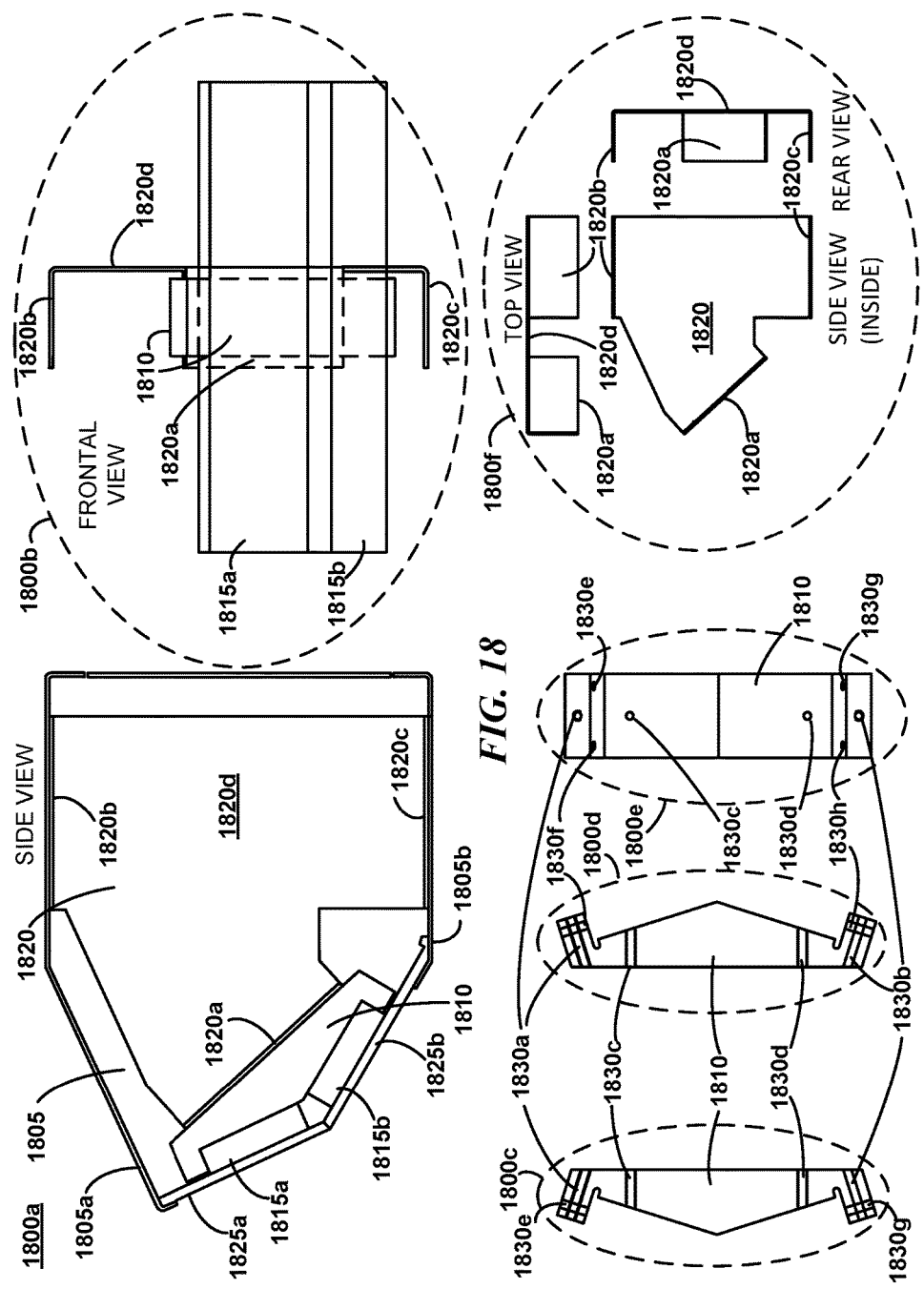
FIG. 18 is a plurality of schematic views of an alternative bracket mounting component as may be used in some embodiments.

FIG. 18 is a plurality of schematic views of an alternative bracket mounting component as may be used in some embodiments. Some sensor systems, e.g., the RealSense™ 300 may have mounting points better accommodated by certain form factors. The bracket mounting component of FIG. 18 may better facilitate the mounting of such systems.

Particularly, as shown in side view 1800*a*, a spacer bracket 1805 may include a plurality of extensions. These extensions may include the extension 1805*a* having a lip for retaining, at least in part, the upper viewing panel 1825*a* and the extension 1805*b* including a lip for retaining, at least in part, the lower viewing panel 1825*b*. As discussed, these extensions may form an enclosure. Within this enclosure may be placed a bracing support 1820. The bracing support may include a flat, planar side 1820*d* adjacent to, or forming a portion of, the surface of the spacer bracket 1805. A top planar portion 1820*b* and a lower planar portion 1820*c* extending from the planar side 1820*d* may be used to secure the bracing support 1820 within the bracket spacer 1805. Frontal view 1800*b* (i.e., the perspective of one standing in front of the depth sensors 1815*a* and 1815*b*) removes the spacer bracket 1805 and viewing panels 1825*a,b* shown in side view 1800*a* and shows the bracing support 1820 from a "frontal view". Accordingly, it may be easier for the reader to discern the top planar portion 1820*b* and the lower planar portion 1820*c* extended from the planar side 1820*d* of bracing support 1820 in the view 1800*b*.

The top planar portion 1820*b* and a lower planar portion 1820*c* may be used to secure the bracing support 1820 in a variety of manners. For example, a screw may pass through the extension 1805*a* and top planar portion 1820*b*, though friction alone may suffice in some embodiments.

The bracing support 1820 may also include an extended planar surface 1820*a*. The extended planar surface 1820*a* may be used to couple bracing support 1820 with a sensor mount 1810. The views 1800*f* of the bracing support 1820 remove the other components (spacer bracket 1805, sensor mount 1810, viewing panels 1825*a,b*) . Accordingly surface 1820*a* may be more readily discernible in this view (the dashed lines in the of 1800*b* indicate that, from the front, portions of the surface 1820*a* and sensor mount 1810 may be occluded by the sensors 1815*a,b*).

The sensor mount 1810 may provide a stable fixture for receiving the depth sensor systems s 1815*a* and 1815*b*. View 1800*c* provides a view from the right side of the sensor mount 1810 ("right" when looking at the portion of the sensor mount 1810 receiving the depth sensor systems 1815*a* and 1815*b*). View 1800*d* provides a view from the left side of the sensor mount 1810. View 1800*e* provides a view from the front of the sensor mount 1810. The sensor mount 1810 may include a plurality of holes for receiving screws or other fixation devices, to join the viewing panels 1825*a,b*, depth sensor systems 1815*a* and 1815*b*, sensor mount 1810, and bracing support 1820 into a composite structure.

Particularly, the depicted example has eight holes for securing the composite structure. Bracket holes 1830*c* and 1830*d* may be used to secure the sensor mount 1810 to the bracing support 1820 via surface 1820*a*. Viewing panel hole 1830*a* may be used to secure the upper viewing panel 1825*a* to the sensor mount 1810, and viewing panel hole 1830*b* may be used to secure the lower viewing panel 1825*b* to the sensor mount 1810. Sensor holes 1830*f* and 1830*e* may be used to secure the upper depth sensor system 1815*a* to the sensor mount 1810. Similarly, sensor holes 1830*h* and 1830*g* may be used to secure the lower depth sensor system 1815*b* to the sensor mount 1810.

Figure 19A:
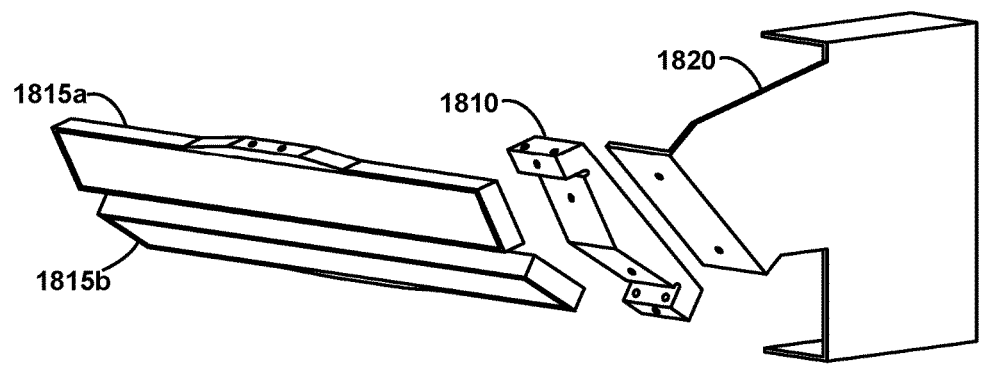
FIG. 19A is a perspective schematic view of portions of the alternative bracket mounting component of FIG. 18 in an exploded, unassembled state, as may be implemented in some embodiments.
Figure 19B:
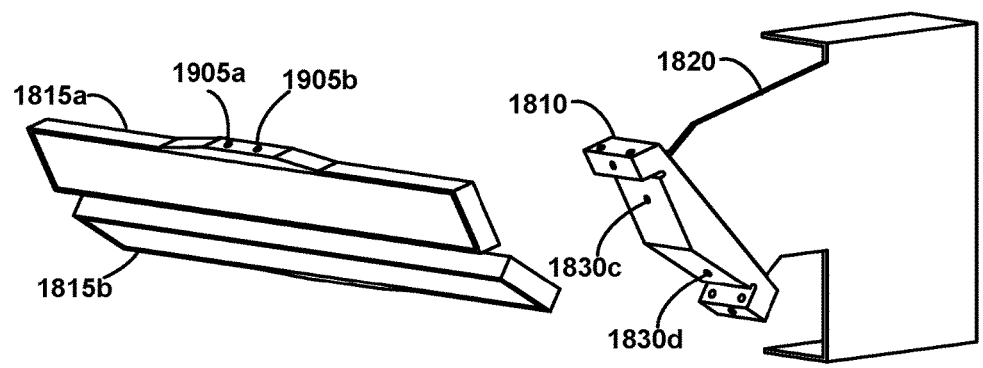
FIG. 19B is a perspective schematic view of portions of the alternative bracket mounting component of FIG. 18 wherein the bracing support is coupled with the sensor mount, as may be implemented in some embodiments.
Figure 19C:
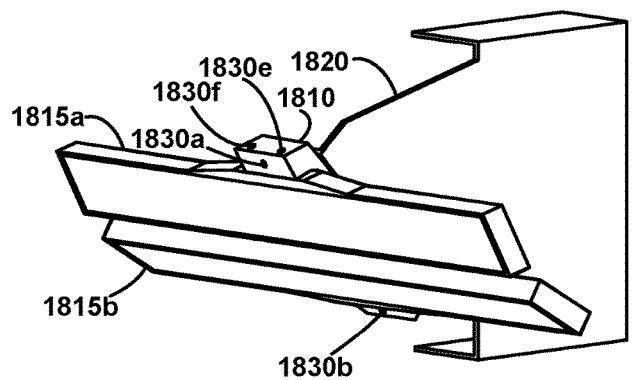
FIG. 19C is a perspective schematic view of portions of the alternative bracket mounting component of FIG. 18 wherein the bracing support and sensor mount are coupled with example depth sensors, as may be implemented in some embodiments.

FIG. 19A is a perspective schematic view of portions of the alternative bracket mounting component of FIG. 18 in an exploded, unassembled state, as may be implemented in some embodiments. In the unassembled state, the sensor mount 1810, the bracing support 1820, and depth sensor systems 1815*a* and 1815*b* may be unconnected. FIG. 19B illustrates how the sensor mount 1810 and the bracing support 1820 may be coupled by inserting screws, pins, or other coupling mechanisms via holes 1830*c* and 1830*d*. FIG. 19C is a perspective schematic view of the sensor mount 1810, the bracing support 1820, and depth sensor systems 1815*a* and 1815*b* all coupled together. As indicated, screws, pins, or other coupling mechanisms may be inserted through holes 1830*f* and 1830*e* to enter the securing mechanisms 1905*a* and 1905*b* respectively of the depth sensor system 1815*a* (though not visible in the diagram one will appreciate that screws, pins, or other coupling mechanisms may similarly be inserted through holes 1830*h* and 1830*g* visible in FIG. 18, though not identified in FIG. 19C) into the securing mechanisms of the sensor system 1815*b*). The upper viewing panel 1825*a* may then be secured by passing a screw, pin, or other coupling mechanism through upper viewing panel 1825*a* and into hole 1830*a*. Similarly, the lower viewing panel 1825*b* may then be secured by passing a screw, pin, or other coupling mechanism through viewing panel 1825*b* and into hole 1830*b*. Friction or grooves may be used, e.g., to ensure a secure fit in each of holes 1830*a-h* for the respective screw, pin, or other coupling mechanism.

Example Depth Sensor Frame for Modular Systems— "Standalone" Mounting

Rather than affix one or more depth sensor pairs to one or more brace brackets as described above, various of the embodiments may affix depth sensor pairs to the housing directly, or to fixed mounting structures within the housing. For example, FIG. 20A is a "see-through" view of a housing frame 2005 of a multi-angled depth sensor housing comprising depth sensors attached via "standalone mounts", rather than brackets, as may be implemented in some embodiments. Particularly, within the frame 2005 may be placed one or more paired sensor arrangements 2010a and 2010b. In this example, the depth sensors again resemble the form factor of the RealSense™ depth sensor system, though one will readily appreciate variations employing other depth sensors. As indicated by ellipses 2015, more than the two illustrated sensor mounts may be present and the mounts may be arranged in a substantially linear arrangement.

The mounts themselves may generally comprise two sensors at different angles and a mounting bracket. For example, FIG. 20B is a schematic view of a horizontal sensor mount as may be implemented in some embodiments. A top depth sensor system 2020 may be mounted above and at an angle relative to depth sensor system 2030. Each sensor may (as in the example of the RealSense™ depth sensor system) include, e.g., an infrared emitter 2020c, an infrared receiver 2020b (e.g., some embodiments may operate in approximately the 850 nm range), and a connection 2020a (e.g., an USB connection, FireWire™ connection, wireless BlueTooth™ connection, etc.) to a computer system managing a modular unit or the display system as a whole. Some depth sensors additional include an RGB sensor, as discussed in greater detail below, though, as illustrated here, that need not be the case in all embodiments. For a horizontal mount, an extension 2025b may attach the mount 2025a to the frame housing or to the scaffold supporting the display system. FIG. 20C is a schematic view of a vertical sensor mount as may be implemented in some embodiments. For a horizontal mount, an extension 2030b may attach the mount 2030a to the frame housing or to the scaffold supporting the display system. Screw holes for receiving either the extension 2025b or the extension 2030b may be provided in the same mount in some embodiments to permit the installation technician flexibility in their construction.

Figure 25A:
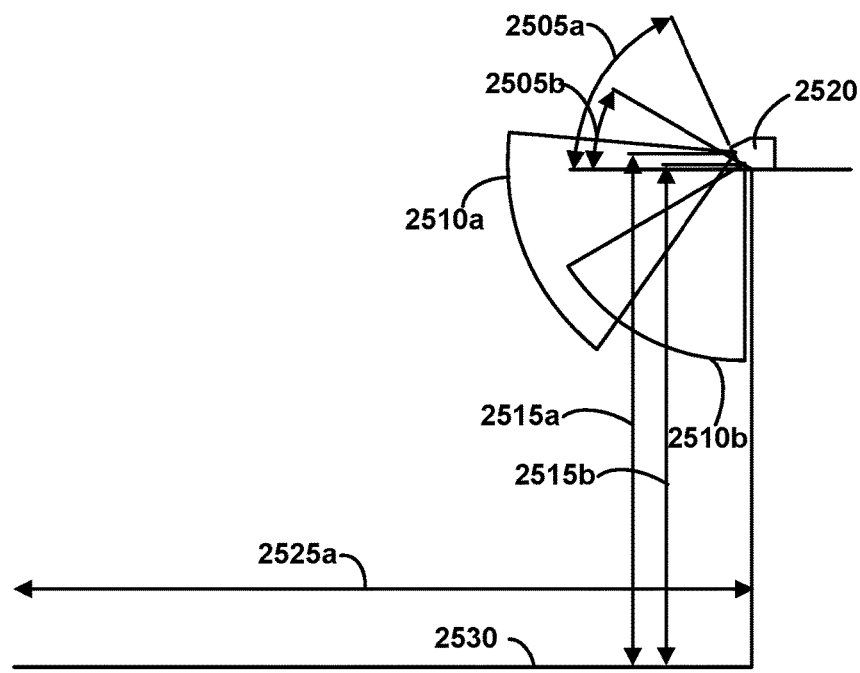
FIG. 25A is a side view of various dimensions for an example interaction system with a multi-angled depth sensor housing, as may be implemented in some embodiments.
Figure 25B:
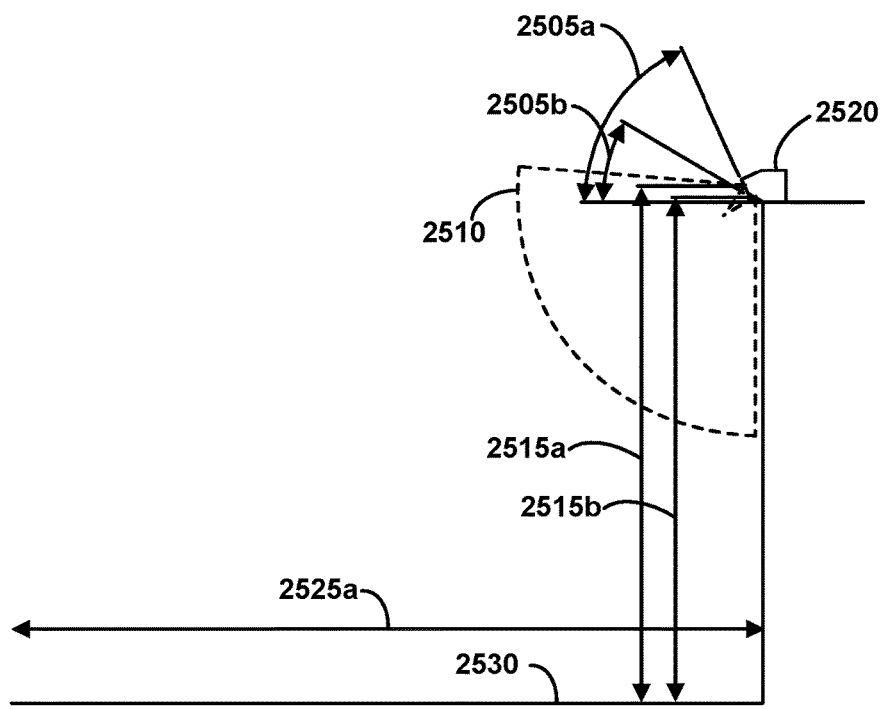
FIG. 25B is a schematic side view of the combined viewing angles for the system of FIG. 25A.

FIG. 20D is a schematic view of a the varied depth region fields of view achieved using a sensor mount of FIG. 20B or FIG. 20C as may occur in some embodiments. Though shown here as non-overlapping to facilitate understanding, one will appreciate that in some embodiments, e.g., as shown in FIGS. 25A and 25B, the fields of view for each sensor in a sensor pair may overlap substantially (this may be true for any of the disclosed mount types, including, e.g., bracket mounts, stand-alone mounts, etc.). Particularly, given depth sensors 2050a and 2050b, the angles precipitated by installation using the mounts of FIGS. 20B or 20C may result in corresponding fields of view 2055a and 2055b relative to floor 2040.

Figure 21A:
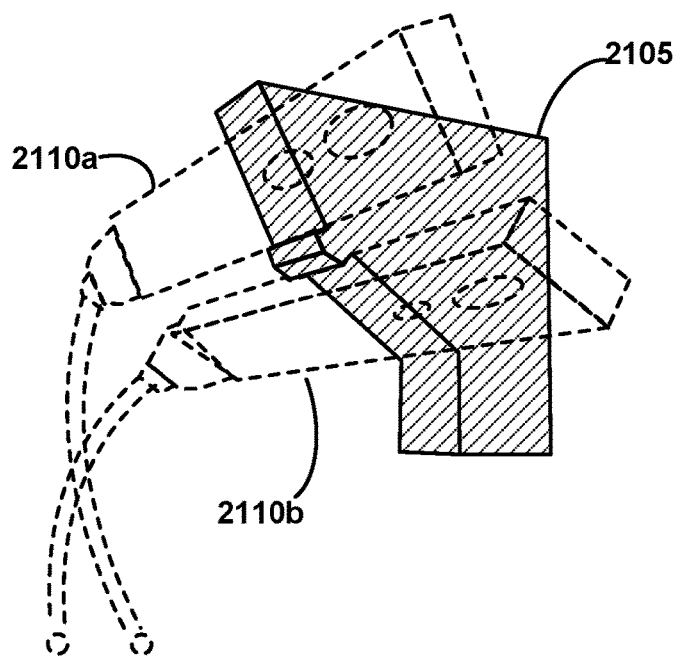
FIG. 21A is a schematic view of an example multi-angled standalone depth sensor mount with transparent depth sensor representations in their relative positions, as may be implemented in some embodiments.
Figure 21B:
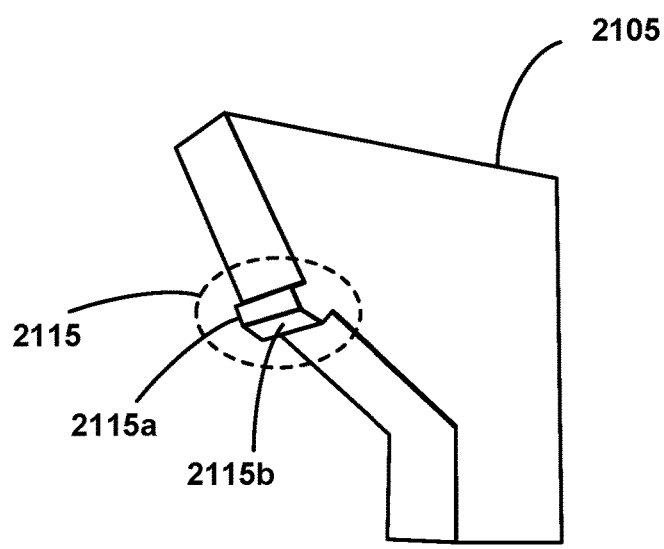
FIG. 21B is a schematic view of a multi-angled depth sensor mount without depth sensors, as may be implemented in some embodiments.

FIG. 21A is a schematic view of an example multi-angled standalone depth sensor mount 2105 with transparent depth sensor representations 2110a, 2110b in their relative positions, as may be implemented in some embodiments. FIG. 21B is a schematic view of a multi-angled depth sensor mount 2105 of FIG. 21A without depth sensors, as may be implemented in some embodiments. As illustrated, the mount 2105 may include a retaining extension 2115 including angled portions 2115a and 2115b configured to receive and retain the depth sensors 2110a, 2110b. However, as discussed herein, various embodiments may use screws, clamps, or other fixation devices to couple the sensors with the mount, in lieu of, or in addition to, a retaining extension 2115.

Figure 22:
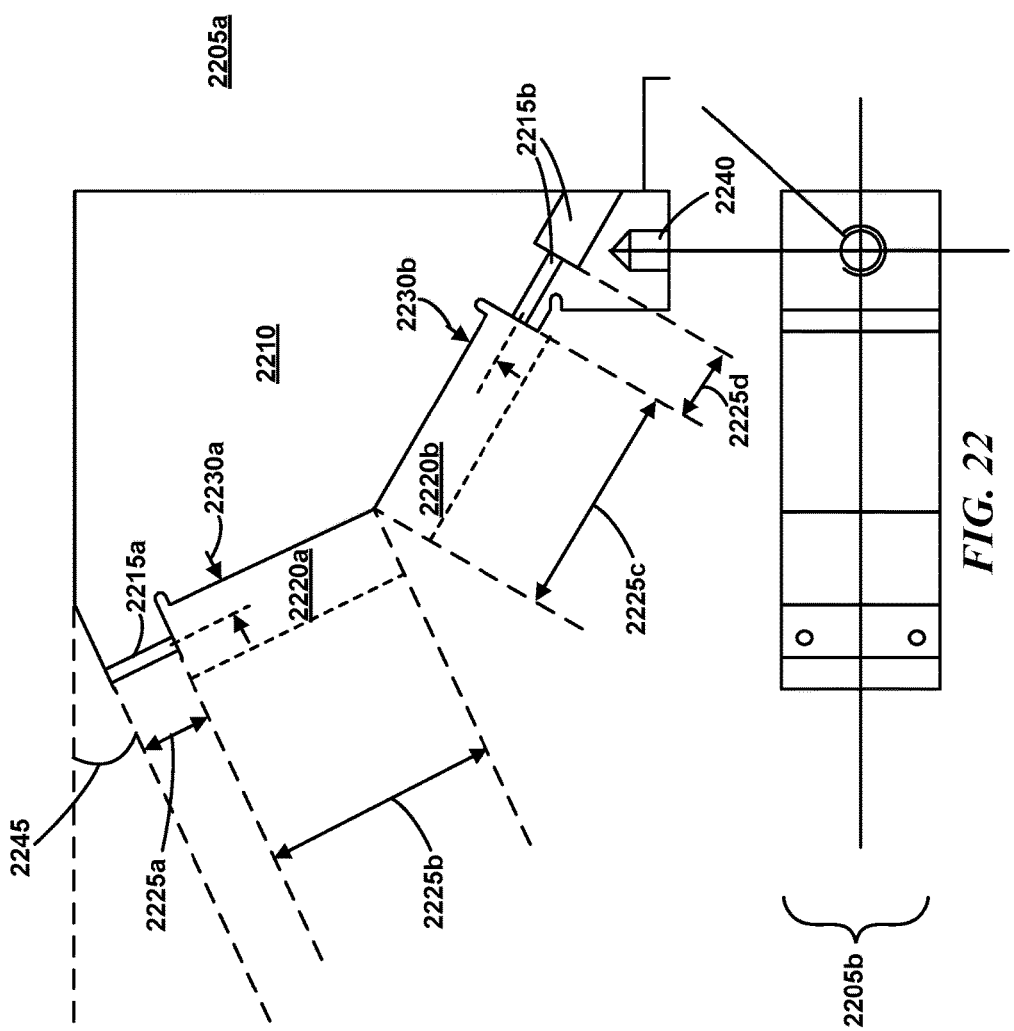
FIG. 22 is a schematic side view of various dimensions of an example multi-angled standalone depth sensor mount, as may be implemented in some embodiments.

For example, FIG. 22 is a schematic side view of various dimensions of an example multi-angled standalone depth sensor mount, as may be implemented in some embodiments. Complementing side view 2205a of the mount 2210 is a projected view 2205b upon a plane beneath the mount. As indicated, this mount 2210 may be mounted to the housing via a vertical screw entering receiver 2240 (e.g., passing through the bottom of the housing). The regions 2220a and 2220b indicate where each of the first and second depth sensor systems may reside on the mount (though, as discussed herein, both positions need not be filled in every embodiment). Each sensor system may have a receiver to accept a mounting screw, pinion, or other fixation mechanism. Access pathways 2215a and 2215b permit such fixation mechanisms to enter the receivers and thereby couple the depth sensor systems to the mount 2210. These may enter at positions from the mount corresponding to distance 2230a and 2230b (approximately half the width of the depth sensor system in this embodiment). The distances 2230a and 2230b may be substantially 5 mm in some embodiments. The angle 2245 may be substantially 25° in some embodiments. The lengths 2225a and 2225d may be substantially 12 mm in some embodiments. The lengths 2225b and 2225c may be substantially 38 mm in some embodiments.

Thus, in some embodiment the depth sensor system pairing may be mounted to a standalone mount or coupled with a brace bracket. In some embodiments, the pair may be bolted directly to the housing panels (e.g., without a holder). One will appreciate that various embodiments may use a particular sensor placement mechanism exclusively, or may use combinations of mechanisms within the housing.

Figure 23:
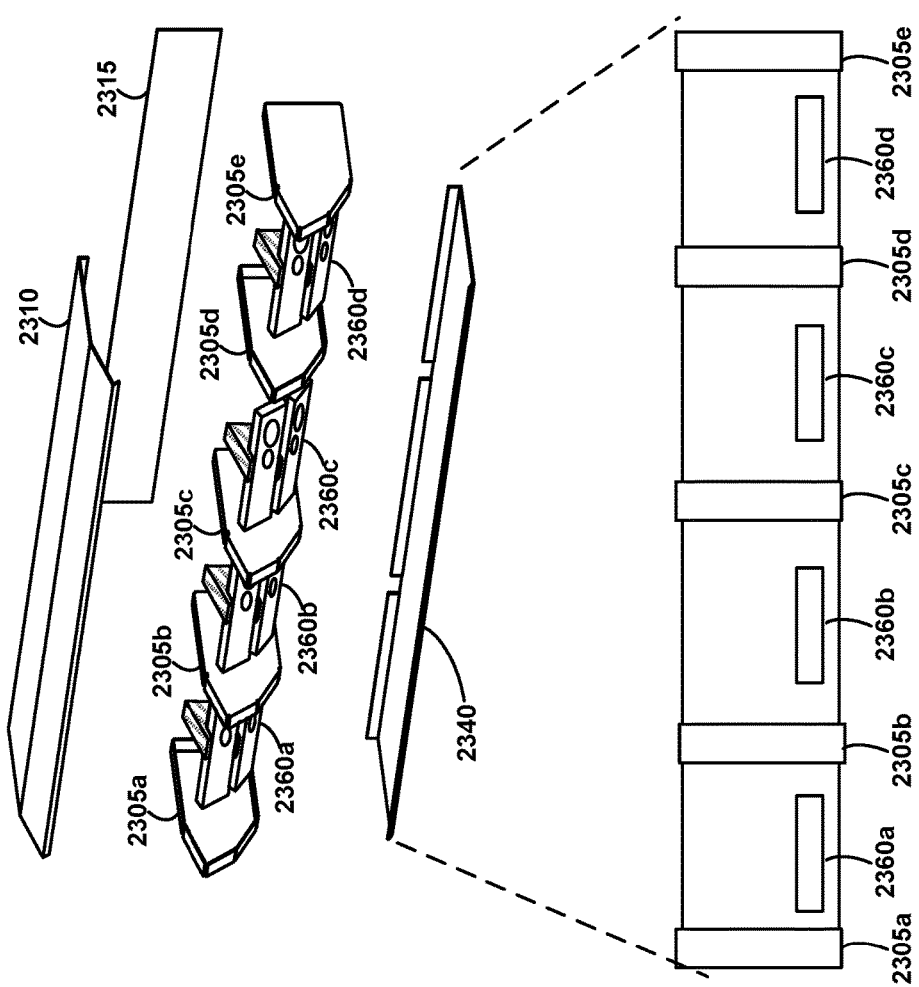
FIG. 23 is an exploded, schematic view of components in the frame of a multi-angled depth sensor housing, including exclusively standalone mounted sensor pairs, as well as schematic top-down cutaway view of the assembled structure, as may be implemented in some embodiments.

For example, FIG. 23 is an exploded, schematic view of components in the frame of a multi-angled depth sensor housing, including exclusively standalone mounted sensor pairs, as well as schematic top-down cutaway view of the assembled structure, as may be implemented in some embodiments. Within the housing formed by upper cover 2310, back panel 2315, bottom panel 2340 and the viewing panels (not shown), may be one or more standalone mounted depth sensor pairs 2360a-e (when standalone brackets are used, grooves 1620a-d may be omitted from the back panel 2315 in some embodiments). The pairs may be separated by zero or more spacers 2305a-e. The number of intervening spacers 2305b-d may be determined based, e.g., upon the materials used for the housing and the desired structural integrity of the housing for the anticipated deployment environment.

Figure 24:
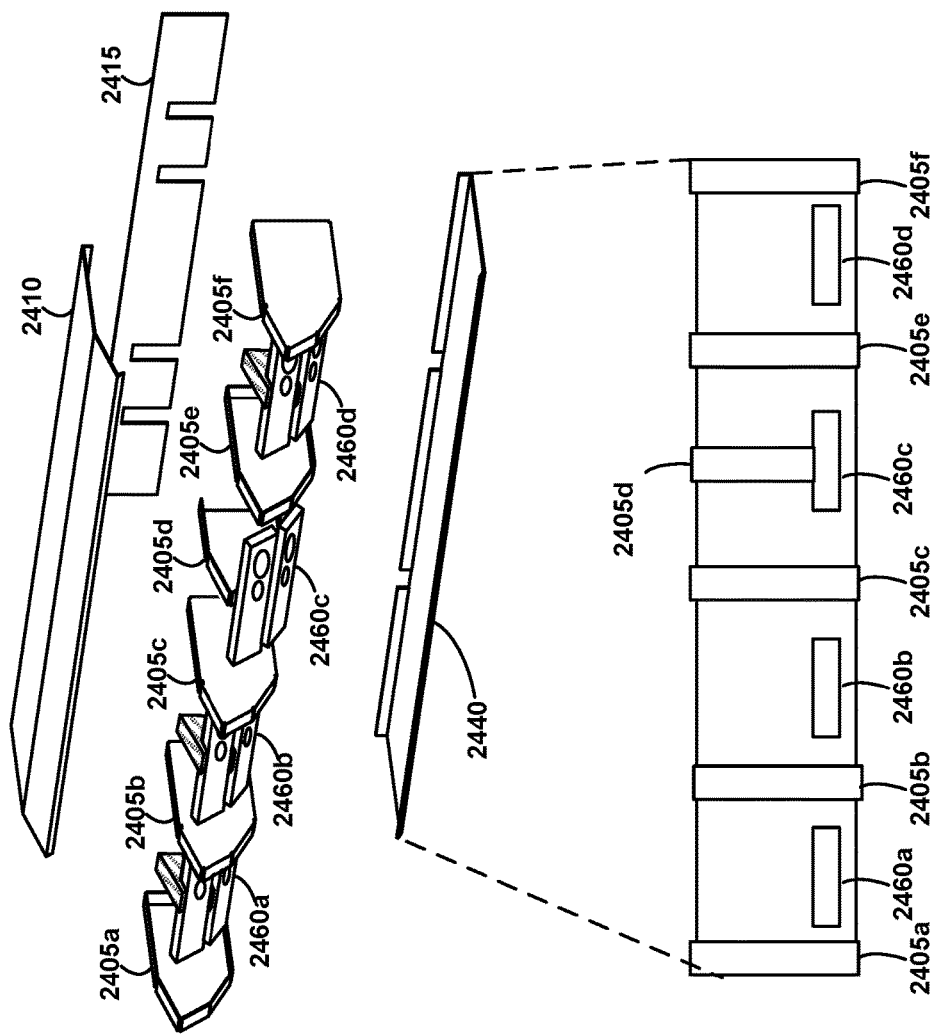
FIG. 24 is an exploded, schematic view of components in the frame of a multi-angled depth sensor housing, including both standalone mounted and bracket-mounted sensor pairs, as well as schematic top-down cutaway view of the assembled structure, as may be implemented in some embodiments.

In contrast to the exclusively standalone mounts of FIG. 23, FIG. 24 is an exploded, schematic view of components in the frame of a multi-angled depth sensor housing, including both standalone mounted and bracket-mounted sensor pairs, as well as schematic top-down cutaway view of the assembled structure, as may be implemented in some embodiments. Again, the housing may comprise back 2415, top 2410, and bottom 2440 panels. Between spacers 2405a-c,e,f may be placed both standalone mounted depth sensor pairs 2460a,b,d and bracket mounted depth sensor pairs 2460c (mounted, e.g., to brace bracket 2405d). In this example, the mounts have all their possible attachment points filled with sensors, however, less than all points may be used in some embodiments. Additionally, there is one mount per interval between spacers. One will appreciate that in some embodiments, more than one mount may be placed in an interval and some intervals may have no mounts. Additionally, though not shown here, one will appreciate that some or all of the depth sensor pairs may be mounted directly to the sensor view panels 1355a and 1355b or to the remainder of the housing.

FIG. 25A is a side view of various dimensions for an example interaction system with a multi-angled depth sensor housing 2520, as may be implemented in some embodiments. FIG. 25B is a schematic side view of the combined viewing angles for the system of FIG. 25A. Note that the depth field results depicted in FIGS. 25A and 25B may be achieved using depth sensor pairings mounted to the housing, standalone mounts, brace brackets, etc. Angle 2505a reflects the angle of the sensor view panel 1355a relative to the floor plane and may be approximately 65° in some embodiments. Angle 2505b reflects the angle of the sensor view panel 1355b relative to the floor plane and may be approximately 30° in some embodiments. The upper sensor within the housing 2520 may have a field of view 2510a of approximately 60° in some embodiments. The lower sensor within the housing 2520 may also have a field of view 2510b of approximately 60° in some embodiments. The upper depth sensor may be a height 2515a from the floor 2530 (in some embodiments, approximately 2.065 meters) and the lower depth sensor may be a height 2515b from the floor 2530 (in some embodiments, approximately 2.019 meters). In this example, the active area for interaction with the interface system may extend a distance 2525a from the display (in some embodiments, approximately 3 meters).

Together, the fields of view 2510a and 2510b may precipitate a composite field of view 2510, which may be approximately 95° in some embodiments.

Example Depth Sensor Frame for Modular Systems—RGB Camera Variation

Figure 26:
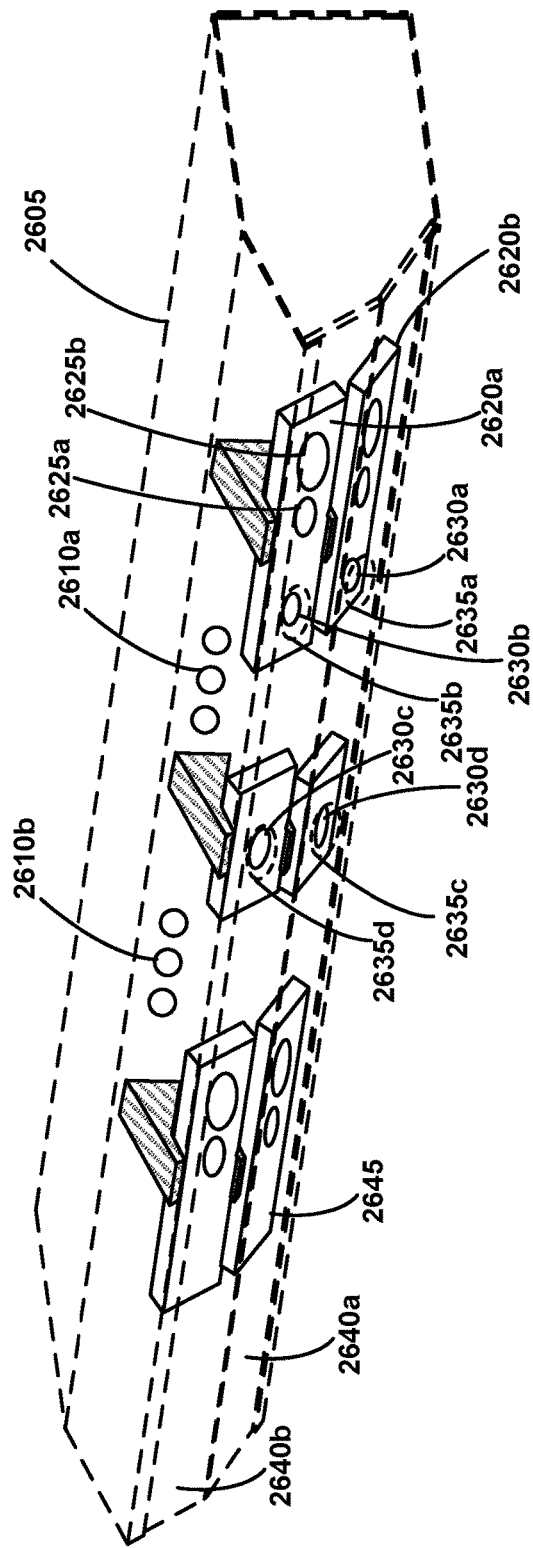
FIG. 26 is a "see-through" view of a frame for a multi-angled depth sensor housing, wherein both depth sensors and visual image sensors are installed, as may be implemented in some embodiments.

FIG. 26 is a "see-through" view of a housing frame for a multi-angled depth sensor housing 2605, wherein both depth sensors and visual image sensors are installed, as may be implemented in some embodiments. For example, depth sensor system 2620a may have a depth sensor emitter 2625b and depth sensor receiver 2625a (depth sensor system 2620b may likewise have corresponding emitters and receivers). While the depth sensor view panels 2640b and 2640a may permit, e.g., infrared frequencies to pass-through, both when emitted from the depth sensor emitter 2625b and when received at the depth sensor receiver 2625a, the view panels 2640b and 2640a may be opaque to visual frequencies (e.g., as an aesthetic or functional desire to prevent users from seeing the depth sensors). Accordingly, some embodiments contemplate incorporating holes, or alternative materials, into depth sensor view panels 2640b and 2640a at the locations 2635a-d to facilitate the capture of images in the visual range of wavelengths. For example, as in the case of the RealSense™ depth sensor, an RGB camera 2630a, 2630b may already be integrated into the depth sensor system. In some embodiments, independent RGB cameras 2630c and 2630d, dedicated exclusively for visual image capture may be used. The mounts may be adapted and reused for these RGB exclusive sensors to help ensure that they achieve the same or similar field of view as various of the depth sensors. In some embodiments, sensors exclusively dedicated to depth capture information, such as sensor 2645 may also be present within the housing frame. Consequently, as indicated by ellipses 2610a and 2610b, more mounts and sensors may be present within the housing than are shown here.

Example Gestures—"Trigger-point"

Figure 27A:
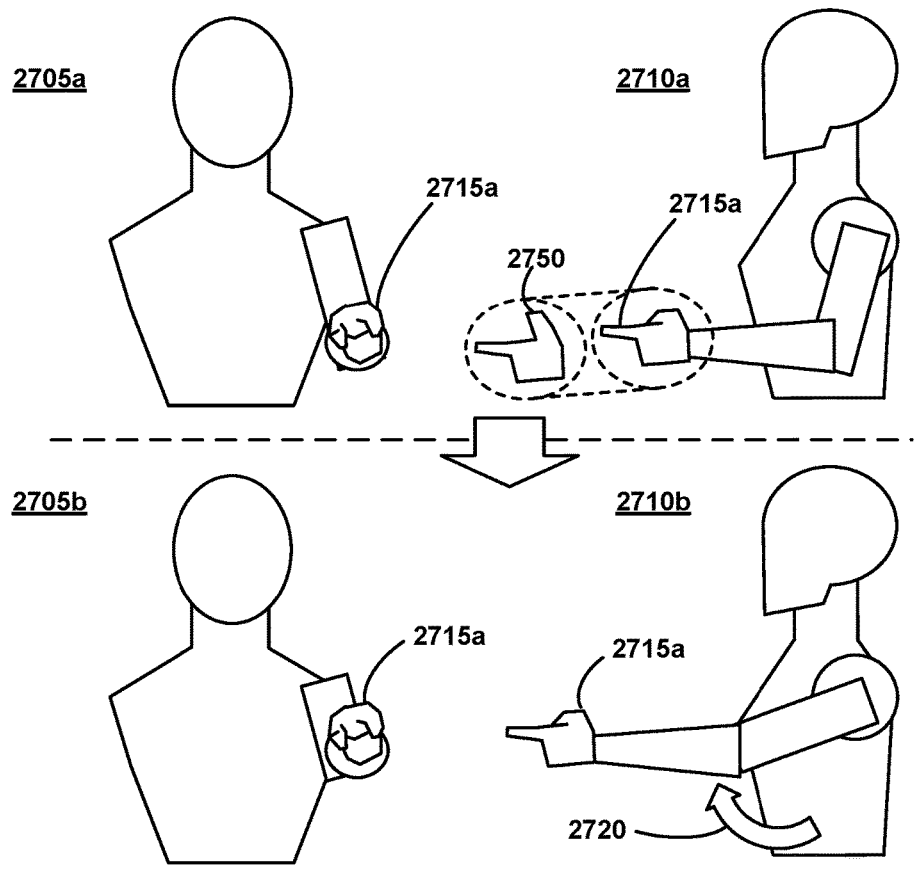
FIG. 27A is a schematic view of a user "trigger-point" gesture as may occur in some embodiments.

Various of the embodiments described herein may be used to recognize a corpus of gestures and sub-gestures. A "gesture" may itself be represented as a sequence of one or more successive relationships between different portions of the user. A "sub-gesture" may be a sub-sequence of that sequence. For example, FIG. 27A is a schematic view of a user "trigger-point" gesture as may occur in some embodiments. In an initial frontal view 2705a the user may form a "gun" shape with their hand 2715a. Here, only the user's left hand 2715a is shown, though the gesture may be performed with either or both hands. Similarly, in this example, the user's thumb need not be extended in mimicry of a trigger mechanism on a real gun (e.g., as illustrated in hand variation 2750). Whether the extension of the thumb may be used to identify the gesture may be based on context (e.g., when running a gaming application anticipating trigger gestures, such a specific action may not be required in contrast to, say, a general menu selection, which may distinguish trigger actions from general pointing). In some embodiments, as shown in side view 2710a, the user's forearm may be rotated so that the thumb is at the top of the hand.

Figure 27B:
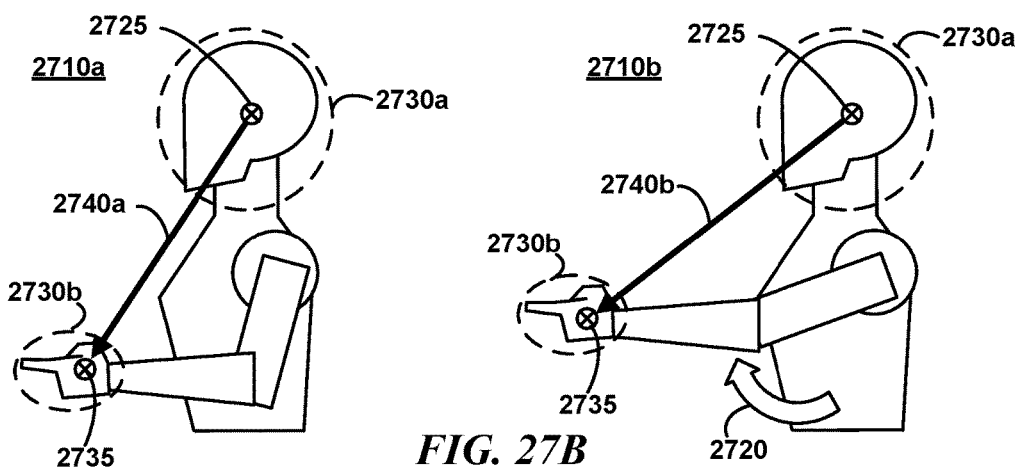
FIG. 27B is a schematic view of the correspondences which may be used to recognize a user "trigger-point" gesture in some embodiments.

In some embodiments, even without a successive temporal change, the system may recognize the user's hand in the orientation of side view 2710a as establishing the "trigger-point" gesture. However, by extending their arm forward, or forward and upward 2720, as in front view 2705b and side view 2710b, the system may take the successive states to constitute the gesture (e.g., as a "firing" action in a gaming context). Particularly, FIG. 27B is a schematic view of the correspondences which may be used to recognize a user "trigger-point" gesture in some embodiments. At each depth frame, the system may determine the first moment, or average depth value, for all the depth values classified as the user's head 2730a, here, the center of mass point 2725. Similarly, the system may determine the first moment 2735 of the depth values classified as being part of the user's hand 2730b. The system may then determine the three-dimensional vector 2740a from one of these locations to the other. This vector, in conjunction with the orientation and geometry of the user's hand 2715a may alone suffice for determining whether a "trigger-point" gesture is in effect. However, in some embodiments, the system may compare this vector with a subsequent vector 2740b. If the comparison yields an expected relation (e.g., a translation vector within some threshold), then the system may conclude, in conjunction with the hand geometry, that a trigger action is in effect. Thus, the gestures may be recognized as a sequence of conditions, e.g., that portions of the user's anatomy fulfill certain geometric conditions (e.g., an "upward palm", an "extended thumb", etc.) while also creating various vector relations (e.g., that various vector relations between user components transform within certain bounds).

Example Gestures—"Push"

Figure 28A:
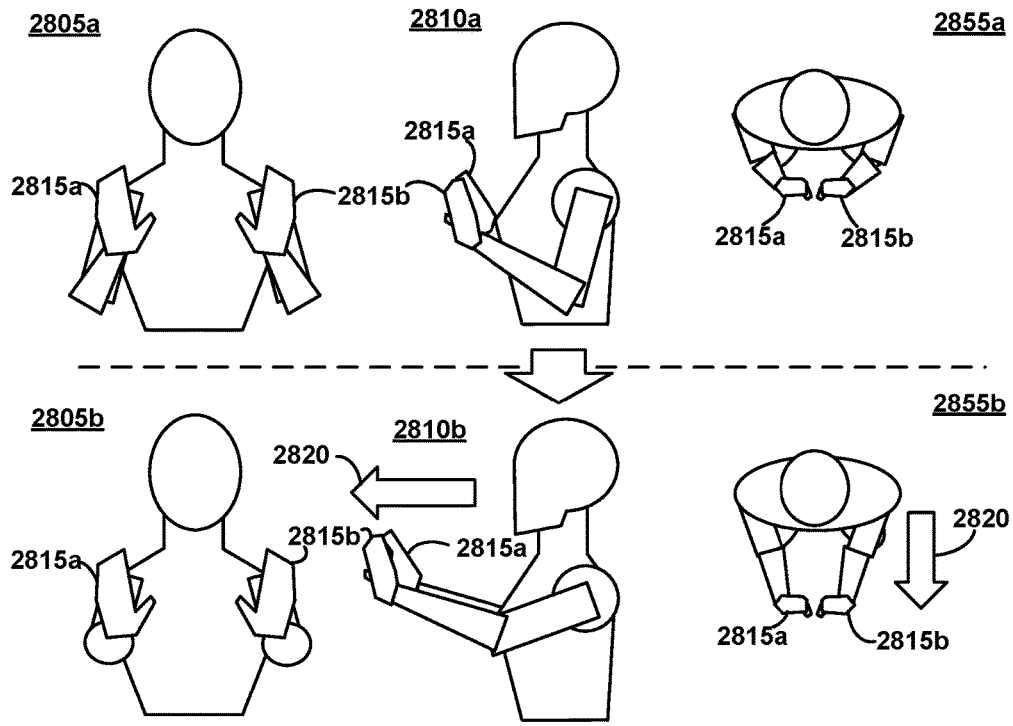
FIG. 28A is a schematic view of a user "push" gesture as may occur in some embodiments.

FIG. 28A is a schematic view of a user "push" gesture as may occur in some embodiments. Particularly, as shown in frontal 2805a, side 2810a, and overhead 2855a views, the user may initially have the palms of both hands 2815a and 2815b facing out before them. At a subsequent time, as shown by frontal 2805b, side 2810b, and overhead 2855b views, the user may move both hands 2815a and 2815b forward 2820.

Figure 28B:
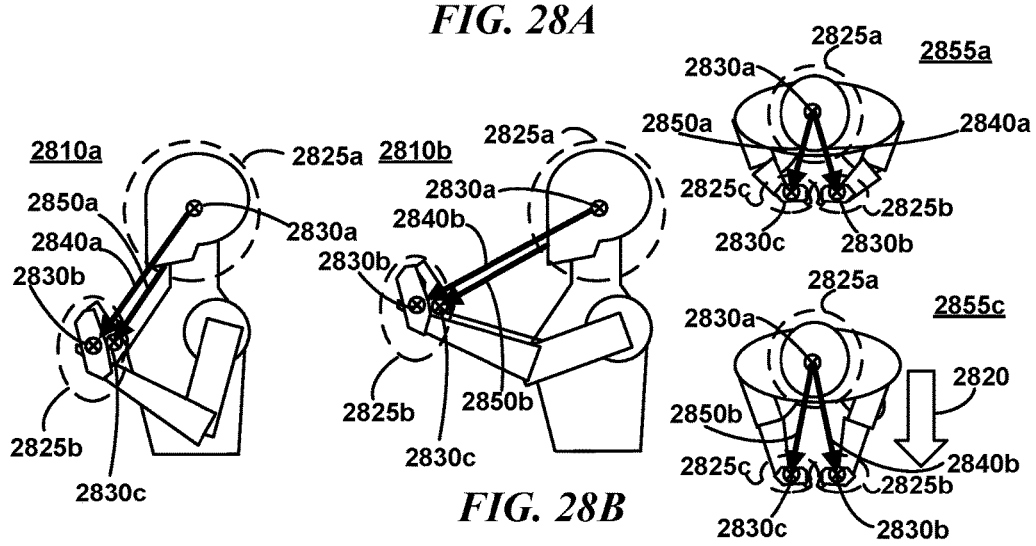
FIG. 28B is a schematic view of the correspondences, which may be used to recognize a user "push" gesture in some embodiments.

Again, the system may detect the gesture by comparing various vector relations. Particularly, FIG. 28B is a schematic view of the correspondences, which may be used to recognize a user "push" gesture in some embodiments. In the starting position, vectors 2850a and 2850b may be taken from the center of mass 2830a of the head classified depth values 2825a to the centers of mass for each of the user's left hand 2830b and right hand 2830c. Again, the centers of mass 2830b and 2830c may be determined as the first moments of the pixels of the user's left 2825b and right 2825c hands respectively. The variation in the vectors (e.g., the transform from vectors 2850a and 2840a to vectors 2850b and 2840b respectively) in conjunction with the user's hand orientations may serve as the system's basis for determining the presence of the gesture. One will appreciate that "first moments", "means", "centers of mass", etc. may be used interchangeably herein. Fixed offsets from depth value groupings may also be used in some embodiments.

Example Gestures—"Reveal"

Figure 29A:
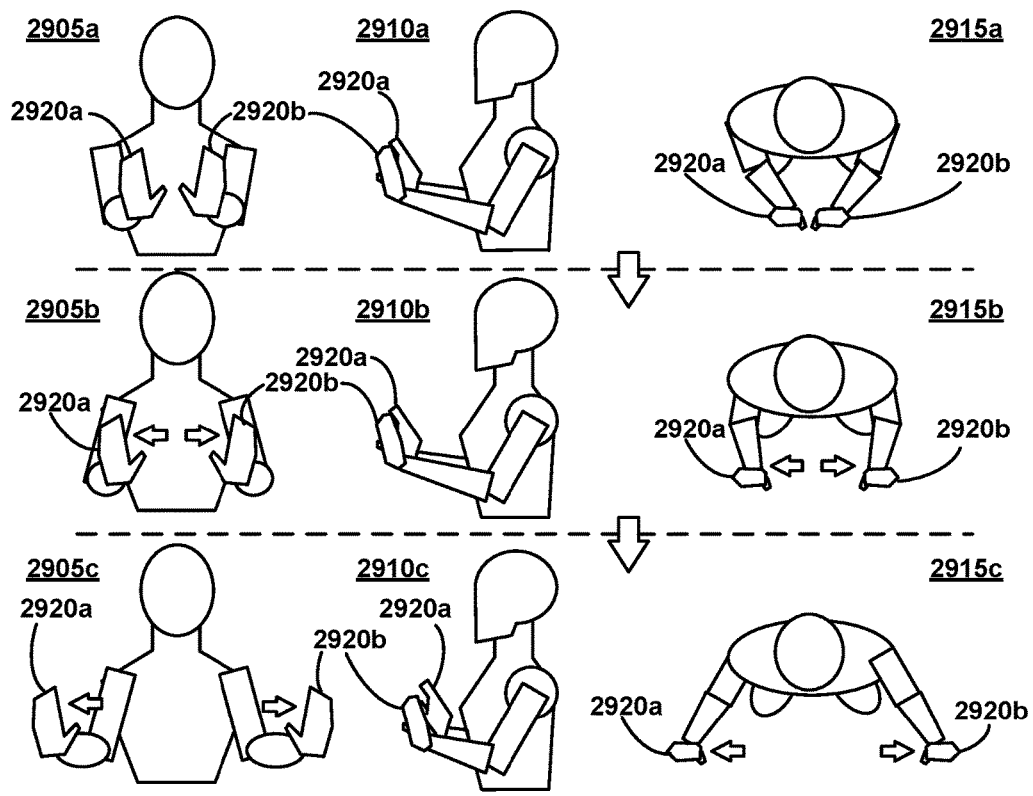
FIG. 29A is a series of schematic front and side views of steps in a "reveal" gesture, as may occur in some embodiments.

FIG. 29A is a series of schematic front and side views of steps in a "reveal" gesture, as may occur in some embodiments. Initially, as shown in frontal 2905a, side 2910a, and overhead 2915a views, the user may initially have the palms of both hands 2920a and 2920b facing out before them and being close together. At a subsequent time, as shown by frontal 2905b, side 2910b, and overhead 2915b views, the user may move both hands 2915a and 2915b forward 2920. As indicated by frontal 2905b, side 2910b, and overhead 2915b views, and frontal 2905c, side 2910c, and overhead 2915c views, the user may move their hands 2920a and 2920b progressively further apart, as though separating a pair of drapes, or moving coats in a coat rack, etc.

Figure 29B:
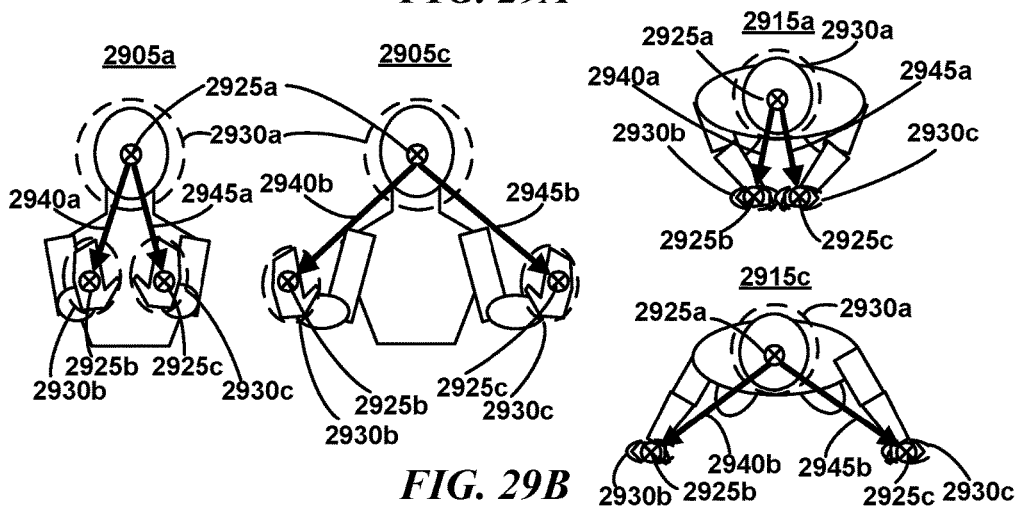
FIG. 29B is a frontal and overhead schematic view of various correspondences as may be used to detect the "reveal" gesture of FIG. 29A in some embodiments.

FIG. 29B is a frontal and overhead schematic view of various correspondences as may be used to detect the "reveal" gesture of FIG. 29A in some embodiments. Particularly, vectors 2940a and 2945a may be formed by comparing the center of mass 2925a of the user's head classified depth values 2930a with the center of masses 2925b and 2925c of the user's right 2930b and left 2930c hand classified depth values. The one or more computer systems associated with the user interface may then compare vectors 2940a and 2945a with the vectors 2940b and 2945b resulting at a subsequent time in conjunction with the user's hand orientation to determine the execution of the "reveal" gesture.

Example Gestures—"Swipe"

Figure 30A:
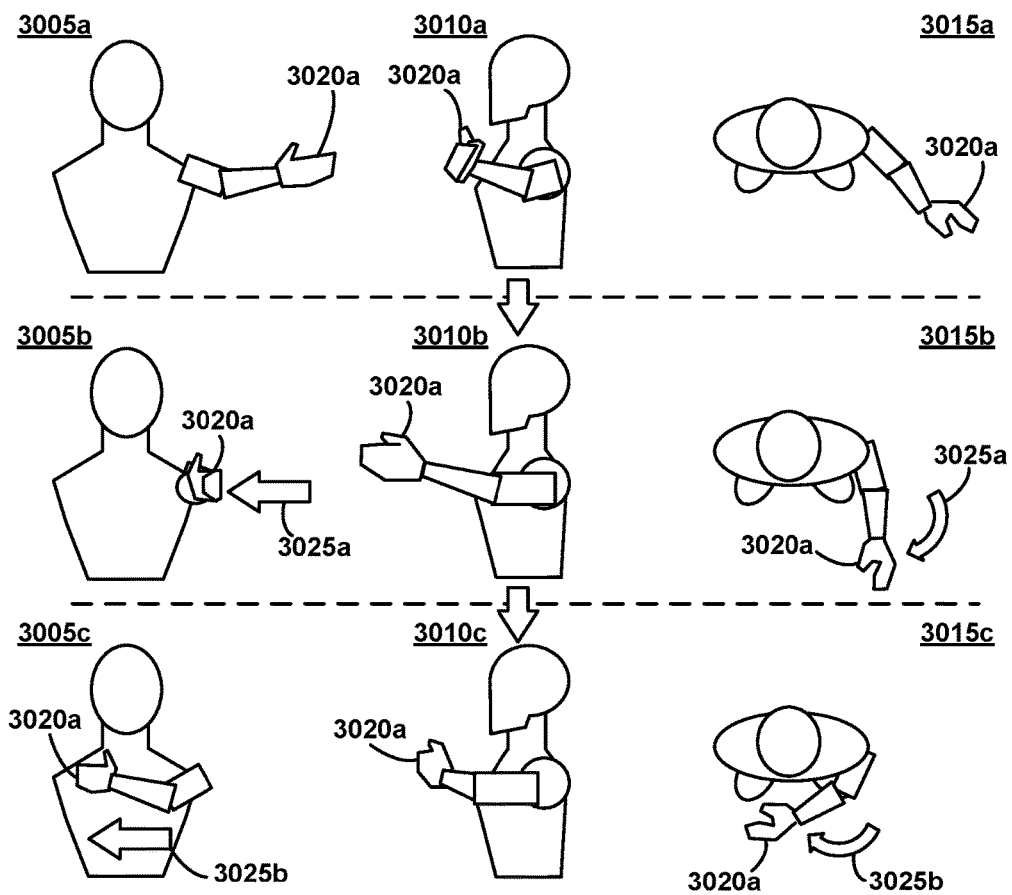
FIG. 30A is a series of schematic front, side, and overhead views of steps in a "swipe" gesture, as may occur in some embodiments.

Much like a finger-swipe used on some handheld devices, some embodiments may recognize a forearm gesture as corresponding to similar "swipe" functionality. FIG. 30A is a series of schematic front, side, and overhead views of steps in a "swipe" gesture, as may occur in some embodiments. Initially, as shown in frontal 3005a, side 3010a, and overhead 3015a views, the user may initially have one arm outstretched substantially from their side, such that a hand 3020a is in parallel, or almost in parallel, with the plane of the user's torso. At subsequent times, as shown by frontal 3005b, side 3010b, and overhead 3015b views, as well as frontal 3005c, side 3010c, and overhead 3015c views, the user may move the hand 3020a across their torso as indicated by motion arrows 3025a and 3025b. In some embodiments, a smaller, lateral movement of the hand at the user's wrist, rather than the grosser, arm-swipe shown here, may also be recognized as a "swipe".

Figure 30B:
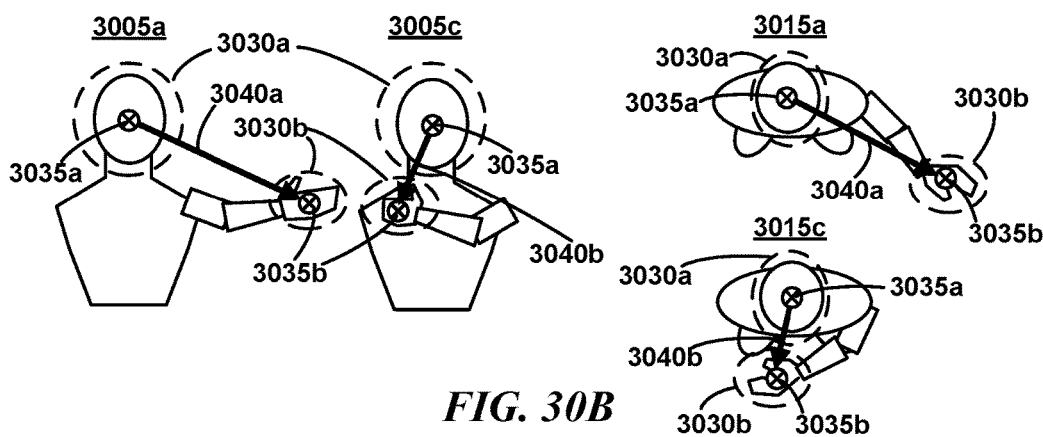
FIG. 30B is a frontal and overhead schematic view of various correspondences as may be used to detect the "swipe" gesture of FIG. 30A in some embodiments.

FIG. 30B is a frontal and overhead schematic view of various correspondences as may be used to detect the "swipe" gesture of FIG. 30A in some embodiments. Particularly, the system may determine a vector 3040a from the center 3035a of the head classified depth values 3030a to the center 3035b of the user's hand classified values 3030b. The system may then compare the vector 3040a with the subsequently determined vector 3040b in conjunction with the user's hand orientation to determine that a "swipe" gesture has been performed.

Naturally, the swipe gesture may be performed by either hand. The gesture may be used, e.g., to cycle through options in a menu or to dismiss a menu dialog. Accordingly, one will appreciate that the gesture may be performed in the reverse direction, with the other hand, in an alternative direction (e.g., vertically up and down), swiping with the back of the hand, rather than the palm, etc.

Example Gestures—"Circle"

Figure 31A:
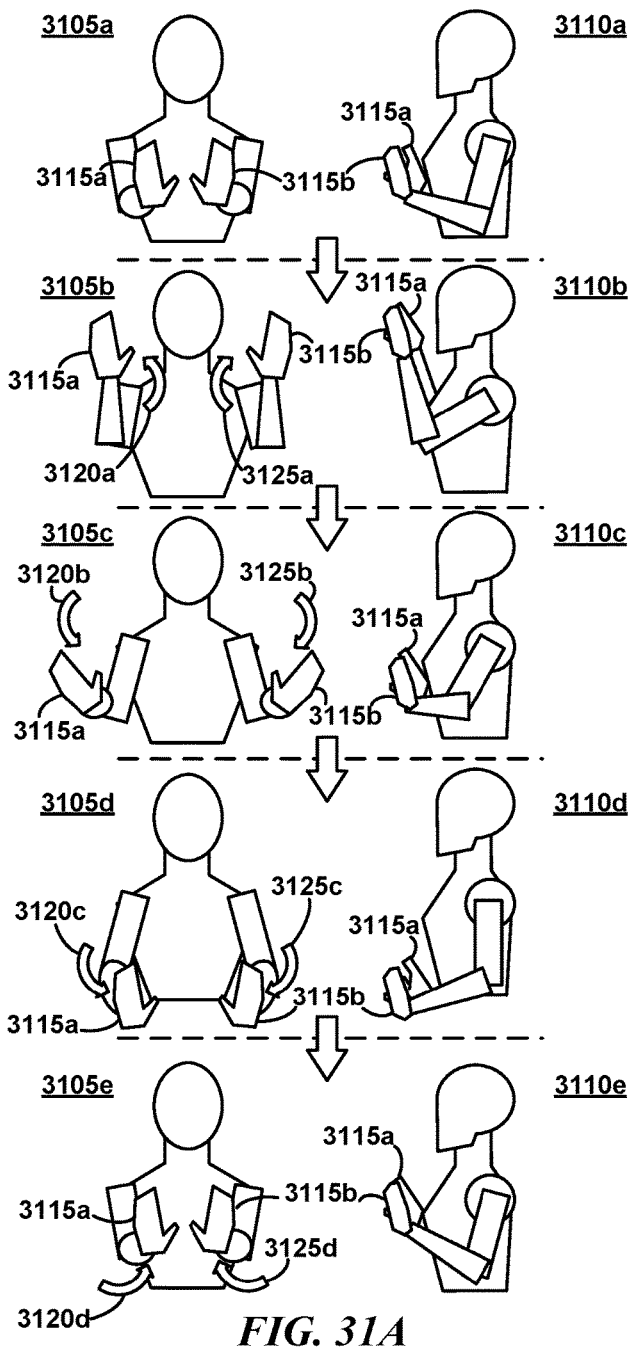
FIG. 31A is a series of schematic front and side views of steps in a "circle" gesture, as may occur in some embodiments.
Figure 31B:
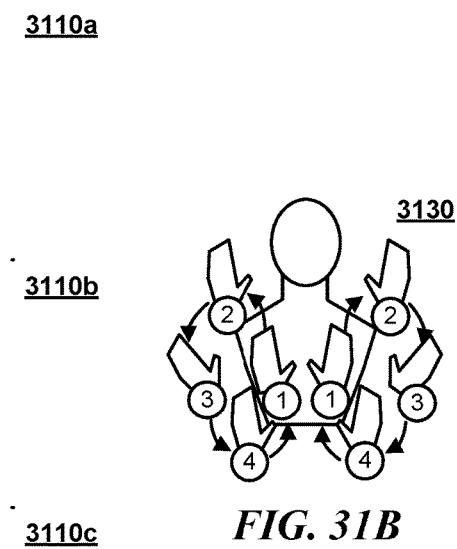
FIG. 31B is a composite frontal view of the hand orientations associated with the correspondences that may be used for detecting the "circle" gesture of FIG. 31A in some embodiments.

FIG. 31A is a series of schematic front and side views of steps in a "circle" gesture, as may occur in some embodiments. Particularly, as evidenced by frontal 3105a-e and side 3110a-e views, the user may rotate their left 3115b and right 3115a hands in (from the user's perspective) a counter-clockwise and clockwise set of rotations (though one will appreciate that rotation in the opposite direction may also be recognized in a gesture in its own right). As evidenced by motion arrows 3120a-d and 3125a-d the rotations may be reflected as a series of smaller relations between hand positions. FIG. 31B is a composite frontal view 3130 of the hand orientations associated with the correspondences that may be used for detecting the "circle" gesture of FIG. 31A in some embodiments. For example, the system may break the circle down into series of frame positions, here represented by the numbers 1-4. Ultimately, the user may return their hands to substantially the same position as when they began the gesture (e.g., as in the views 3105a and 3110a).

Figure 31C:
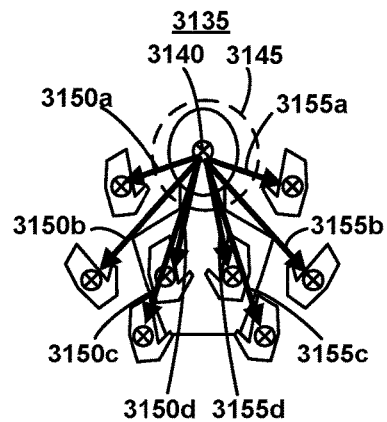
FIG. 31C is a composite frontal view of the correspondences that may be used for detecting the "circle" gesture of FIG. 31A in some embodiments.

FIG. 31C is a composite frontal view 3135 of the correspondences that may be used for detecting the "circle" gesture of FIG. 31A in some embodiments. Particularly, the entire circular had motion may be broken into a sequence of hand positions, which may themselves be represented by a plurality of vectors 3150a-d from the center 3140 of the head classified depth value pixels 3145 to the center user's right hand classified depth values and a corresponding plurality of vectors 3155a-d from the center 3140 of the head classified depth value pixels 3145 to the center of the user's left hand classified depth value pixels.

One will appreciate that additional sub-gestures may be created in an analogous manner. For example, the individual circular motion of each hand may itself serve as a "single hand circle" gesture. Additionally, the direction of the rotations may be reversed. Ellipses, and other arbitrary hand motions may likewise be detected via a sequence of vector relations.

Example Gestures—"Crouch"

Not all gestures need be performed with the user's hands. Additionally, the vectors used to identify gestures may be between successively captured frames, rather than components within a single frame.

For example, FIG. 32A is a series of schematic front and side views of steps in a "crouch" gesture, as may occur in some embodiments. FIG. 32B is a frontal and overhead schematic view of various correspondences as may be used to detect the "crouch" gesture of FIG. 32A in some embodiments. Generally, by bending their knees and torso as indicated in front 3205a, 3205b and side 3210a, 3210b views the user may precipitate one or more correspondences that may serve to identify a "crouching" gesture to the system.

In some embodiments, the system may use a single vector 3240 taken from the center 3220b of the user's torso-classified depth values 3215b in an earlier frame to the center 3220a of the user's head-classified depth values 3215a to recognize the performance of a "crouch" gesture.

For example, the vector may normally point upward. However, when the user lowers their head, the vector may reduce in size and even change direction. Such a direction change may be used to recognize a "crouching" gesture (though one will readily appreciate that other correspondences, such as between the head itself at different times, may also suffice).

Example Gesture Detection Methodologies—Example Processes

Figure 33:
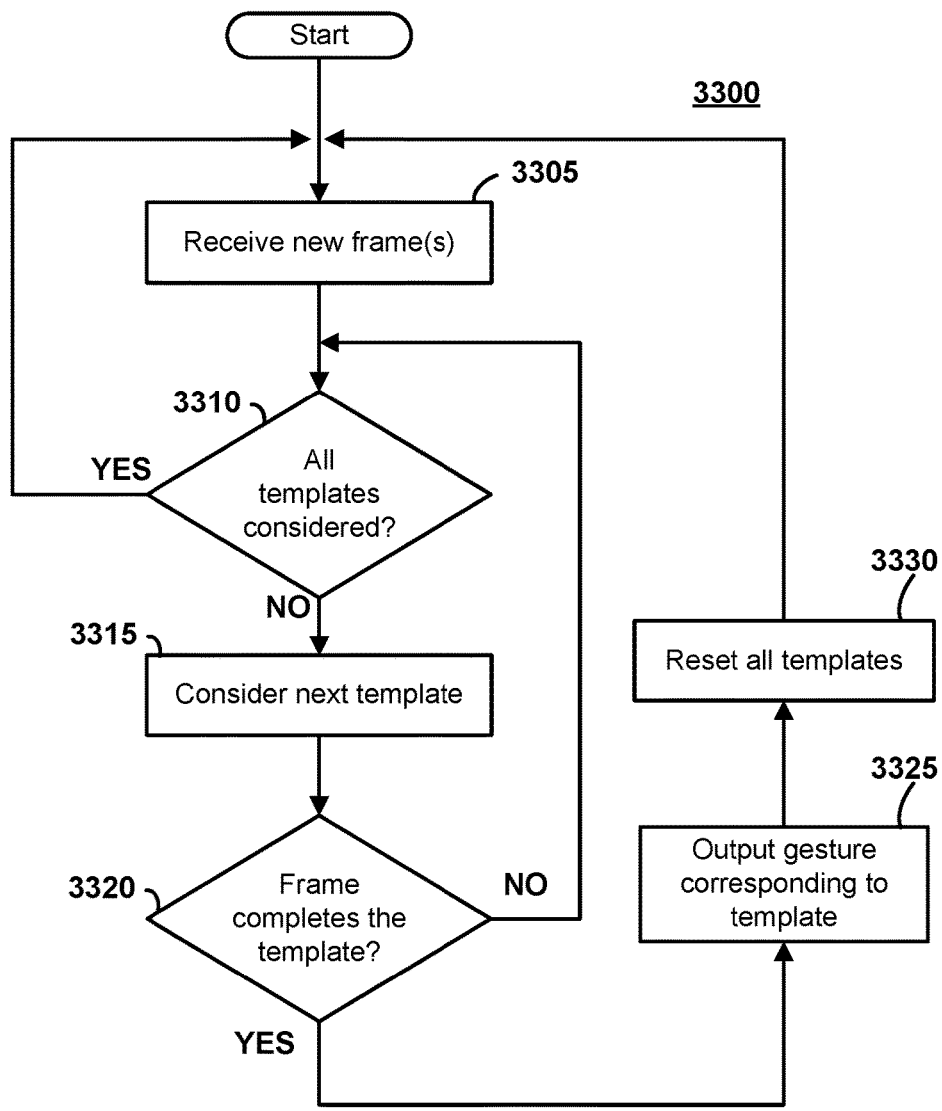
FIG. 33 is a flow diagram illustrating aspects of a gesture detection process as may be implemented in some embodiments.

FIG. 33 is a flow diagram illustrating aspects of a gesture detection process 3300 as may be implemented in some embodiments. At block 3305, the computer system may receive one or more new depth frames from the one or more depth sensors on the interface.

The system may then consider the newly acquired and any previous frames in conjunction with a template at block 3315 until all the gesture templates have been considered at block 3310 or until a template matching the acquired frames is found at block 3320. Where no matching frame has been found after all the templates have been considered the system may continue to acquire new depth frames. A template may simply be a stored collection of sequential conditions, the fulfillment of which, may be recognized by the computer system as corresponding to the successful completion of a gesture.

However, if a match occurs at block 3320, the system may output the gesture corresponding to the template at block 3325, e.g., to an application waiting for user input in the form of recognized gestures, before resetting all the templates at block 3330. In some embodiments "resetting" a template may simply mean marking or clearing a flag so that templates do not consider frames from the presently recognized gesture in their subsequent evaluations. For example, it may be desirable after recognizing a gesture for the system to "start fresh" rather than misinterpreting the conclusion of a previous gesture as the beginning of a subsequent one. As discussed below, some embodiments may instead recognize both gestures and their sub-gestures.

Figure 34:
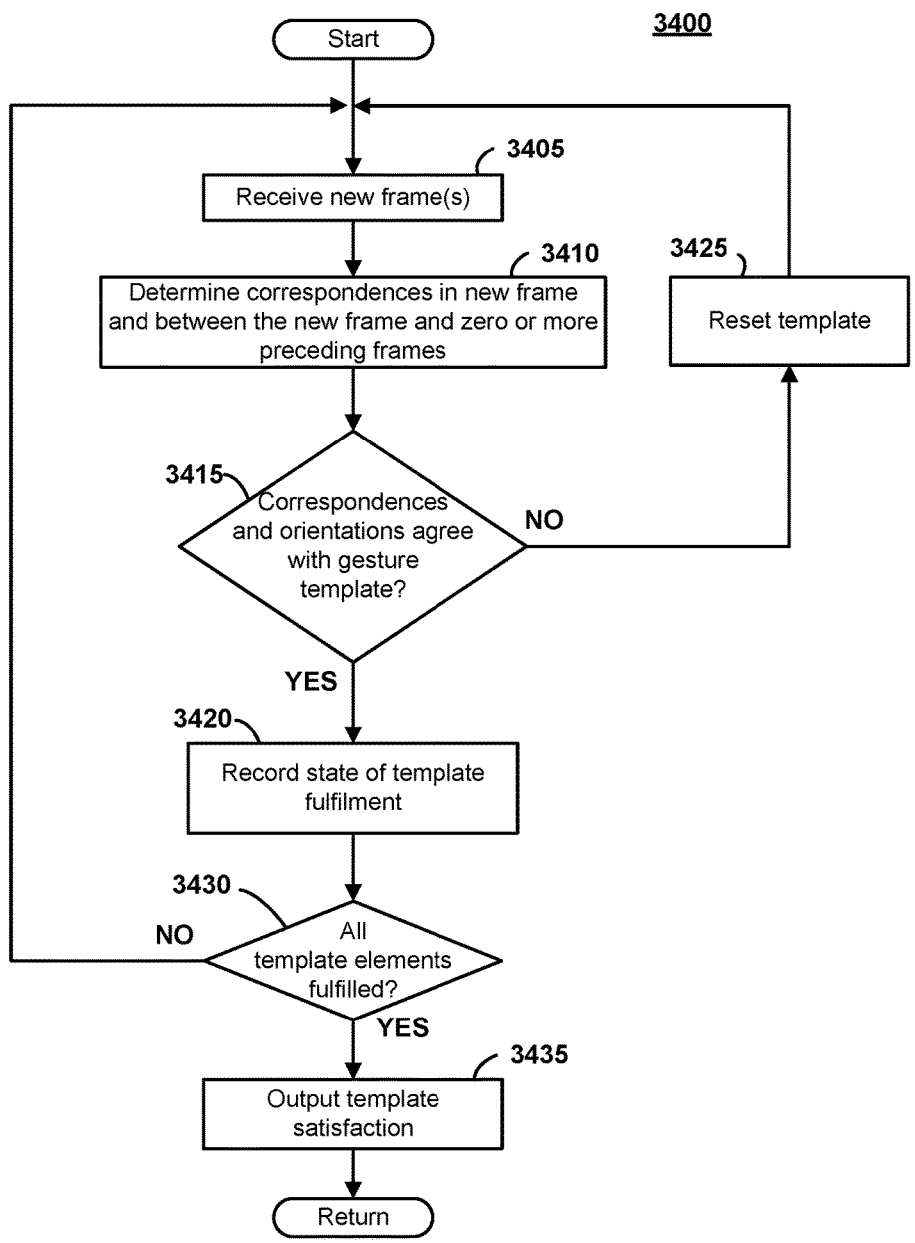
FIG. 34 is a flow diagram illustrating aspects of a gesture template fulfilment determination process as may be implemented in some embodiments.

FIG. 34 is a flow diagram illustrating aspects of a gesture template fulfilment determination process 3400 as may be implemented in some embodiments. For example, the process 3400 may occur as part of blocks 3315 and 3320. Templates may comprise data structures having a series of conditional elements that must be fulfilled in order for the gesture to register with the system.

At block 3405, the template process may receive a new frame (e.g., the newly acquired frame at block 3305 being made available to the template at block 3320). At block 3410, the system may determine the correspondences between this frame and zero of more preceding frames, depending upon the gesture. For example, a template for the "crouch" gesture may compare the vector between the center of the user's torso at a previous frame to the center of the user's head in the new frame as discussed above to detect the gesture. Conversely, the system may determine vectors between the user's head and the user's hands to see if a sequence of such vectors fulfills the conditions for a "circle" gesture.

If the template elements (e.g., a sequence of correspondences, a sequence of hand orientations, etc.) do not agree with the incoming frame at block 3415 then the template may reset itself at block 3425. Conversely, if the frame continues to agree with the template at block 3415 (e.g., if the next unfulfilled set of elements agree) then the system may continue to note the fulfillments at block 3420. For example, gestures may require a sequence of vector correspondences, which are reflected in the template elements. When that sequences is disrupted, the template may "abandon" the current matching and begin anew.

As one example, consider a "circle" gesture template. The template's elements may require that the first frame have the user's left and the right hands in a position and orientation substantially as indicated in views 3105a and 3110a. Subsequent frames should then follow the path constraints established using the vectors 3150a-d and 3155a-d for the remaining template's elements to be fulfilled. If the user's hands depart from these constraints, the elements will not be fulfilled and the template may be reset at block 3425. In contrast, if all the elements continue to be fulfilled until the user has returned to substantially the position as indicated in views 3105a and 3110a then at block 3430 the system may determine that the template has been fulfilled and note this in an output at block 3435 (e.g., causing the system to transition from block 3320 to block 3325).

Example Gesture Detection Methodologies—Example Gesture Structures

Figure 35A:
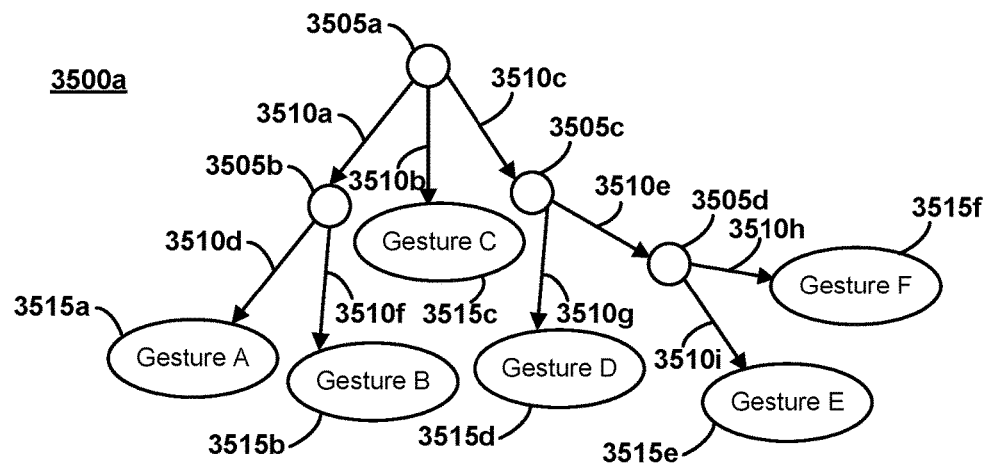
FIG. 35A is an example tree diagram illustrating correspondence relationships between a plurality of gestures as may occur in some embodiments.

Some embodiments recognize gestures as discrete units. For example, FIG. 35A is an example tree diagram illustrating correspondence relationships between a plurality of gestures as may occur in some embodiments. Particularly, each edge 3510a-i represents the fulfillment of a sequential element constraint (or collection of constraints for a given frame). Some gestures may share an initial constraint (nodes 3505a-e are merely provided for the reader's reference to identify mutually exclusive elements). For example, all three of gestures D, E, and F (3515d-f) begin with the same condition 3510c. Per the above examples, both the "push" and "circle" gestures may begin with the respective templates recognizing that the user has placed both hands palm outward in the depth frame. The structure of the tree 3500a is such that the gestures 3515a-f do not involve "sub-gestures". That is, if a gesture requires sequential elements A, B, C, and D, then a gesture comprising only the sequential elements A, B, and C is not considered in the corpus.

Figure 35B:
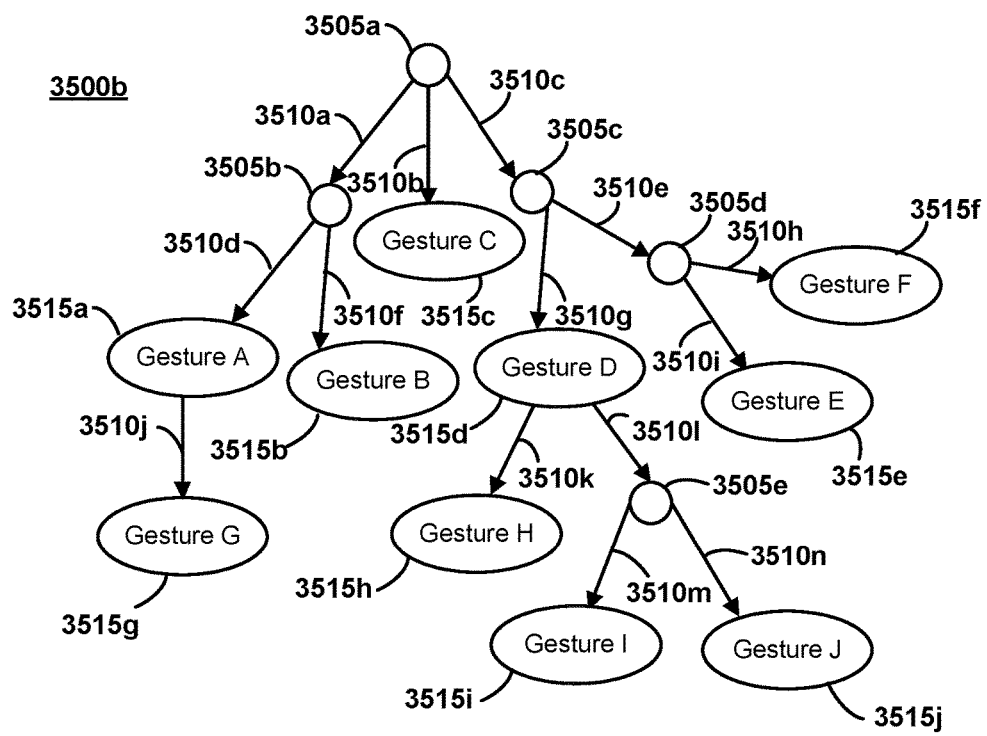
FIG. 35B is an example tree diagram illustrating correspondence relationships between a plurality of gestures, including sub-gestures, as may occur in some embodiments.

In contrast, FIG. 35B is an example tree diagram illustrating correspondence relationships between a plurality of gestures, including sub-gestures, as may occur in some embodiments. Unlike the tree structure 3500a, the structure 3500b does permit for sub-gesture recognition. Particularly, each of the gestures 3515g-j includes various conditions 3510j-n, which are in addition to those required for various sub-gestures 3515a and 3515b. Embodiments which permit sub-gestures may need to qualify or modify the processes of FIGS. 33 and 34 so that "fulfillment" of a gesture does not occur until the frames have satisfied one template and are not able to satisfy any others. For example, having satisfied conditions 3510c and 3510g, the system may wait until the subsequent frames indicate that conditions 3510k and 3510l have not be fulfilled, before outputting that Gesture D 3515d has been recognized. In contrast, if condition 3510k was immediately satisfied, then the system may output that Gesture I 3515i was satisfied in lieu of Gesture D 3515d. In some embodiments, rather than outputting the most recently complete sub-gesture in the chain if there are one or more satisfied subsequent conditions before reaching a failed condition, the system may simply reset all the templates, and assume no gesture was met. For example, if condition 3510i was fulfilled, but neither of conditions 3510m or 3510n were fulfilled, then the system may, in some instances, indicate that no gesture has been recognized rather than output Gesture D 3515d (in contrast, if condition 3510i was never fulfilled, the system may output Gesture D 3515d). The decision whether to recognize a sub-gesture when a downstream condition may be based upon context or the specifications of an application designer.

Example Gesture Detection Methodologies—Gesture Reservations

Figure 36:
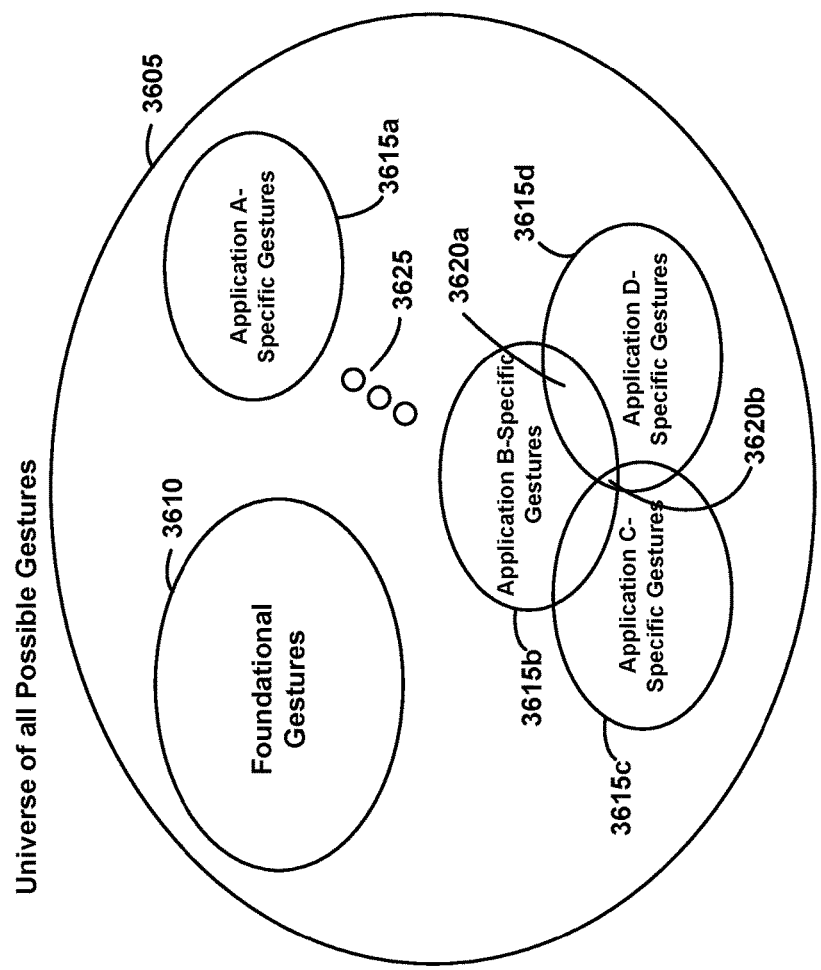
FIG. 36 is a Venn diagram illustrating various gesture-set relations as may occur in some embodiments.

In some embodiments, the user interfaces may serve as a "general purpose" system upon which application developers implement different applications. For example, the system may have a generic "operating system" environment in which the user interacts to select the developer applications to run. In these embodiments, it may be necessary for the system to specify certain "foundational gestures" with common behavior across all applications, to avoid user confusion. For example, FIG. 36 is a Venn diagram illustrating various gesture-set relations as may occur in some embodiments.

In the universe of all possible user gestures 3605 some gestures may be reserved as "foundational" 3610. For example, crossing one's arms may be reserved as a universal gesture for "halt application". Accordingly, this foundational subset may be a distinct subset from various application-specific gestures 3615a-d (ellipses 3625 indicates that there may be more sets of application specific gestures than depicted here). Thus, being a reserved, "foundational" gestures, application developers may be advised that using the gesture in their application is forbidden (and if recognized by the system may result in foundational functionality, such as halting the application, rather than whatever action the developer intended).

Conversely, being specific to the application's context, there is no reason that applications cannot share common gestures if, e.g., they will not be run simultaneously. This potential overlap is here represented in part by regions 3620a and 3620b. For example, a "push" gesture may fall in region 3620b and may be used to move a virtual object in Application B, select an item for purchase in Application C, and fire a virtual weapon in Application D.

Example Contextual Gesture Embodiments

Figure 37A:
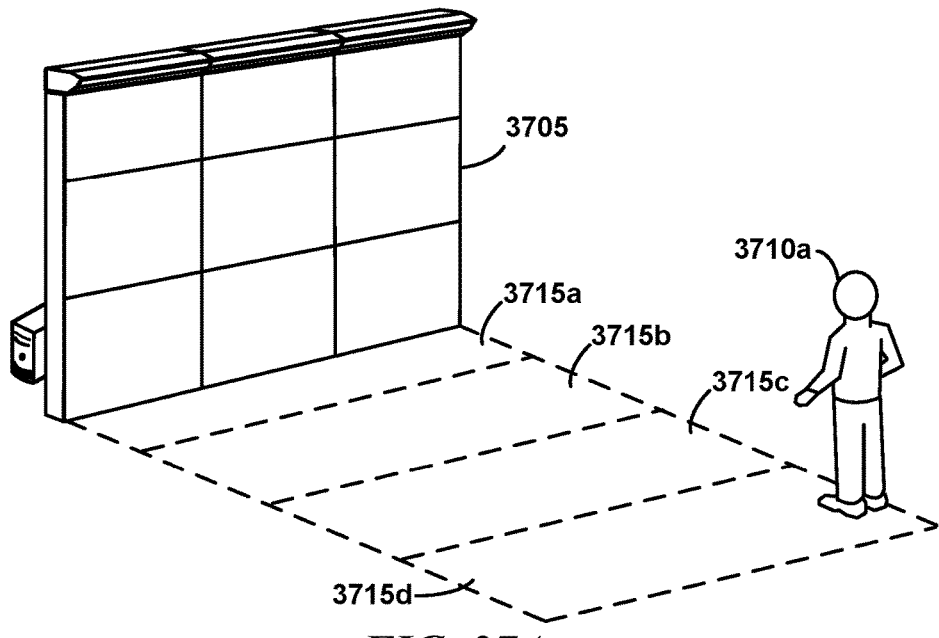
FIG. 37A is a schematic view of a user at a first position before an interface system comprising different interaction zones, as may be implemented in some embodiments.
Figure 37B:
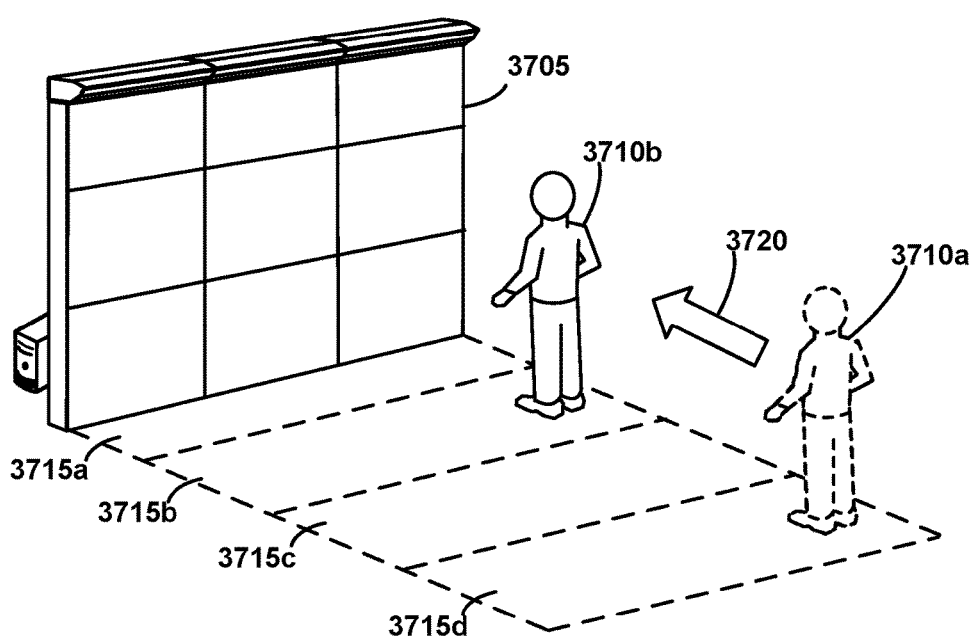
FIG. 37B is a schematic view of a user at a second position before an interface system comprising different interaction zones, as may be implemented in some embodiments.

FIG. 37A is a schematic view of a user at a first position 3710a before an interface system 3705 comprising different interaction zones, as may be implemented in some embodiments. Particularly, gesture recognition and system behavior may be contextually dependent upon the user's distance from the display. Accordingly, as shown in FIG. 37B, when the user moves 3720 to a position 3710b in a zone closer to the screen, new behaviors may result and gestures may have different effects. To this end, the system may divide the region before it into "zones" 3715a-d. Accordingly, in addition to reporting a detected gesture to an application, the system may report the user's distance from the screen or the zone 3715a-d in which the user appears.

The interface's behavior may also vary with the user's lateral position before the display. For example, FIG. 38A is a schematic view of a user at a center position 3810a before an interface system 3805 running a dynamic vanishing point selection menu and the corresponding user view, as may be implemented in some embodiments. FIG. 38B is a schematic view of the user at a left position 3810b relative 3815a to the center positon 3810a and FIG. 38C is a schematic view of a user at a position 3810c to the right relative 3815b to the center position 3810c. The dashed lines on the floor may reflect zones before the user interface, but are also provided merely for the reader's reference, as in some embodiments, the system may simply note the user's lateral position without explicitly determining a zone corresponding to that position.

As the users moves laterally relative to the display (as indicated by relative arrows 3815a and 3815b) the vanishing point of the displayed rendering may be adjusted to align with the user's new position. For example, the display's sensor housing and nine displays are shown in dashed lines in views 3820a-c. Views 3820a-c are shown here as they would appear to someone viewing the display. In this example, the user is looking into three different rooms (coincidentally the width of each room is substantially the same as the width of each sub-display). When the user is at center position 3810a, the vanishing point for the display image is in the center of the display as shown in view 3820a. However, when the user moves to the left position 3810b, the system may adjust the vanishing point to the left, as shown in view 3820b, to again appear before the user. Additionally, the system may occlude the views of the other rooms as illustrated to mimic the real-world behavior that would occur when a user shifts position between real-world rooms. In this manner, the user is less conscious that they are staring at a two-dimensional display and more likely to accept the immersive experience as an extension of their reality.

Similar to the above examples, when the user moves to the right positon 3810c, the system may adjust the vanishing point and field of view as shown in view 3820c to correspond to the user's new right position. As discussed in greater detail below, because the system may recognize the user's head position, not only lateral movement, but vertical movements may also result in adjustments to the vanishing point and occlusions displayed to the user. Together, this gives the user the impression of looking through a "real-world" window into the scene, rather than merely staring at a flat display In some embodiments, user movement toward the display may result in selective enlargement of the viewing region to invite more granular user interaction. For example, FIG. 39A is a schematic view of a user at a first position before engaging a contextual focus feature at the center of the user interface 3905 and the resulting display, as may be implemented in some embodiments. FIG. 39B is a schematic view of a user at a second position after engaging a contextual focus feature at the center of the user interface and the resulting change in display, as may be implemented in some embodiments. Initially, in FIG. 39A, the user may stand at a position 3910a before the display. Consequently, the user may perceive a view such as 3920a. Were the user standing before a real-world series of rooms as shown in schematic diagram 3925a, this display would correspond to the user standing at position 3935a outside all three rooms 3930.

In contrast, in FIG. 39B, when the user moves forward 3915 to a position 3910b sufficiently close to the display, the system may infer this movement as a "selection" of the displayed object, room, etc. Accordingly, having "selected" the center room, the system may now expand the displayed image as shown in view 3920b. While this expansion may mimic real-world behavior, in some embodiments this expansion may occlude more of the other rooms and enlarge more of the selected room than would occur based on the physical distance 3915 moved by the user. In fact, as shown in the schematic diagram 3925b depicting a real-world series of rooms 3930, the displayed view is instead closer to what would occur in the real-world had the user moved a distance 3940 to the threshold of a room 3935b. Accordingly, in real-world units the virtual distance 3940 translation of the virtual camera rendering the scene 3920b may be larger than the actual distance 3915 moved by the user. In this manner, the system may break from the immersive character of the vanishing point distortion to permit the user greater freedom in navigating the virtual environment. Indeed, in some embodiments, all movement relative the center position may correspond to some greater or smaller factor of that moment in the virtual world. For example, a logarithmic or exponential relation may be used when the user wishes to quickly navigate between a microscopic and a planet-wide frame of reference with the same ~4-foot linear movement in the real-world.

To further clarify the example of FIGS. 39A and 39B, FIG. 40A and 40B provide schematic views of the contextual focus feature of the user interface of FIG. 39 and resulting display changes, before and after engagement, but at the side of the user interface, rather than the center of the user interface, as may occur in some embodiments. Here, when the user moves from the position 4010a forward a real-world distance 4015 to position 4010b the system may adjust the view from an initial view 4020a with a vanishing point within the left-most room to an enlarged view 4020b. The view 4020a corresponds to the user standing at a virtual position 4035a relative to the rooms 4030 as shown in view 4025a. The view 4020b corresponds to the user's view from position 4035b at the threshold of the left-most room when the user moves forward a position 4040 relative to their original position 4035a in the virtual world as shown in view 4025b. As discussed above, the virtual movement 4040 may be larger than the real-world translation 4015.

One will appreciate that this room structure may serve as a "home" screen from which they user may select various applications to run. If there are more than three applications, the user may perform a "swipe" gesture (horizontally and in some embodiments vertically and in other directions) or other suitable gesture to present additional room/application pairings. In some embodiments, the rooms may represent "folders" containing several applications as objects in the room. By approaching the room, the room may be enlarged and the user then able to run one of the applications by pointing to the corresponding object.

Example Applications

Figure 41:
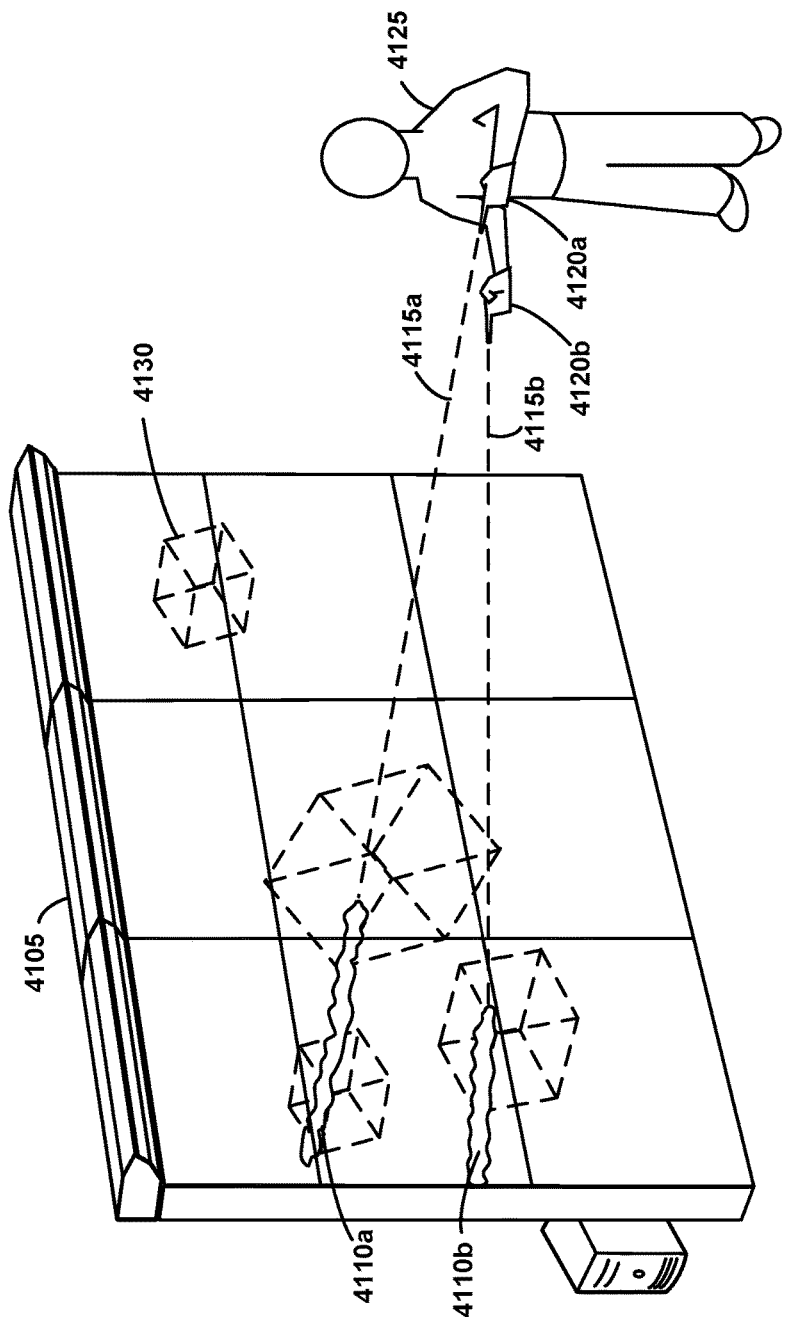
FIG. 41 is a schematic view of a user interface system running an example "trigger-point"-based shooter application as may be implemented in some embodiments.

FIG. 41 is a schematic view of a user interface system 4105 running an example "trigger-point"-based shooter application as may be implemented in some embodiments. For example, the rooms of FIG. 40 may have corresponded to three different applications. By moving forward to the left-most room and performing a "push" gesture, the user 4125 may initialize a video game wherein they must use "trigger-point" gestures to blast hot and cold cubes 4130 with corresponding cold 4110a and hot 4110b blasts from the user's left 4120a and right 4120b hands respectively. The system may infer the direction of the blasts by extrapolating from the directions 4115a, 4115b pointed to by the user's index fingers. Performing an exit gesture may cause the game to end and return the user to the room-selection menu.

Figure 42:
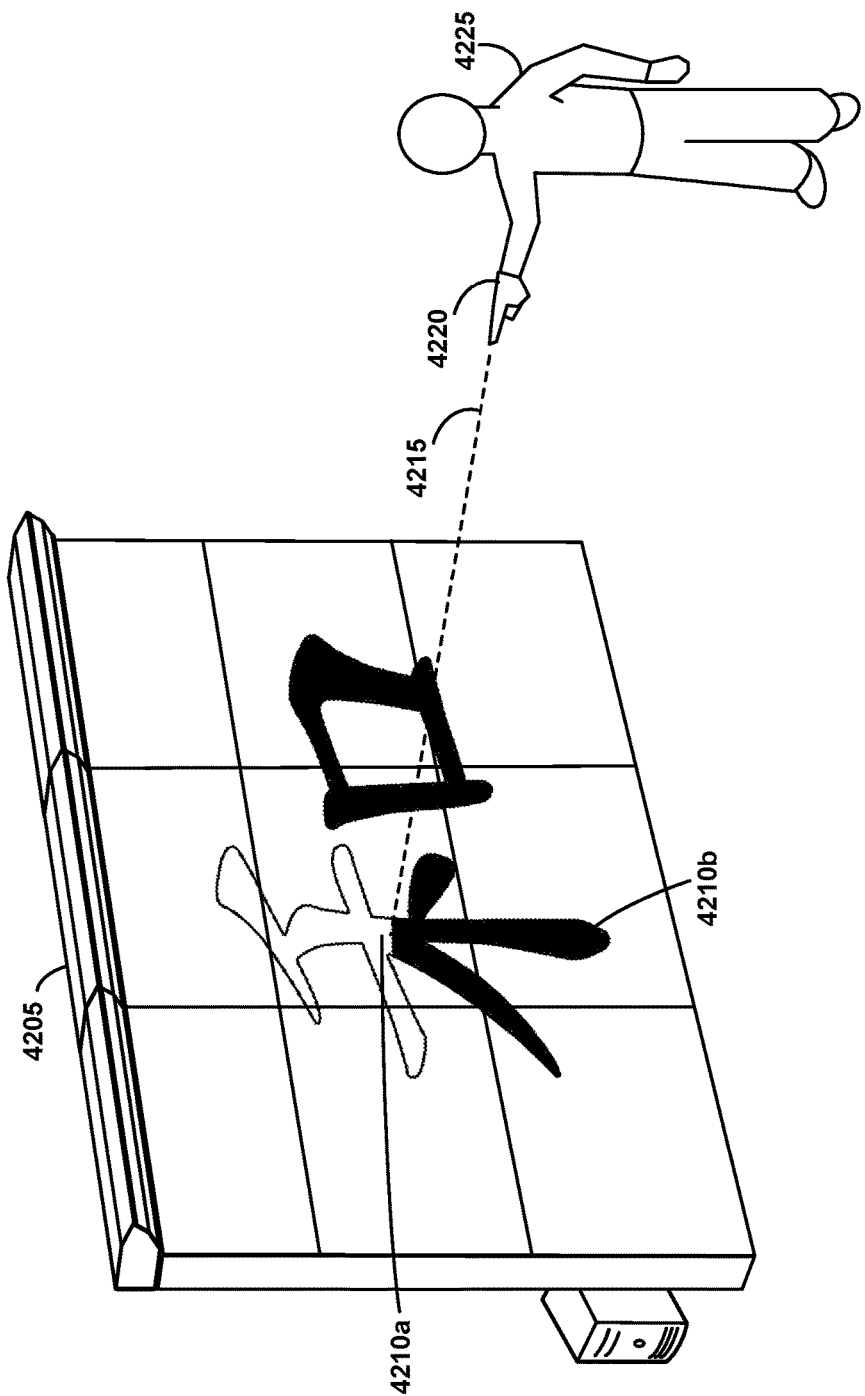
FIG. 42 is a schematic view of a user interface system running an example calligraphy training application as may be implemented in some embodiments.

As another example, FIG. 42 is a schematic view of a user interface system 4205 running an example calligraphy training application as may be implemented in some embodiments. Here, the user 4225 moves their hand 4220 (as part of a "trigger-point" or simply a "pointing" gesture) to direct the brush strokes in a calligraphy application. For example as the user moves a virtual brush corresponding to the direction 4215 they are pointing, the unfilled portions 4210a of a character may be filled 4210b (e.g., as the user completes the character stroke pattern in the correct stroke order). As with the cube game described above, the user may have selected the calligraphy application by approaching a corresponding room and performing a push gesture from the preceding rooms menu.

Figure 43:
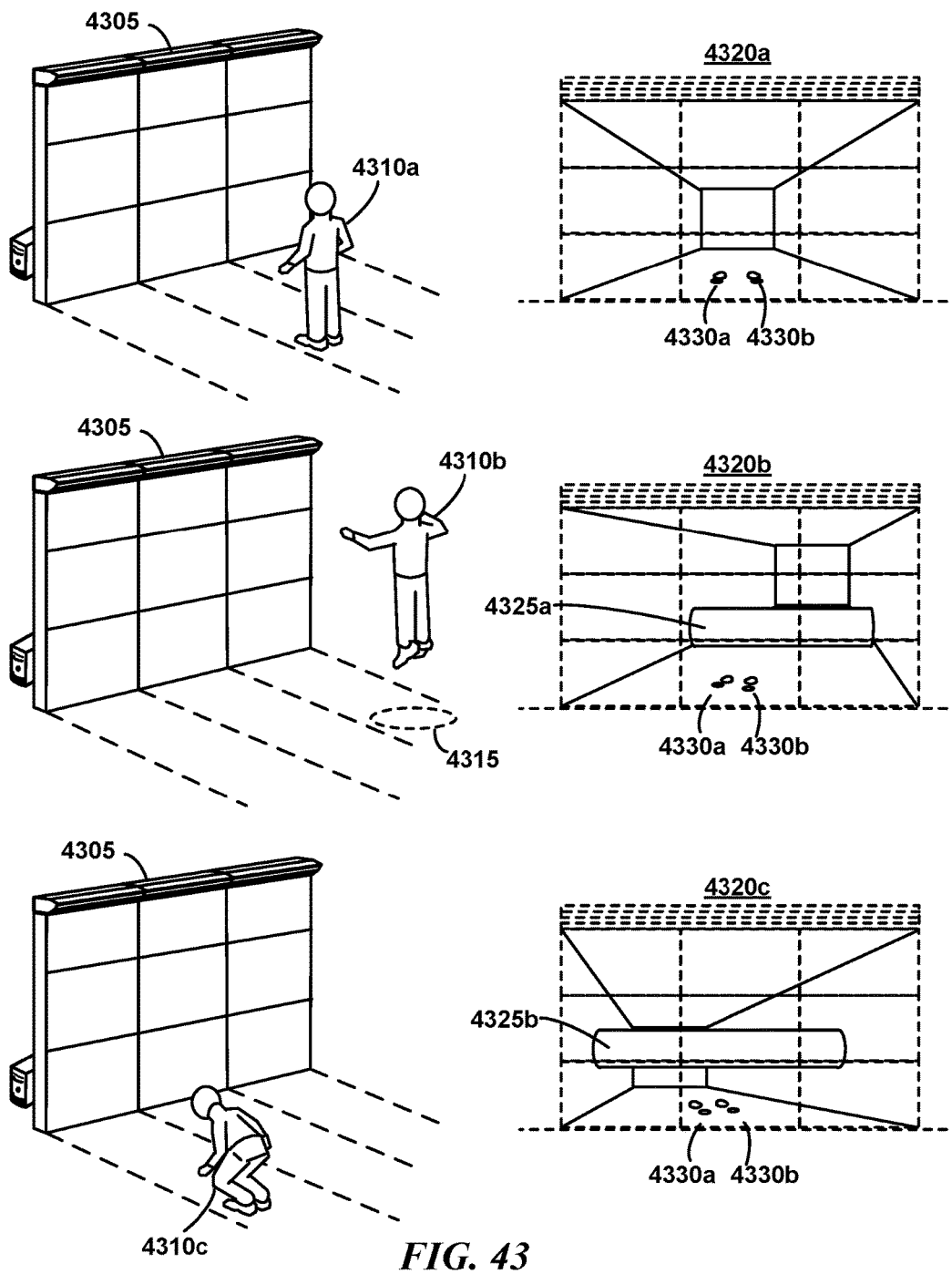
FIG. 43 is a series of schematic views of a user interface system running an example obstacle course application as may be implemented in some embodiments.

As another example application, FIG. 43 is a series of schematic views of a user interface system 4305 running an example obstacle course application as may be implemented in some embodiments. When the user stands at a center position 4310a they may perceive a course with a central vanishing point in the view 4320a. Virtual footprints 4330a and 4330b or any other suitable avatar may be used to reflect the user's risk of collision in the obstacle environment. Once the application begins, the virtual world may begin to move past the user (e.g., the user may begin to "run in place" as their avatar begins to proceed forward through the virtual environment).

In view 4320b, the user has jumped 4310b from a side position 4315 to avoid colliding with the impending obstacle 4325a. Note that the vanishing point has been adjusted to reflect the user's new head position in the upper right of the display. Conversely, in view 4320c the user is crouching at a position to the left 4310c to avoid an upcoming obstacle 4325b in view 4320c. Again, the system has adjusted the vanishing point and perspective in the view 4320c based upon the user's new head position. As indicated by this example, the system may continue to monitor certain user characteristics in parallel with gesture detection. For example, the user's head position and orientation may be constantly noted by the computer system so as to adjust the presented view, even as the system continues to recognize various user gestures.

Additionally, one will appreciate that while many of the example applications have been described with respect to the embodiment of FIG. 10, the applications may also be used with other of the disclosed embodiments, e.g., those of FIGS. 8 and 9.

Computer System

Figure 44:
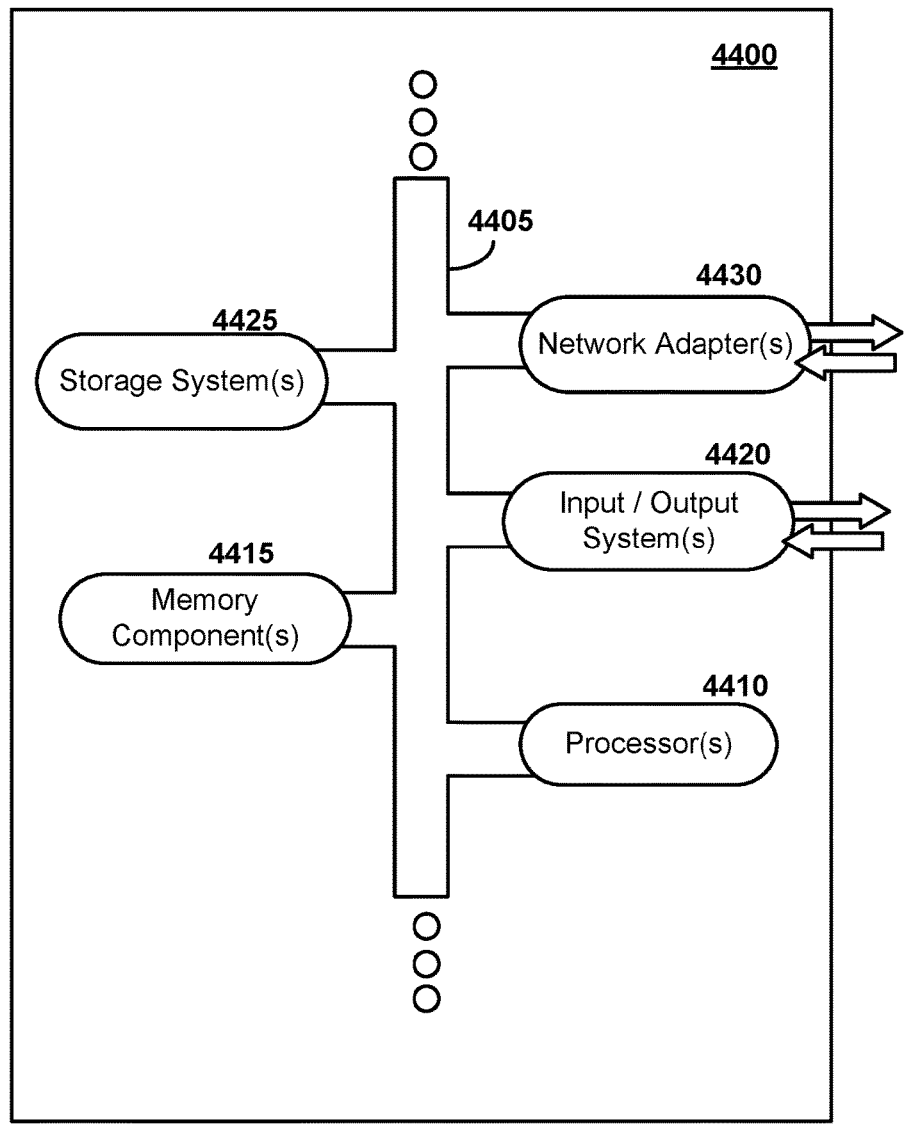
FIG. 44 is a block diagram of an example computer system as may be used in conjunction with some of the embodiments.

FIG. 44 is a block diagram of an example computer system as may be used in conjunction with some of the embodiments. The computing system 4400 may include an interconnect 4405, connecting several components, such as, e.g., one or more processors 4410, one or more memory components 4415, one or more input/output systems 4420, one or more storage systems 4425, one or more network adaptors 4430, etc. The interconnect 4405 may be, e.g., one or more bridges, traces, busses (e.g., an ISA, SCSI, PCI, I2C, Firewire bus, etc.), wires, adapters, or controllers.

The one or more processors 4410 may include, e.g., an Intel™ processor chip, a math coprocessor, a graphics processor, etc. The one or more memory components 4415 may include, e.g., a volatile memory (RAM, SRAM, DRAM, etc.), a non-volatile memory (EPROM, ROM, Flash memory, etc.), or similar devices. The one or more input/output devices 4420 may include, e.g., display devices, keyboards, pointing devices, touchscreen devices, etc. The one or more storage devices 4425 may include, e.g., cloud based storages, removable USB storage, disk drives, etc. In some systems memory components 4415 and storage devices 4425 may be the same components. Network adapters 4430 may include, e.g., wired network interfaces, wireless interfaces, Bluetooth™ adapters, line-of-sight interfaces, etc.

One will recognize that only some of the components, alternative components, or additional components than those depicted in FIG. 44 may be present in some embodiments. Similarly, the components may be combined or serve dual-purposes in some systems. The components may be implemented using special-purpose hardwired circuitry such as, for example, one or more ASICs, PLDs, FPGAs, etc. Thus, some embodiments may be implemented in, for example, programmable circuitry (e.g., one or more microprocessors) programmed with software and/or firmware, or entirely in special-purpose hardwired (non-programmable) circuitry, or in a combination of such forms.

In some embodiments, data structures and message structures may be stored or transmitted via a data transmission medium, e.g., a signal on a communications link, via the network adapters 4430. Transmission may occur across a variety of mediums, e.g., the Internet, a local area network, a wide area network, or a point-to-point dial-up connection, etc. Thus, "computer readable media" can include computer-readable storage media (e.g., "non-transitory" computer-readable media) and computer-readable transmission media.

The one or more memory components 4415 and one or more storage devices 4425 may be computer-readable storage media. In some embodiments, the one or more memory components 4415 or one or more storage devices 4425 may store instructions, which may perform or cause to be performed various of the operations discussed herein. In some embodiments, the instructions stored in memory 4415 can be implemented as software and/or firmware. These instructions may be used to perform operations on the one or more processors 4410 to carry out processes described herein. In some embodiments, such instructions may be provided to the one or more processors 4410 by downloading the instructions from another system, e.g., via network adapter 4430.

Remarks

The above description and drawings are illustrative. Consequently, neither the description nor the drawings should be construed so as to limit the disclosure. For example, titles or subtitles have been provided simply for the reader's convenience and to facilitate understanding. Thus, the titles or subtitles should not be construed so as to limit the scope of the disclosure, e.g., by grouping features which were presented in a particular order or together simply to facilitate understanding. Unless otherwise defined herein, all technical and scientific terms used herein have the same meaning as commonly understood by one of ordinary skill in the art to which this disclosure pertains. In the case of conflict, this document, including any definitions provided herein, will control. A recital of one or more synonyms herein does not exclude the use of other synonyms. The use of examples anywhere in this specification including examples of any term discussed herein is illustrative only, and is not intended to further limit the scope and meaning of the disclosure or of any exemplified term.

Similarly, despite the particular presentation in the figures herein, one skilled in the art will appreciate that actual data structures used to store information may differ from what is shown. For example, the data structures may be organized in a different manner, may contain more or less information than shown, may be compressed and/or encrypted, etc. The drawings and disclosure may omit common or well-known details in order to avoid confusion. Similarly, the figures may depict a particular series of operations to facilitate understanding, which are simply exemplary of a wider class of such collection of operations. Accordingly, one will readily recognize that additional, alternative, or fewer operations may often be used to achieve the same purpose or effect depicted in some of the flow diagrams. For example, data may be encrypted, though not presented as such in the figures, items may be considered in different looping patterns ("for" loop, "while" loop, etc.), or sorted in a different manner, to achieve the same or similar effect, etc.

Reference in this specification to "one embodiment" or "an embodiment" means that a particular feature, structure, or characteristic described in connection with the embodiment is included in at least one embodiment of the disclosure. Consequently, the phrase "in one embodiment" in various places in the specification is not necessarily referring to the same embodiment in each of those various places. Separate or alternative embodiments may not be mutually exclusive of other embodiments. One will recognize that various modifications may be made without deviating from the scope of the embodiments.

We claim:

1. A user interface comprising:
    one or more displays;
    a depth sensor housing frame, the depth sensor housing frame comprising a first depth sensor associated with a first field of view passing through a first panel of the depth-sensor housing frame, the first panel substantially opaque to visual frequencies, and a second depth sensor associated with a second field of view passing through a second panel of the depth sensor housing frame, the second panel substantially opaque to visual frequencies, the first depth sensor mechanically coupled above the second depth sensor, the depth sensor housing frame above the one or more displays;
    at least one processor; and
    at least one memory comprising instructions configured, in conjunction with the at least one processor, to cause the user interface to perform a method comprising:
        acquiring a first frame of depth data using the first depth sensor;
        acquiring a second frame of depth data using the second depth sensor;
        associating at least a portion of the first frame of depth data and the second frame of depth data with a classification corresponding to a first portion of a user's body;
        determining a gesture based, at least in part, upon the classification; and
        notifying an application running on the user interface of the determined gesture.

2. The user interface of claim 1, wherein the depth sensor housing frame further comprises:
    a back panel;
    a top panel;
    a bottom panel;
    at least one depth sensor mount; and
    at least two spacers located within an enclosure formed by the back panel, top panel, bottom panel, first panel substantially opaque to visual frequencies, and the second panel substantially opaque to visual frequencies, wherein
    the at least one depth sensor mount is located between two of the at least two spacers, and wherein
    the at least one depth sensor mount is configured to receive the first depth sensor and the second depth sensor such that a field of view associated with each depth sensor passes through at least one of the two panels substantially opaque to visual frequencies.

3. The user interface of claim 2, wherein the one or more displays comprises a 3×3 grid of substantially adjacent displays.

4. The user interface of claim 3, wherein the depth sensor housing frame is one of three depth sensor housing frames comprising:
    a first depth sensor housing frame above the top-left display of the 3×3 grid;
    a second depth sensor housing frame above the top-middle display of the 3×3 grid; and
    a third depth sensor housing frame above the top-right display of the 3×3 grid.

5. The user interface of claim 1, wherein the method further comprises:
   detecting a location of at least a portion of the user relative to the interface; and
   adjusting a vanishing point of an image presented on the one or more displays to correspond with the location.

6. The user interface of claim 1, wherein the method further comprises:
   detecting a first distance between the user and the one or more displays;
   determining that the first distance is greater than a threshold distance from the one or more displays;
   displaying a virtual environment comprising one or more rooms from a first perspective based, at least in part, upon the determination that the first distance is greater than the threshold distance;
   detecting a second distance between the user and the one or more displays;
   determining that the second distance is less than a threshold distance from the one or more displays; and
   displaying the virtual environment from a second perspective based, at least in part, upon the determination that the second distance is less than the threshold distance, wherein
   the first perspective displays the virtual environment from a virtual location further from the rooms than the second perspective.

7. The user interface of claim 6, wherein the method further comprises:
   detecting a push gesture while presenting the virtual environment from the second perspective; and
   activating an application associated with the room displayed closest to the user on the one or more displays.

8. A computer-implemented method running on a user interface, the method comprising:
   acquiring a first frame of depth data from a first depth sensor;
   acquiring a second frame of depth data from a second depth sensor, the first depth sensor and the second depth sensor within a depth sensor housing frame above one or more displays, the first depth sensor associated with a first field of view passing through a first panel of the depth sensor housing frame, the first panel substantially opaque to visual frequencies, and the second depth sensor associated with a second field of view passing through a second panel substantially opaque to visual frequencies, the first depth sensor mechanically coupled above the second depth sensor;
   associating at least a portion of the first depth frame and the second depth frame with a classification corresponding to a first portion of a user's body;
   determining a gesture based, at least in part, upon the classification; and
   notifying an application running on the user interface of the determined gesture.

9. The computer-implemented method of claim 8, wherein the depth sensor housing frame further comprises:
   a back panel;
   a top panel;
   a bottom panel;
   at least one depth sensor mount; and
   at least two spacers located within an enclosure formed by the back panel, top panel, bottom panel, first panel substantially opaque to visual frequencies, and the second panel substantially opaque to visual frequencies, wherein
   the at least one depth sensor mount is located between two of the at least two spacers, and wherein
   the at least one depth sensor mount is configured to receive the first depth sensor and the second depth sensor such that a field of view associated with each depth sensor passes through at least one of the two panels substantially opaque to visual frequencies.

10. The computer-implemented method of claim 8, wherein the method further comprises:
    detecting a location of at least a portion of the user relative to the interface; and
    adjusting a vanishing point of an image presented on the one or more displays to correspond with the location.

11. The computer-implemented method of claim 8, wherein the method further comprises:
    detecting a first distance between the user and the one or more displays;
    determining that the first distance is greater than a threshold distance from the one or more displays;
    displaying a virtual environment comprising one or more rooms from a first perspective based, at least in part, upon the determination that the first distance is greater than the threshold distance;
    detecting a second distance between the user and the one or more displays;
    determining that the second distance is less than a threshold distance from the one or more displays; and
    displaying the virtual environment from a second perspective based, at least in part, upon the determination that the second distance is less than the threshold distance, wherein
    the first perspective displays the virtual environment from a virtual location further from the rooms than the second perspective.

12. The computer-implemented method of claim 11, wherein the method further comprises:
    detecting a push gesture while presenting the virtual environment from the second perspective; and
    activating an application associated with the room displayed closest to the user on the one or more displays.

13. A non-transitory computer-readable medium comprising instructions configured to cause a user interface to perform a method, the method comprising:
    acquiring a first frame of depth data from a first depth sensor;
    acquiring a second frame of depth data from a second depth sensor, the first depth sensor and the second depth sensor within a depth sensor housing frame above one or more displays, the first depth sensor associated with a first field of view passing through a first panel of the depth sensor housing frame, the first panel substantially opaque to visual frequencies, and the second depth sensor associated with a second field of view passing through a second panel, the second panel substantially opaque to visual frequencies, the first depth sensor mechanically coupled above the second depth sensor;
    associating at least a portion of the first depth frame and the second depth frame with a classification corresponding to a first portion of a user's body;
    determining a gesture based, at least in part, upon the classification; and
    notifying an application running on the user interface of the determined gesture.

14. The non-transitory computer-readable medium of claim 13, wherein the depth sensor housing frame comprises:

a back panel;

a top panel;

a bottom panel;

at least one depth sensor mount; and at least two spacers located within an enclosure formed by the back panel, top panel, bottom panel, first panel substantially opaque to visual frequencies, and the second panel substantially opaque to visual frequencies, wherein the at least one depth sensor mount is located between two of the at least two spacers, and wherein the at least one depth sensor mount is configured to receive the first depth sensor and the second depth sensor such that a field of view associated with each depth sensor passes through at least one of the two panels substantially opaque to visual frequencies.

15. The non-transitory computer-readable medium of claim 13, wherein the method further comprises:

detecting a location of at least a portion of the user relative to the interface; and adjusting a vanishing point of an image presented on the displays to correspond with the location.

16. The non-transitory computer-readable medium of claim 13, wherein the method further comprises:

detecting a first distance between the user and the displays;

determining that the first distance is greater than a threshold distance from the displays;

displaying a virtual environment comprising one or more rooms from a first perspective based, at least in part, upon the determination that the first distance is greater than the threshold distance;

detecting a second distance between the user and the displays;

determining that the second distance is less than a threshold distance from the displays; and displaying the virtual environment from a second perspective based, at least in part, upon the determination that the second distance is less than the threshold distance, wherein the first perspective displays the virtual environment from a virtual location further from the rooms than the second perspective.

17. The non-transitory computer-readable medium of claim 16, wherein the method further comprises:

detecting a push gesture while presenting the virtual environment from the second perspective; and activating an application associated with the room displayed closest to the user on the one or more displays.

18. The computer-implemented method of claim 9, wherein the one or more displays comprise a 3×3 grid of substantially adjacent displays.

19. The computer-implemented method of claim 18, wherein the depth sensor housing frame is one of three depth sensor housing frames comprising:

a first depth sensor housing frame above the top-left display of the 3×3 grid;

a second depth sensor housing frame above the top-middle display of the 3×3 grid; and a third depth sensor housing frame above the top-right display of the 3×3 grid.

20. The non-transitory computer-readable medium of claim 14, wherein the one or more displays comprise a 3×3 grid of substantially adjacent displays.

21. The non-transitory computer-readable medium of claim 20, wherein the depth sensor housing frame is one of three depth sensor housing frames comprising:

a first depth sensor housing frame above the top-left display of the 3×3 grid;

a second depth sensor housing frame above the top-middle display of the 3×3 grid; and a third depth sensor housing frame above the top-right display of the 3×3 grid.

* * * * *